(12) United States Patent
Tran et al.

(10) Patent No.: US 12,176,630 B2
(45) Date of Patent: Dec. 24, 2024

(54) WIRELESS SYSTEM

(71) Applicants: Bao Tran, Saratoga, CA (US); Ha Tran, Saratoga, CA (US)

(72) Inventors: Bao Tran, Saratoga, CA (US); Ha Tran, Saratoga, CA (US)

(*) Notice: Subject to any disclaimer, the term of this patent is extended or adjusted under 35 U.S.C. 154(b) by 0 days.

(21) Appl. No.: 18/487,052

(22) Filed: Oct. 14, 2023

(65) Prior Publication Data
US 2024/0136709 A1    Apr. 25, 2024

Related U.S. Application Data

(63) Continuation of application No. 17/408,108, filed on Aug. 20, 2021, now Pat. No. 11,824,275.

(51) Int. Cl.
| | |
|---|---|
| *H04W 4/40* | (2018.01) |
| *F21S 8/08* | (2006.01) |
| *G06N 3/04* | (2023.01) |
| *G06N 3/08* | (2023.01) |
| *G10L 25/51* | (2013.01) |
| *H01Q 1/24* | (2006.01) |
| *H01Q 1/44* | (2006.01) |
| *H01Q 3/46* | (2006.01) |
| *H01Q 21/28* | (2006.01) |
| *H04B 7/024* | (2017.01) |
| *H04B 7/06* | (2006.01) |
| *H04W 4/44* | (2018.01) |
| *H04W 16/02* | (2009.01) |
| *H04W 16/28* | (2009.01) |
| *H04W 24/02* | (2009.01) |
| *F21W 131/103* | (2006.01) |

(Continued)

(52) U.S. Cl.
CPC ............. *H01Q 3/46* (2013.01); *F21S 8/086* (2013.01); *G06N 3/04* (2013.01); *G06N 3/08* (2013.01); *G10L 25/51* (2013.01); *H01Q 1/246* (2013.01); *H01Q 1/44* (2013.01); *H01Q 21/28* (2013.01); *H04B 7/024* (2013.01); *H04B 7/0617* (2013.01); *H04W 4/40* (2018.02); *H04W 4/44* (2018.02); *H04W 16/02* (2013.01); *H04W 16/28* (2013.01); *H04W 24/02* (2013.01); *F21W 2131/103* (2013.01); *G06V 40/172* (2022.01); *G06V 40/25* (2022.01); *H04B 17/309* (2015.01); *H04L 67/10* (2013.01); *H04L 67/12* (2013.01)

(58) Field of Classification Search
CPC ............. H01Q 3/46; H01Q 1/44; H01Q 1/246; H04W 4/40; F21S 8/086; G06N 3/04; G06N 3/08; G10L 25/51; G01Q 21/28; H04B 17/309; G06V 40/25; F21W 2131/103; H04L 67/10; H04L 67/12
USPC .................................................... 343/721
See application file for complete search history.

(56) References Cited

U.S. PATENT DOCUMENTS

| | | | |
|---|---|---|---|
| 6,624,845 B2 * | 9/2003 | Loyd .................. | F21V 33/0052 |
| | | | 348/E7.087 |
| 7,664,492 B1 * | 2/2010 | Lee ...................... | H04W 16/28 |
| | | | 455/562.1 |

(Continued)

*Primary Examiner* — April G Gonzales
(74) *Attorney, Agent, or Firm* — PatentPC PowerPatent

(57) ABSTRACT

A system includes a transceiver to communicate with a predetermined target; one or more antennas coupled to the transceiver each electrically or mechanically steerable to the predetermined target; and an edge processing module coupled to the transceiver and one or more antennas to provide low-latency computation for the predetermined target.

20 Claims, 24 Drawing Sheets

(51) Int. Cl.
  *G06V 40/16* (2022.01)
  *G06V 40/20* (2022.01)
  *H04B 17/309* (2015.01)
  *H04L 67/10* (2022.01)
  *H04L 67/12* (2022.01)

(56) References Cited

U.S. PATENT DOCUMENTS

| | | | | |
|---|---|---|---|---|
| 8,190,553 | B2* | 5/2012 | Routt | B82Y 10/00 |
| | | | | 706/62 |
| 8,897,449 | B1* | 11/2014 | Broadbent | H04L 9/0891 |
| | | | | 380/278 |
| 9,173,187 | B2* | 10/2015 | Moshfeghi | H04W 64/00 |
| 9,829,560 | B2* | 11/2017 | Moshfeghi | H04W 64/006 |
| 10,380,496 | B2* | 8/2019 | Elsherbini | H01L 24/85 |
| 10,461,421 | B1* | 10/2019 | Tran | H04W 24/02 |
| 10,594,034 | B1* | 3/2020 | Tran | H01Q 21/28 |
| 10,637,142 | B1* | 4/2020 | Tran | H04W 16/28 |
| 10,700,427 | B1* | 6/2020 | Tran | G06N 3/04 |
| 10,707,578 | B1* | 7/2020 | Tran | H01Q 1/04 |
| 10,811,771 | B1* | 10/2020 | Tran | H04W 4/40 |
| 10,897,083 | B2* | 1/2021 | Tran | G06V 10/82 |
| 10,916,845 | B2* | 2/2021 | Tran | G06N 20/10 |
| 2010/0317362 | A1* | 12/2010 | Lee | H04W 16/28 |
| | | | | 455/439 |
| 2017/0064616 | A1* | 3/2017 | Park | H04W 48/16 |
| 2017/0109605 | A1* | 4/2017 | Ahn | G06F 18/214 |
| 2017/0357539 | A1* | 12/2017 | Dadashikelayeh | G06F 21/44 |
| 2018/0035255 | A1* | 2/2018 | Kordybach | H04W 4/40 |
| 2018/0062274 | A1* | 3/2018 | Madsen | H01Q 3/26 |
| 2018/0323853 | A1* | 11/2018 | Sridharan | H04B 7/0617 |
| 2018/0323973 | A1* | 11/2018 | Soukharev | G06F 7/725 |
| 2018/0348343 | A1* | 12/2018 | Achour | H01Q 1/364 |
| 2019/0074600 | A1* | 3/2019 | Bily | G01S 13/931 |
| 2019/0131721 | A1* | 5/2019 | Dani | H01Q 21/24 |
| 2019/0164076 | A1* | 5/2019 | Kim | G06N 10/80 |
| 2019/0190463 | A1* | 6/2019 | Smith | H03K 19/195 |
| 2019/0220782 | A1* | 7/2019 | Chen | G06N 10/00 |
| 2020/0099418 | A1* | 3/2020 | Rofougaran | H04W 52/42 |
| 2020/0358183 | A1* | 11/2020 | Tran | H01Q 1/246 |
| 2020/0358184 | A1* | 11/2020 | Tran | H01Q 3/46 |
| 2020/0358185 | A1* | 11/2020 | Tran | H01Q 1/04 |
| 2020/0358186 | A1* | 11/2020 | Tran | H01Q 3/46 |
| 2020/0358187 | A1* | 11/2020 | Tran | G06N 3/045 |
| 2020/0358188 | A1* | 11/2020 | Tran | H01Q 1/246 |
| 2021/0005966 | A1* | 1/2021 | Tran | H01Q 1/44 |
| 2021/0058473 | A1* | 2/2021 | Yerli | H04L 41/16 |
| 2021/0089055 | A1* | 3/2021 | Tran | G06N 3/08 |
| 2021/0098876 | A1* | 4/2021 | Tran | G06V 10/82 |
| 2021/0112438 | A1* | 4/2021 | Soloway | H04L 41/5025 |
| 2021/0151884 | A1* | 5/2021 | Tran | H04W 4/027 |
| 2021/0274553 | A1* | 9/2021 | Xue | H04W 56/0015 |
| 2024/0136709 | A1* | 4/2024 | Tran | G06N 3/088 |

* cited by examiner

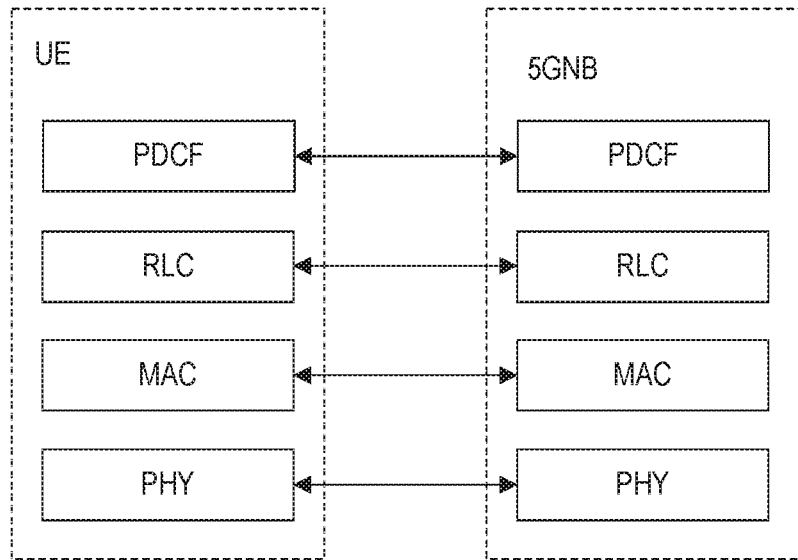
User Plane Protocol Stack
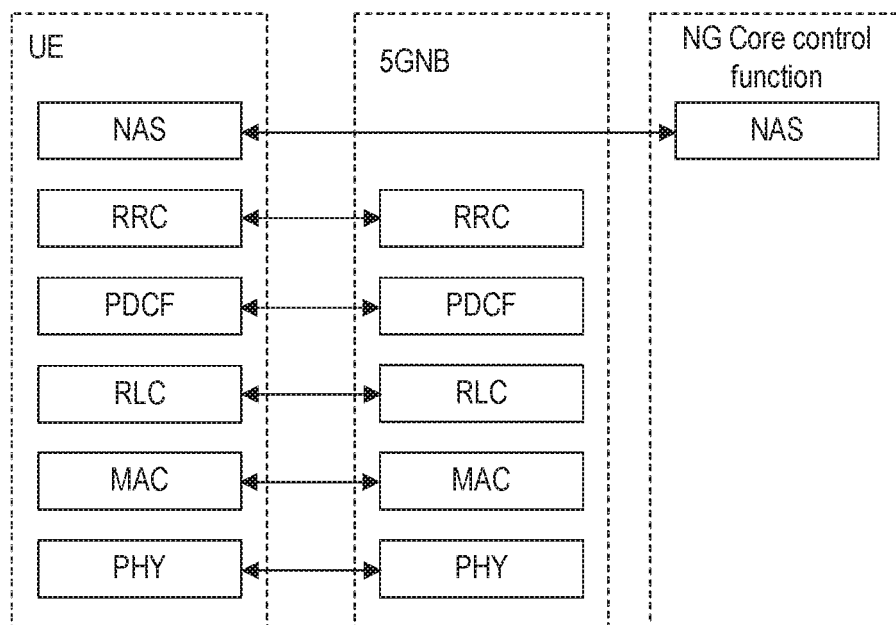
Control Plane Protocol Stack
FIG. 1D

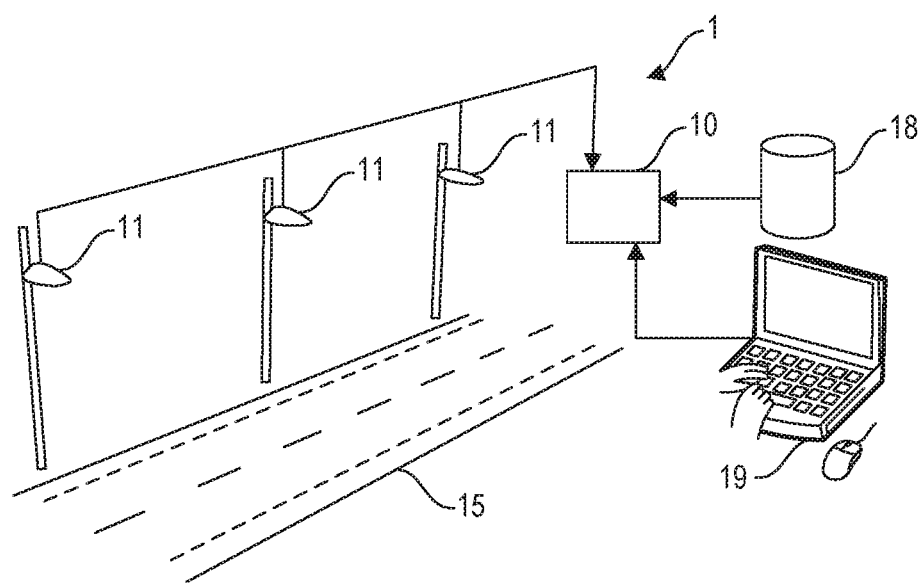
FIG. 2A
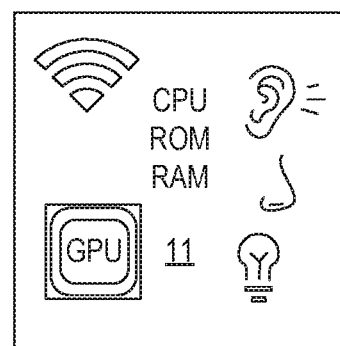
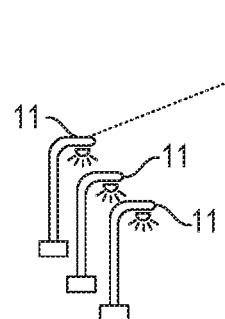
FIG. 2B

WIRELESS SYSTEM

This application is related to application Ser. No. 16/558,279, the content of which is incorporated by reference.

The present invention relates to computing systems.

2G, 3G and 4G cellular wireless technologies have been mass deployed throughout the world. Moreover personal area network based technologies such as Wi-Fi, Bluetooth and ZigBee have become predominant in our daily life. 5G is the short form of 5th Generation. It is used to designate fifth generation of mobile technologies. 5G has made it possible to use mobile phone with larger bandwidth possible. It is a packet switched wireless system. It is used to cover wide area and used to provide higher throughput. It uses CDMA, BDMA and also millimeter wave (for backhaul wireless connectivity). It uses improved and advanced data coding/modulation techniques. It provides about 100 Mbps at full mobility and 1 Gbps at low mobility. It uses smart antenna techniques to support higher data rate and coverage.

5G cell phones use radio frequencies in various bands as per country wise allocations. Typically it uses less than 1 GHz, below 6 GHz and above 6 GHz (i.e. mmwave) frequency bands. It delivers fast uplink/downlink throughput due to massive MIMO and lower latency between 5G network (i.e. SGNB) and itself. The 5G cell phone supports 10 times throughput compare to 4G phones. They are backward compatible to 4G standards such as LTE and LTE-advanced. Moreover latest 5G phones will support Bluetooth, Wi-Fi and NFC based short distance wireless technologies. GPS is also incorporated to support various GPS based applications including location tracking, google maps etc.

5G promises an extremely interconnected world where everything from smartwatches, vehicles, houses, and farms utilize the ultrafast speeds and low delays it offers. To accomplish this, and to do it well—with as little coverage gaps as possible—it's required to have a huge number of 5G towers, particularly in areas that demand lots of traffic like big cities and business districts. Another reason 5G towers have to be installed so frequently in busy areas is because for the small cell to support superfast speeds, it has to have a direct line of sight with the receiving device. Since 5G cell towers are so small, they can be positioned in ordinary places like on light poles, the tops of buildings, and even street lights. This translates into less traditional looking towers but also potentially more eyesores nearly everywhere.

SUMMARY

Various inventive aspects are disclosed below:

Edge Processing with Low Latency

A system includes a cellular transceiver to communicate with a predetermined target; one or more antennas coupled to the 5G transceiver each electrically or mechanically steerable to the predetermined target; a processor to control a directionality of the one or more antennas in communication with the predetermined target; and an edge processing module coupled to the processor and the one or more antennas to provide low-latency computation for the predetermined target.

Implementations can include one or more of the following. The edge processing can include cryogenic processors, quantum processors, neuromorphic processors, learning machines, GPUs, and FPGA, for example. The processor calibrates a radio link between a transceiver in the housing and a client device. The processor is coupled to fiber optics cable to communicate with a cloud-based radio access network (RAN) or a remote RAN. The processor calibrates a connection by analyzing RSSI and TSSI and moves the antennas until predetermined cellular parameters are reached. The edge processing module comprises at least a processor, a graphical processing unit (GPU), a neural network, a statistical engine, or a programmable logic device (PLD). The edge processing module is embedded in the antenna housing. The edge processing module can be a pole, a building, or a light. The cellular transceiver can be a 5G transceiver. The processor coordinates beam sweeping by the one or more antennas with radio nodes or user equipment (UE) devices based upon service level agreement, performance requirement, traffic distribution data, networking requirements or prior beam sweeping history. The beam sweeping is directed at a group of autonomous vehicles or a group of virtual reality devices. A neural network coupled to a control plane, a management plane, and a data plane to optimize 5G parameters. One or more cameras and sensors in the housing to capture security information. Edge sensors mounted on the housing of the antenna can include LIDAR and RADAR. A camera can perform individual identity identification. The edge processing module streams data to the predetermined target to minimize loading the target. The edge processing module shares workload with a core processing module located at a head-end and a cloud module located at a cloud data center, each processing module having increased latency and each having a processor, a graphical processing unit (GPU), a neural network, a statistical engine, or a programmable logic device (PLD). An edge learning machine in the housing to provide local edge processing for Internet-of-Things (JOT) sensors with reduced off-chip memory access. The edge learning machine uses pre-trained models and modifies the pre-trained models for a selected task. A cellular device for a person crossing a street near a city light or street light can emit a person to vehicle (P2V) or a vehicle to person (V2P) safety message. A cloud trained neural network whose network parameters are down-sampled and filter count reduced before transferring to the edge neural network.

Beam Sweeping with Low Latency

A system includes a cellular transceiver to communicate with a predetermined target; one or more antennas coupled to the 5G transceiver each electrically steerable to the predetermined target; and a processor to generate an antenna beam sweeping command based upon traffic distribution data, device networking requirements or a prior beam sweeping history to focus at least one beam for communication with the predetermined target.

Implementations can include one or more of the following. The traffic distribution data may be generated by collecting traffic data from radio nodes and/or UE devices, or the networking requirements may include, for example, service requirements associated with one or more applications (vehicular or reality application) on one or more UE devices. The processor calibrates a radio link between a transceiver in the housing and a client device. The processor is coupled to fiber optics cable to communicate with a cloud-based radio access network (RAN) or a remote RAN. The processor calibrates a connection by analyzing RSSI and TSSI and moves the antennas until predetermined cellular parameters are reached. The cellular transceiver can be a 5G transceiver. The processor coordinates beam sweeping by the one or more antennas with radio nodes or user equipment (UE) devices based upon service level agreement, performance requirement, traffic distribution data, networking requirements or prior beam sweeping history.

The beam sweeping is directed at a group of autonomous vehicles or a group of virtual reality devices. A neural network (NN) can be used to determine the beam sweeping. The NN can be connected to a control plane, a management plane, and a data plane to optimize 5G parameters. One or more cameras and sensors in the housing to capture security information. Edge sensors mounted on the housing of the antenna can include LIDAR and RADAR and such data can be sent at top priority to vehicles passing by. A camera can perform individual identity identification. The edge processing module streams data to the predetermined target to minimize loading the target. The edge processing module shares workload with a core processing module located at a head-end and a cloud module located at a cloud data center, each processing module having increased latency and each having a processor, a graphical processing unit (GPU), a neural network, a statistical engine, or a programmable logic device (PLD). An edge learning machine in the housing to provide local edge processing for Internet-of-Things (JOT) sensors with reduced off-chip memory access. The edge learning machine uses pre-trained models and modifies the pre-trained models for a selected task. A cellular device for a person crossing a street near a city light or street light can emit a person to vehicle (P2V) or a vehicle to person (V2P) safety message. A cloud trained neural network whose network parameters are down-sampled and filter count reduced before transferring to the edge neural network. An edge processing module can be connected to the processor and the one or more antennas to provide low-latency computation for the predetermined target. The edge processing module can be at least a processor, a graphical processing unit (GPU), a neural network, a statistical engine, or a programmable logic device (PLD). The edge processing module is embedded in the antenna housing. The edge processing module can be part of a pole, a building, or a light. The processor can run code including requesting a portion of a network for a group of devices, checking for available resources to satisfy the request and assigning a network slice deployment layout satisfying the requested portion of the network including antenna level layout, and managing resources at the antenna level as part of the requested portion of the network to provide communication for the group. The request can be for enhanced services for autonomous vehicles. The request can be for reality applications such as virtual reality or augmented reality. Upon request, the system determines a candidate network slice deployment layout that satisfies the network level requirements and network layouts of a service request and costs associated with a candidate network resource and/or a candidate network slice deployment layout, which is used as a basis to optimally use available network resources. The system coordinates, authorizes, releases and/or engages network resources in network. The system obtains network slice deployment layout descriptors corresponding to a network slice deployment layout and the system may manage the provisioning of the network slice deployment layout to satisfy the service request. The system may perform various functions such as, for example, network slice life cycle management, configuration management (e.g., policies, isolation of management), performance management (e.g., service level agreement (SLA) management, service assurance and programmability), service mapping. The system updates in real time network resource device regarding availability of network resources based on the current state of network resources in network and provisioned network resources that support service requests. The system can respond to the request with a monetary cost associated with a candidate network slice deployment layout, quality-of-service values associated with the candidate network slice deployment layout (e.g., minimum value and/or maximum value pertaining to latency, bandwidth, reliability, etc.) and/or other information representative of the configuration and/or service such as virtual network resource, non-virtual network resource, cloud, 5G RAN access, for example. The method includes storing network resource and capability information pertaining to network resources of a network and generating network level requirement information that would support the network service. The method includes creating end-to-end network slice deployment information that includes parameters to provision an end-to-end network slice deployment layout in the network that supports the network service.

Network Slicing for Groups of Devices

A method to manage a cellular network includes requesting a portion of a network for a group of devices, checking for available resources to satisfy the request and assigning a network slice deployment layout satisfying the requested portion of the network including antenna level layout, and managing resources at the antenna level as part of the requested portion of the network to provide communication for the group.

In one implementation, the request can be for enhanced services for autonomous vehicles. The request can be for reality applications such as virtual reality or augmented reality. Upon request, the system determines a candidate network slice deployment layout that satisfies the network level requirements and network layouts of a service request and costs associated with a candidate network resource and/or a candidate network slice deployment layout, which is used as a basis to optimally use available network resources. The system coordinates, authorizes, releases and/or engages network resources in network. The system obtains network slice deployment layout descriptors corresponding to a network slice deployment layout and the system may manage the provisioning of the network slice deployment layout to satisfy the service request. The system may perform various functions such as, for example, network slice life cycle management, configuration management (e.g., policies, isolation of management), performance management (e.g., service level agreement (SLA) management, service assurance and programmability), service mapping. The system updates in real time network resource device regarding availability of network resources based on the current state of network resources in network and provisioned network resources that support service requests. The system can respond to the request with a monetary cost associated with a candidate network slice deployment layout, quality-of-service values associated with the candidate network slice deployment layout (e.g., minimum value and/or maximum value pertaining to latency, bandwidth, reliability, etc.) and/or other information representative of the configuration and/or service such as virtual network resource, non-virtual network resource, cloud, 5G RAN access, for example. The method includes storing network resource and capability information pertaining to network resources of a network and generating network level requirement information that would support the network service. The method includes creating end-to-end network slice deployment information that includes parameters to provision an end-to-end network slice deployment layout in the network that supports the network service.

Steerable Actuated Antenna

A system, includes a moveable surface; and one or more antennas mounted on the moveable surface to change a direction of the antenna to a predetermined target. The system may include one or more of the following. A pneumatic actuator or electrical motor can be placed under processor control to change the curvature of the lens and to change the directionality of the antenna. The processor can calibrate the RF link between the tower and the client device. The processor can calibrate the connection by examining the RSSI and TSSI and scan the moveable surface until the optimal RSSI/TSSI levels (or other cellular parameters) are reached. The scanning of the target device can be done by moving the actuators up or down. Opposing actuator arrays can be formed to provide two-sided communication antennas. An array of actuators can be used (similar to bee eyes), each antenna is independently steerable to optimize 5G transmission. Fresnel lens can be used to improve SNR. The focusing of the actuators can be automatically done using processor with iterative changes in the orientation of the antenna by changing the actuators until predetermined criteria is achieved such as the best transmission speed, TSSI, RSSI, SNR, among others. This is similar to the way human vision eyeglass correction is done. A learning machine such as neural network or SVM can be used over the control/management plane of the 5G network to optimize 5G parameters based on local behaviors.

Learning System Plane

A system to optimize data flow in a 5G network, includes a neural network plane; a control plane coupled to the neural network plane; a management plane coupled to the neural network plane; a data plane coupled to the neural network plane, wherein the neural network plane receives cellular network statistics from the data plane for training, and during run-time, the neural network provides operating parameters to the data, control and management planes; and one or more operations sending resource request to the neural network plane for autonomous resolution that maximizes data flow in the system. The system may include one or more of the following: A moveable surface; and one or more antennas mounted on the moveable surface to change a direction of the antenna to a predetermined target. A pneumatic actuator or electrical motor can be placed under processor control to change the curvature of the lens and to change the directionality of the antenna. The processor can calibrate the RF link between the tower and the client device. The processor can calibrate the connection by examining the RSSI and TSSI and scan the moveable surface until the optimal RSSI/TSSI levels (or other cellular parameters) are reached. The scanning of the target device can be done by moving the actuators up or down. Opposing actuator arrays can be formed to provide two-sided communication antennas. An array of actuators can be used (similar to bee eyes), each antenna is independently steerable to optimize 5G transmission. Fresnel lens can be used to improve SNR. Focus the antenna on BS and UE, and then combine antennas for orthogonal transmissions based on various factors. The focusing of the actuators can be automatically done using processor with iterative changes in the orientation of the antenna by changing the actuators until predetermined criteria is achieved such as the best transmission speed, TSSI, RSSI, SNR, among others. This is similar to the way human vision eyeglass correction is done.

Man-Hole Antenna

A system, comprising one or more actuators; a ground cover above the one or more actuators providing a moveable surface, wherein the actuators move to adjust the curvature of the movable surface; and an antenna mounted on the moveable surface to change a direction of the antenna to a predetermined target.

A system, includes a ground cover (such as a manhole cover) that allows radio signal to pass through; a moveable surface coupled to the cover; and one or more antennas mounted on the moveable surface to change a direction of the antenna to a predetermined target.

3G/4G Cell Towers

A system includes a cell tower with a pole and a top portion to mount 4G antennas and a 5G housing; one or more mechanically steerable active antennas mounted on the 5G housing and in communication with a predetermined target using 5G protocols. The system may include one or more of the following. A processor can control to change the curvature of the surface and/or to change the directionality of the antenna. The processor can calibrate the RF link between the tower and the client device. The processor can calibrate the connection by examining the RSSI and TSSI and scan the moveable lens until the optimal RSSI/TSSI levels (or other cellular parameters) are reached. The scanning of the target client/device can be done by injecting or removing liquid from moveable surface, or can be done by moving actuators coupled to the surface. Opposing pairs of lenses can be formed to provide two-sided communication antennas. An array of actuator/antenna can be used (similar to bee eyes), each antenna is independently steerable to optimize 5G transmission. Fresnel lens can be used to improve SNR. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others. A learning machine such as neural network or SVM can be used over the control/management plane of the 5G network to optimize 5G parameters based on local behaviors. A movable surface can be provided on the housing to steer the antenna. The moveable surface can be liquid lens or actuator array as described above. Cameras and sensors can be positioned to capture security information. Learning machine hardware can provide local processing at the edge.

Actuator-Based Active Antenna Array

An antenna, includes an array of antenna element, each connected to a separate transceiver; an array of actuators to point the antenna elements; data converters coupled to the transceivers for up conversion and down conversion; a baseband unit (BBU) with one or more digital signal processors coupled to the data converters; and a broadband connection connecting the baseband unit to a wide area network (WAN). The system may include one or more of the following. A processor can control to change the curvature of the surface and/or to change the directionality of the antenna. The processor can calibrate the RF link between the tower and the client device. The processor can calibrate the connection by examining the RSSI and TSSI and scan the moveable lens until the optimal RSSI/TSSI levels (or other cellular parameters) are reached. The scanning of the target client/device can be done by injecting or removing liquid from moveable surface, or can be done by moving actuators coupled to the surface. Opposing pairs of lenses can be formed to provide two-sided communication antennas. An array of actuator/antenna can be used (similar to bee eyes), each antenna is independently steerable to optimize 5G transmission. Fresnel lens can be used to improve SNR. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

A learning machine such as neural network or SVM can be used over the control/management plane of the 5G network to optimize 5G parameters based on local behaviors. The learning machine can be used to help steering the antennas to improve connections with UEs. The learning machine can also optimize operation based on data collected from other elements in the transceiver and/or the BBU. The broadband connection can be fiber optic or wireless connection (UWB). The baseband unit can have a high-speed serial link as defined by the Common Public Radio Interface (CPRI), Open Base Station Architecture Initiative (OBSAI), or Open Radio Interface (ORI). The high speed serial link is used to transport the Tx and Rx signals from the BBU to the antennas. The AAS can have passive cooling fins on the housing, or can use evaporative cooling techniques, for example with an enhanced boiling or evaporation microstructure surface including microporous structures; and an electro-deposited surface to enhance a vapor condensation rate, wherein the surface includes a porous medium to replenish condensed liquid back to the microstructure surface by capillary pumping force, wherein the surface is part of an antenna. Since there are many more transceivers/amplifiers in an AAS, each amplifier in an AAS delivers a much lower power when compared to an amplifier in an equivalent RRH.

Beamforming Actuator Driven Active Antenna to Track Moving Ues

A method of communicating data with a UE using an array antenna onboard a cell tower and having a digital beam former (DBF), said array antenna having a plurality of actuators moving the RF radiating elements for providing steerable antenna beams within an antenna footprint region, said DBF providing for each radiating element, beam forming coefficients for controlling characteristics of said steerable antenna beams. The method includes receiving a signal from the UE within a receive one of said steerable antenna beams; determining a location direction of the UE using said signal; generating digital beam forming coefficients to provide a transmit one of said steerable antenna beams in said location direction of the UE; transmitting data from said cell tower to said UE within said one transmit steerable antenna beam; tracking said location direction of said UI as said cell tower and said UE move relative to each other; adjusting said beam forming coefficients associated with one transmit steerable antenna beam in response to the tracking step to maintain said one transmit steerable antenna beam in the location direction of said UE; further adjusting said beam forming coefficients associated with one transmit steerable antenna beam to improve a signal quality of communication signal received at said communication station. The system may include one or more of the following. The antenna arrays can have shape shifting or moving surfaces to directionally aim the antennas. The system remaps the beams to avoid obstructions or issues that affect 5G/6G transmissions. The Beams can also be changed according to load, usage, time of day, or other factors. The processor can calibrate the connection by examining the RSSI and TSSI and scan the antenna actuators or moveable lens until the optimal RSSI/TSSI levels (or other cellular parameters) are reached. The scanning of the target client/device can be done by injecting or removing liquid from moveable surface, or can be done by moving actuators coupled to the surface. Opposing pairs of lenses can be formed to provide two-sided communication antennas. An array of actuator/antenna can be used (similar to bee eyes), each antenna is independently steerable to optimize 5G transmission. Fresnel lens can be used to improve SNR. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

A learning machine such as neural network or SVM can be used over the control/management plane of the 5G network to optimize 5G parameters based on local behaviors. The learning machine can be used to help steering the antennas to improve connections with UEs. The learning machine can also optimize operation based on data collected from other elements in the transceiver and/or the BBU. The broadband connection can be fiber optic or wireless connection (UWB). The baseband unit can have a high-speed serial link as defined by the Common Public Radio Interface (CPRI), Open Base Station Architecture Initiative (OBSAI), or Open Radio Interface (ORI). The high speed serial link is used to transport the Tx and Rx signals from the BBU to the antennas. The AAS can have passive cooling fins on the housing, or can use evaporative cooling techniques, for example with an enhanced boiling or evaporation microstructure surface including microporous structures; and an electro-deposited surface to enhance a vapor condensation rate, wherein the surface includes a porous medium to replenish condensed liquid back to the microstructure surface by capillary pumping force, wherein the surface is part of an antenna. Since there are many more transceivers/amplifiers in an AAS, each amplifier in an AAS delivers a much lower power when compared to an amplifier in an equivalent RRH. Once the learning machine determines the beam sweeping patterns for antenna beams of radio nodes and/or UE devices, beam sweeping commands may be provided to individual radio nodes and/or UE devices via core network and mobile backhaul network. Radio nodes may forward beam sweeping commands to respective UE devices over a wireless channel (e.g., a wireless control channel). Additionally, network control device may prioritize particular antenna beams, where high priority beams are reserved to service users having high networking requirements. In an embodiment, high priority beams may be classified as "active" beams Beams having lower priority than active beams may be classified as "candidate" beams, which may be selected to replace active beams if necessary. Beams having lower priority than active and candidate beans may be classified as "alternative" beams, which may be used as backup beams in case an active beam is temporarily blocked and a suitable candidate beam is unavailable. In addition, the priority of beams may be updated according to the time of day, particular days or dates (e.g., workdays, weekends, holidays, etc.), and/or the time of season (to account for seasonal effects of propagation, seasonal variations of the density of users, and/or variations in objects which may block signal propagation). In addition, network control device may also use prior knowledge of prior beam sweeping patterns to influence the determination of current and/or future beam sweeping patterns. Moreover, the beam sweeping patterns associated with control signaling broadcast between radio nodes and UE devices may be adjusted differently than antenna beams associated with data bearing channels. Additionally, differences between beam sweeping patterns may be based on the beam width of individual antenna beams and/or the number of beam sweeping positions.

Multi-Level 5G/6G Antenna

An antenna system, includes a high power active antenna array mounted on a cell tower, balloon, or a drone, the high power active antenna array controlled by a BBU with a broadband connection; a plurality of medium power active antenna arrays wirelessly coupled to the high power active antenna, wherein the medium power antenna array relays data transmission between the high power active antenna array and a UE to reduce RF exposure on biologics. This reduces cancer risk on users. The system may include one or more of the following: The antenna arrays can have shape shifting or moving surfaces to directionally aim the antennas. The high power active antenna can have an array of antenna element, each connected to a separate transceiver; an array of actuators to point the antenna elements; data converters coupled to the transceivers for up conversion and down conversion; the baseband unit (BBU) with one or more digital signal processors coupled to the data converters. The processor can calibrate the connection by examining the RSSI and TSSI and scan the moveable lens until the optimal RSSI/TSSI levels (or other cellular parameters) are reached. The scanning of the target client/device can be done by injecting or removing liquid from moveable surface, or can be done by moving actuators coupled to the surface. Opposing pairs of lenses can be formed to provide two-sided communication antennas. An array of actuator/antenna can be used (similar to bee eyes), each antenna is independently steerable to optimize 5G transmission. Fresnel lens can be used to improve SNR. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

A learning machine such as neural network or SVM can be used over the control/management plane of the 5G network to optimize 5G parameters based on local behaviors. The learning machine can be used to help steering the antennas to improve connections with UEs. The learning machine can also optimize operation based on data collected from other elements in the transceiver and/or the BBU. The broadband connection can be fiber optic or wireless connection (UWB). The baseband unit can have a high-speed serial link as defined by the Common Public Radio Interface (CPRI), Open Base Station Architecture Initiative (OBSAI), or Open Radio Interface (ORI). The high speed serial link is used to transport the Tx and Rx signals from the BBU to the antennas. The AAS can have passive cooling fins on the housing, or can use evaporative cooling techniques, for example with an enhanced boiling or evaporation microstructure surface including microporous structures; and an electro-deposited surface to enhance a vapor condensation rate, wherein the surface includes a porous medium to replenish condensed liquid back to the microstructure surface by capillary pumping force, wherein the surface is part of an antenna. Since there are many more transceivers/amplifiers in an AAS, each amplifier in an AAS delivers a much lower power when compared to an amplifier in an equivalent RRH.

The medium power antenna arrays can be mounted on traffic lights or street lights as replacement lights with 5G relay capacity, and further can provide fast response time for vehicular navigation/control. The medium power antenna arrays can be mounted on car, bus, trucks, drones, local stores, mailboxes. The host for the medium power antenna can collect a usage fee in exchange.

Car/Trucknan/Busnehicle with 5G Antenna Small Cells

A system, includes a moveable vehicle including a pole and a top portion to mount 4G antennas and a 5G housing, wherein the pole is retractable and extendable during 5G operation; one or more antennas mounted on the 5G housing and in communication with a predetermined target using 5G protocols. The system may include one or more of the following: A processor can control to change the curvature of the surface and/or to change the directionality of the antenna. The processor can calibrate the RF link between the tower and the client device. The processor can calibrate the connection by examining the RSSI and TSSI and scan the moveable lens until the optimal RSSI/TSSI levels (or other cellular parameters) are reached. The scanning of the target client/device can be done by injecting or removing liquid from moveable surface, or can be done by moving actuators coupled to the surface. Opposing pairs of lenses can be formed to provide two-sided communication antennas. An array of actuator/antenna can be used (similar to bee eyes), each antenna is independently steerable to optimize 5G transmission. Fresnel lens can be used to improve SNR. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others. A learning machine such as neural network or SVM can be used over the control/management plane of the 5G network to optimize 5G parameters based on local behaviors. A movable surface can be provided on the housing to steer the antenna. The moveable surface can be liquid lens or actuator array as described above. Cameras and sensors can be positioned to capture security information. Learning machine hardware can provide local processing at the edge. A frame can be used with an antenna support structure having means to permit its collapsing and a waveguide antenna mounted to said support structure and including a plurality of integrally connected tubular waveguide cells that form a cell array that focuses transmitted signals onto a signal processing device; said lens waveguide antenna having means to permit its collapsing and a second support structure mount that operatively connects said collapsible support structure to a mounting surface to correctly position said collapsible lens waveguide antenna relative to said signal processing device when said antenna is operationally deployed. A fleet of drones can operate and navigate as a flock of birds to provide real time adjustment in coverage as needed. The flock of birds antenna has power and autonomous navigation and can self-assemble and scatter as needed to avoid physical and wireless communication obstacles.

Glider/Helicopter/Balloon/Ship/Leo Drone with 5G Antenna

A system, includes an airborne frame to mount 4G antennas and a 5G housing; one or more antennas mounted on the 5G housing and in communication with a predetermined target using 5G protocols.

The system may include one or more of the following: A processor can control to change the curvature of the surface and/or to change the directionality of the antenna. The processor can calibrate the RF link between the tower and the client device. The processor can calibrate the connection by examining the RSSI and TSSI and scan the moveable lens until the optimal RSSI/TSSI levels (or other cellular parameters) are reached. The scanning of the target client/device can be done by injecting or removing liquid from moveable surface, or can be done by moving actuators coupled to the surface. Opposing pairs of lenses can be formed to provide two-sided communication antennas. An array of actuator/antenna can be used (similar to bee eyes), each antenna is independently steerable to optimize 5G transmission. Fresnel lens can be used to improve SNR. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others. A learning machine such as neural network or SVM can be used over the control/management plane of the 5G network to optimize 5G parameters based on local behaviors. A movable surface can be provided on the housing to steer the antenna. The moveable surface can be liquid lens or actuator array as described above. Cameras and sensors can be positioned to capture security information. Learning machine hardware can provide local processing at the edge. The air frame has an antenna support structure having means to permit its collapsing and a waveguide antenna mounted to said support structure and including a plurality of integrally connected tubular waveguide cells that form a cell array that focuses transmitted signals onto a signal processing device; said lens waveguide antenna having means to permit its collapsing and a second support structure mount that operatively connects said collapsible support structure to a mounting surface to correctly position said collapsible lens waveguide antenna relative to said signal processing device when said antenna is operationally deployed. A fleet of drones can operate and navigate as a flock of birds to provide real time adjustment in coverage as needed. The flock of birds antenna has power and autonomous navigation and can self-assemble and scatter as needed to avoid physical and wireless communication obstacles. The cars/trucks/buses can carry ads as a monetization system. Alternatively, personal vehicles can be paid a percentage of the traffic relayed by their vehicles.

Cell Phone Antenna

A system, includes a cell phone housing; and one or more antennas mounted on the housing, the antenna being selectable to avoid discharging RF energy into a human body and to target RF energy at a predetermined target. The system may include one or more of the following: A processor can control to change the directionality of the antenna. The processor can calibrate the RF link between the tower and the client device. The processor can calibrate the connection by examining the RSSI and TSSI and scan the moveable lens until the optimal RSSI/TSSI levels (or other cellular parameters) are reached. The scanning of the target client/device can be done by injecting or removing liquid from moveable surface, or can be done by moving actuators coupled to the surface. Opposing pairs of lenses can be formed to provide two-sided communication antennas. An array of actuator/antenna can be used (similar to bee eyes), each antenna is independently steerable to optimize 5G transmission. Fresnel lens can be used to improve SNR. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others. A learning machine such as neural network or SVM can be used over the control/management plane of the 5G network to optimize 5G parameters based on local behaviors. A processor controlled moveable surface can be provided on the tree (such as a leaf, flower, or fruit on the tree), wherein the moveable surface can be liquid lens or actuators that move the surface as detailed above. Cameras and sensors can be positioned to capture security information. Learning machine hardware can provide local processing at the edge.

Powering of IOT Devices Using 5G Energy

An IOT system, includes a housing having a moveable surface; one or more antennas mounted on a moveable surface, wherein the antenna direction is changed by the moveable surface to receive RF energy from a small cell; a capacitor, battery or energy storage device coupled to the antennas to store received energy; and a power regulator coupled to the capacitor, battery, or energy storage A processor can control to change the directionality of the antenna. The processor can calibrate the RF link between the tower and the client device. The processor can calibrate the connection by examining the RSSI and TSSI and scan the moveable lens or actuators until the optimal RSSI/TSSI levels (or other cellular parameters) are reached. The scanning of the target client/device can be done by injecting or removing liquid from moveable surface, or can be done by moving actuators coupled to the surface. Opposing pairs of lenses can be formed to provide two-sided communication antennas. An array of actuator/antenna can be used (similar to bee eyes), each antenna is independently steerable to optimize 5G transmission. Fresnel lens can be used to improve SNR. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others. A learning machine such as neural network or SVM can be used over the control/management plane of the 5G network to optimize 5G parameters based on local behaviors. A processor controlled moveable surface can be provided on the tree (such as a leaf, flower, or fruit on the tree), wherein the moveable surface can be liquid lens or actuators that move the surface as detailed above. Cameras and sensors can be positioned to capture security information. Learning machine hardware can provide local processing at the edge.

Antenna with Evaporative Cooling

A heat spreader to cool a heated region of a device, includes an enhanced boiling or evaporation microstructure surface including microporous structures; and an electrodepo sited surface to enhance a vapor condensation rate, wherein the surface includes a porous medium to replenish condensed liquid back to the microstructure surface by capillary pumping force, wherein the surface is part of an antenna. In implementations, each surface comprises a plate. The electro-deposited surfaces utilize boiling (evaporation), condensation, and capillary pumping action. Liquid is vaporized or boiled from the electro-deposited surface designed for boiling (evaporation) enhancement. Vapor is condensed at the enhanced surface for condensation. The enhanced surface for condensation is formed by electro-deposition. Condensed liquid is supplied back to the heated region by another electro-deposited surface aimed for capillary pumping action. One or more structures are mounted on at least one of the opposing surfaces. The first and second opposing surfaces are separated by a small gap. The first and second opposing surface have a first separation distance above a predetermined region on device and a second separation distance surrounding the predetermined region and wherein the second separation distance is larger than the first separation distance.

A method to cool an electronic device includes forming an enhanced boiling or evaporation surface including microporous structures; forming an electro-deposited surface to improve a condensation rate of vapor, wherein the surface includes a porous medium to replenish condensed liquid back to the first surface by capillary pumping force; and communicating radio signal using the other side of the condensation surface. In implementation, the method includes improving a heat transfer coefficient in a low-profile vapor chamber using wick structures having projections formed by electrodepositing a metal on the target surfaces at a first current density followed by strengthening at one or more second current densities lower than the first current density. Projections are formed with nucleate boiling cavities on the surface from local heating source, increased capillary pumping action of the wick structure, and augmented condensation rate of vapors. The electronic device is cooled using a combination of nucleate boiling (evaporation), capillary pumping action, and condensation. A two-phase cooling chamber is famed with integrated electro-deposited surfaces that utilize boiling (evaporation), condensation, and capillary pumping action. The method, includes vaporizing a liquid into a vapor from a heated region thermally coupled to a first electro-deposited surface designed for boiling (evaporation) enhancement; condensing the vapor at an enhanced surface for condensation by a second electro-deposited surface; returning the condensed liquid to the heated region through capillary pumping action by the second electro-deposited surface. The method includes enclosing both surfaces in a thin circular, square, or rectangular housing for heat spreading. One or more supporting structures are formed on one surface to provide mechanical strength that prevents bending of the surface and structure built thereon.

A streamlined flow pattern is induced by nucleate boiling with a predetermined structure shape. A two-phase cooling chamber to cool a heated region, includes an enhanced boiling or evaporation microstructure surface including microporous structures; and an electro-deposited surface to enhance a vapor condensation rate, wherein the surface includes a porous medium to replenish condensed liquid back to the microstructure surface by capillary pumping force, wherein the electro-deposited surfaces utilize boiling or evaporation, condensation, and capillary pumping action. Liquid is vaporized or boiled from the electro-deposited surface designed for boiling or evaporation enhancement, then the vapor will be condensed at the enhanced surface for condensation and wherein the condensed liquid is supplied back to the heated region by an electro-deposited surface aimed for capillary pumping action.

Low Orbit Drone with Active Antennas

A system, includes an airborne frame to mount 4G antennas and a 5G housing; a variable buoyancy propulsion with a combination of a lighter than air chamber and a compressed gas chamber to propel the airborne frame; and one or more antennas mounted on the 5G housing and in communication with a predetermined target using 5G protocols. The system may include one or more of the following: A processor can control to change the curvature of the surface and/or to change the directionality of the antenna. The processor can calibrate the RF link between the tower and the client device. The processor can calibrate the connection by examining the RSSI and TSSI and scan the moveable lens until the optimal RSSI/TSSI levels (or other cellular parameters) are reached. The scanning of the target client/device can be done by injecting or removing liquid from moveable surface, or can be done by moving actuators coupled to the surface. Opposing pairs of lenses can be formed to provide two-sided communication antennas. An array of actuator/antenna can be used (similar to bee eyes), each antenna is independently steerable to optimize 5G transmission. Fresnel lens can be used to improve SNR. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others. A learning machine such as neural network or SVM can be used over the control/management plane of the 5G network to optimize 5G parameters based on local behaviors. A movable surface can be provided on the housing to steer the antenna. The moveable surface can be liquid lens or actuator array as described above. Cameras and sensors can be positioned to capture security information. Learning machine hardware can provide local processing at the edge. The air frame has an antenna support structure having means to permit its collapsing and a waveguide antenna mounted to said support structure and including a plurality of integrally connected tubular waveguide cells that form a cell array that focuses transmitted signals onto a signal processing device; said lens waveguide antenna having means to permit its collapsing and a second support structure mount that operatively connects said collapsible support structure to a mounting surface to correctly position said collapsible lens waveguide antenna relative to said signal processing device when said antenna is operationally deployed. A fleet of drones can operate and navigate as a flock of birds to provide real time adjustment in coverage as needed. The flock of birds antenna has power and autonomous navigation and can self-assemble and scatter as needed to avoid physical and wireless communication obstacles. A refueling drone can be used to supply the GBS with power by swap battery with the GBS or refueling the hydrogen fuel cells, where the refueling drone designed for boom-type transfers in which a boom controller extends and maneuvers a boom to establish a connection to transfer hydrogen fuel from the refueling drone to the refueling drone. Prior to refueling, the refueling drone extends a refueling probe. The refueling drone includes a navigation system that may be used for positioning the refueling drone during aerial refueling.

The GBS navigation system provides inertial and Global Positioning System (GPS) measurement data to the refueling drone via a data link. Relative positioning can be used to navigate both crafts.

BRIEF DESCRIPTION OF THE DRAWINGS

FIGS. 1A-1E show an exemplary 5G network architecture, while

FIGS. 2A-2B show an exemplary city light small cell environment with crime/pollution sniffing capabilities.

FIGS. 2H-2I show exemplary antenna systems.

DESCRIPTION

Figure 1A:
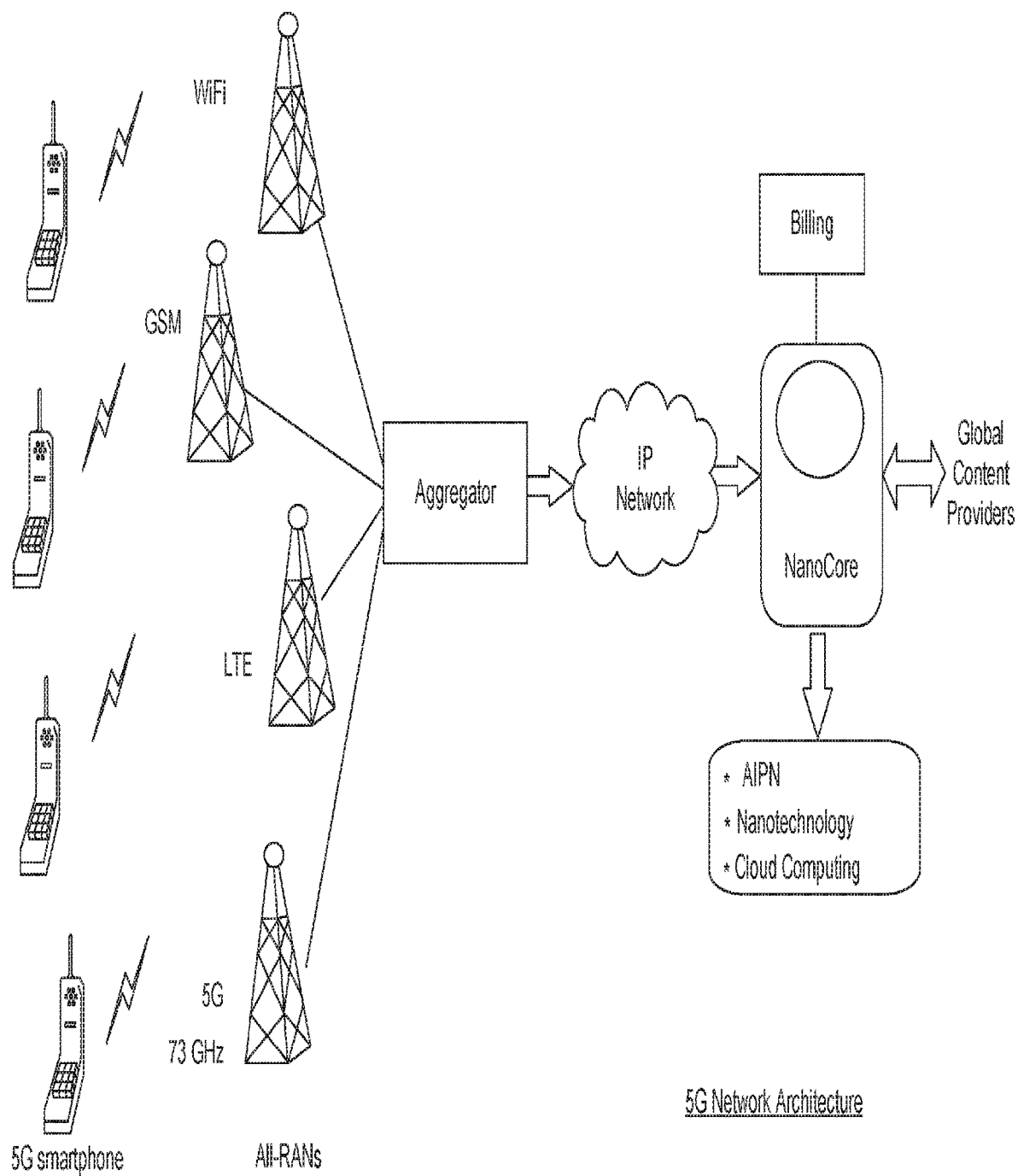
Figure 1B:
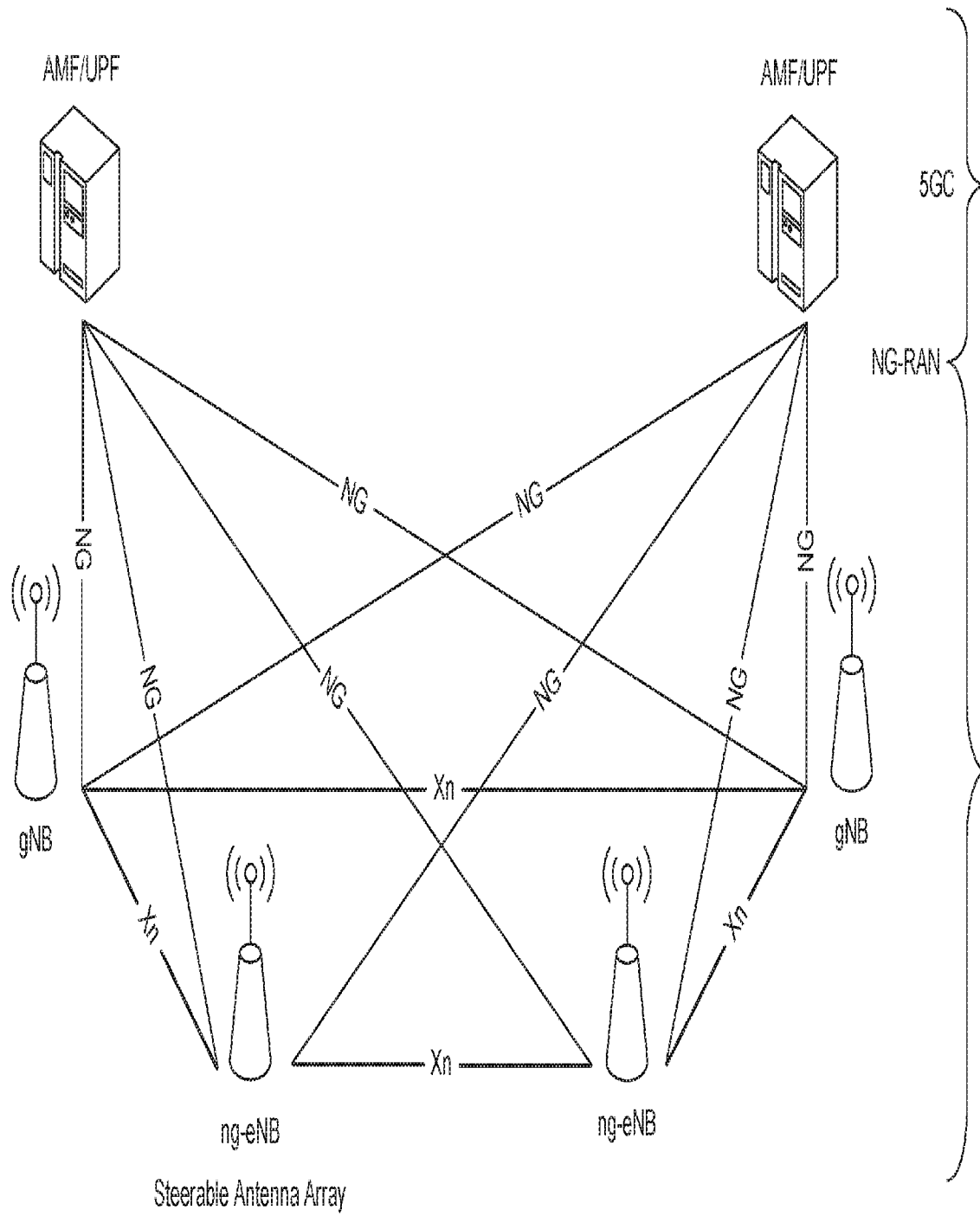
Figure 1C:
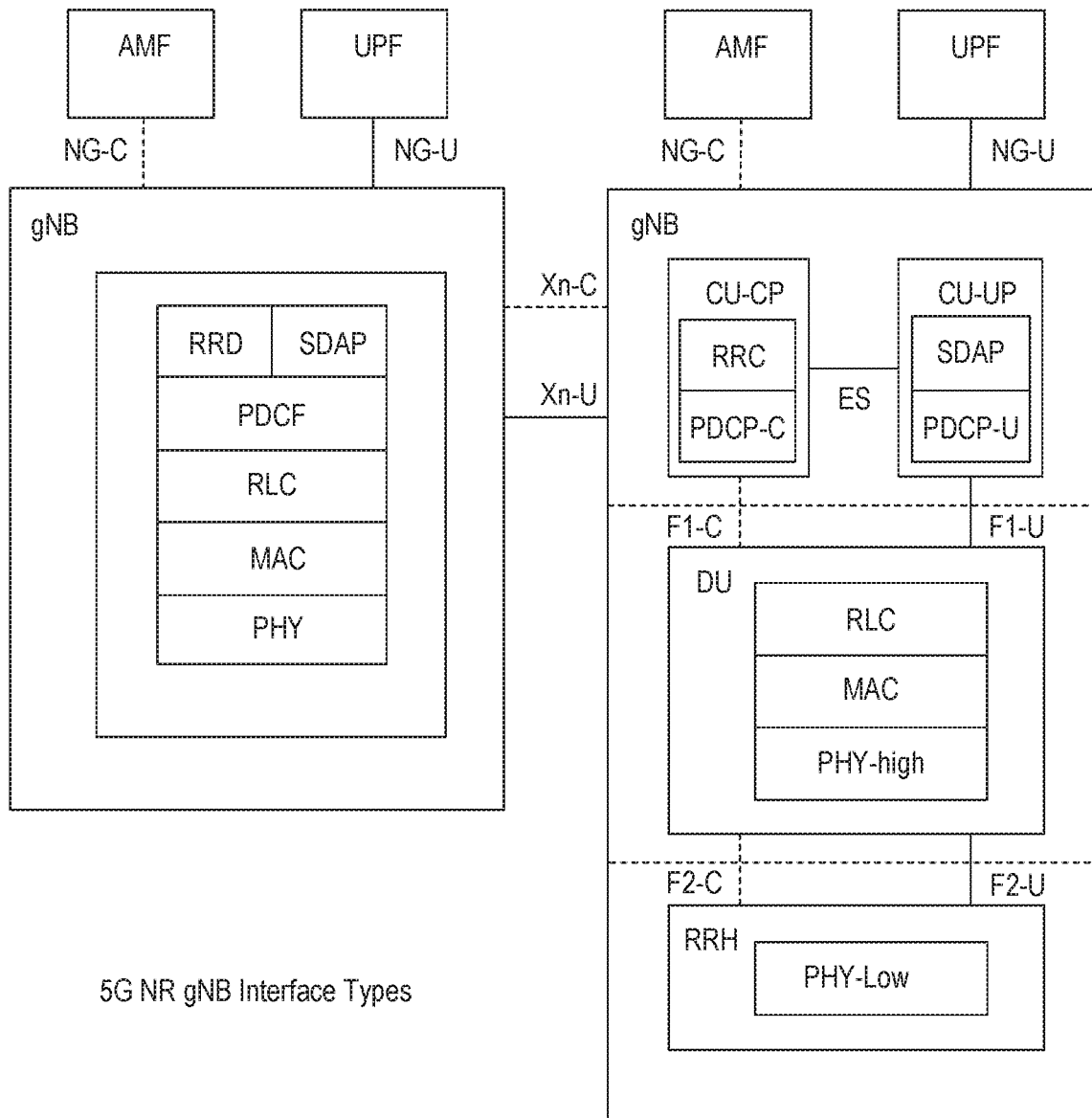

FIGS. 1A-1D shows an exemplary 5G network architecture. A plurality of phones running 2G, 3G, 4G and 5G communication with wireless RANs. The radio access network (RAN) has been in use since the beginning of cellular technology and has evolved through the generations of mobile communications (1G, 2G, 3G, 4G, and in anticipation of the forthcoming 5G). Components of the RAN include a base station and antennas that cover a given region depending on their capacity. In a RAN, radio sites provide radio access and coordinate management of resources across the radio sites. A device is wirelessly connected to the core network, and the RAN transmits its signal to various wireless endpoints, and the signal travels with other networks' traffic. Two types of radio access networks are Generic Radio Access Network (GRAN), which uses base transmission stations and controllers to manage radio links for circuit-switched and packet-switched core networks; and GSM Edge Radio Access Network (GERAN), which supports real-time packet data. Two other types of radio access networks are UMTS Terrestrial Radio Access Network (UTRAN), which supports both circuit-switched and packet-switched services; and Evolved Universal Terrestrial Radio Access Network (E-UTRAN), which focuses only on packet-switched services. E-UTRAN also provides high data rates and low latency. The RAN's controller controls the nodes that are connected to it. The network controller performs radio resource management, mobility management, and data encryption. It connects to the circuit-switched core network and the packet-switched core network, depending on the type of RAN. The RAN architectures separate the user plane from the control plane into different network elements. In this scenario, the RAN controller can exchange user data messages through one software-defined networking (SDN) switch, and a second set with base stations via a second control-based interface. This separation of the control plane and data plane will be an essential aspect of the flexible 5G radio access network, as it aligns with SDN and network functions virtualization (NFV) techniques such as service chaining and network slicing.

In one implementation of one or more gNBs and one or more UEs in which systems and methods for supporting ultra-reliable low-latency communication (URLLC) service and associated numerologies in fifth generation (5G) New Radio (NR) may be implemented. The one or more UEs communicate with one or more gNBs using one or more physical antennas. For example, a UE transmits electromagnetic signals to the gNB and receives electromagnetic signals from the gNB using the one or more physical antennas. The gNB communicates with the UE using one or more physical antennas.

The UE and the gNB may use one or more channels and/or one or more signals to communicate with each other. For example, the UE may transmit information or data to the gNB using one or more uplink channels. Examples of uplink channels include a physical shared channel (e.g., PUSCH (Physical Uplink Shared Channel)), and/or a physical control channel (e.g., PUCCH (Physical Uplink Control Channel)), etc. The one or more gNBs may also transmit information or data to the one or more UEs using one or more downlink channels, for instance. Examples of downlink channels physical shared channel (e.g., PDSCH (Physical Downlink Shared Channel), and/or a physical control channel (PDCCH (Physical Downlink Control Channel)), etc. Other kinds of channels and/or signals may be used.

Each of the one or more UEs may include one or more transceivers, one or more demodulators, one or more decoders, one or more encoders, one or more modulators, a data buffer and a UE operations module. For example, one or more reception and/or transmission paths may be implemented in the UE. The transceiver may include one or more receivers and one or more transmitters. The one or more receivers may receive signals from the gNB using one or more antennas. For example, the receiver 120 may receive and downconvert signals to produce one or more received signals. The one or more received signals may be provided to a demodulator. The one or more transmitters may transmit signals to the gNB using one or more physical antennas. For example, the one or more transmitters may upconvert and transmit one or more modulated signals.

The demodulator may demodulate the one or more received signals to produce one or more demodulated signals. The one or more demodulated signals may be provided to the decoder. The UE may use the decoder to decode signals. The decoder may produce decoded signals, which may include a UE-decoded signal (also referred to as a first DE-decoded signal). For example, the first DE-decoded signal may comprise received payload data, which may be stored in a data buffer. Another signal included in the decoded signals (also referred to as a second DE-decoded signal) may comprise overhead data and/or control data. For example, the second DE-decoded signal may provide data that may be used by the UE operations module to perform one or more operations. In general, the UE operations module may enable the UE to communicate with the one or more gNBs. The UE operations module may include one or more of a UE URLLC module. With regard to NR, some considerations with SR include traffic characteristics, logical channel/logical channel group, the amount of data available, information related to numerology and/or Transmission Time Interval (TTI) duration, and the priority of data.

Short latency in NR may be important to support services like URLLC. This may impact the design of the SR. The design of the SR in a multi-numerology/TT! duration configuration also influences the latency. With regard to NR, some considerations for SR latency and periodicity include: major design changes related to SR latency and periodicity compared to LTE; what is the impact from the NR latency requirements; what is the impact from a multiple numerology/TT! duration configuration; and what is the impact from other functions designed to reduce latency (e.g., grant-free transmissions and Semi-Persistent Scheduling (SPS)).

The function of the Buffer Status Report (BSR) in LTE is for the UE to report the amount of available data in the UE to the eNB. The eNB can then use this information to set the size of the UL grant. Logical channels are grouped together in logical channel groups (LCGs). A BSR is triggered if data becomes available in an LCG and all other LCGs have no data, or if data belonging to a logical channel with a higher priority than all other LCGs becomes available, or if there is room in the MAC Protocol Data Unit (PDU) to send a BSR instead of padding. There may be two timers which upon expiry trigger BSR. A BSR contains information on the amount of data available per logical channel group. The BSR is carried as a MAC control element (CE) in a MAC PDU. Like the SR, the design of the BSR for NR may be impacted by the multi-numerology/TT! duration configuration supported in NR. The systems and methods described herein provide mechanisms for BSR for NR. Uplink scheduling is a key functionality to meet a broad range of use cases including enhanced mobile broadband, massive MTC, critical MTC, and additional requirements. Buffer Status Reports (BSRs) on the other hand carry more detailed information compared to SR. A BSR indicates buffer size for each LCG. However, the BSR requires a grant for transmission so it may take a longer time until the gNB receives it since it may need to be preceded by an SR. The framework with SR/BSR from LTE may be improved. In an approach, the SR/BSR scheme from LTE can be reused in NR as a baseline. NR should support a wide spread of use cases which have different requirements. In some use cases (e.g., critical MTC and URLLC), NR has tighter latency requirements than has been considered for LTE so far. Also, services such as eMBB can enjoy the enhancements to SR and BSR. In NR, modifications of SR/BSR aim to report the UE buffer status (e.g., priority and the buffer size) as well as wanted numerology/TT! duration within the given time constraints. It is assumed that a mapping of logical channel (LCH) to LCG to numerology/TT! duration will make it possible to infer which numerology/TT! duration to use given the LCG. Hence no explicit signaling of numerology/TT! duration is needed in the SR/BSR if an LCG (or LCH) is present in the SR/BSR. Considering the limitations identified above, it is possible to either enhance SR with more information bits to indicate more information or enhance BSR.

URLLC provides 1 ms end-to-end radio link latency and guaranteed minimum reliability of 99.999%, which are crucial for some URLLC use cases. Some URLLC uses cases are described herein and how they map to requirements at a high level. A URLLC terminal (e.g., UE) will get a benefit from packet duplication. Radio Link Control (RLC) retransmission (ARQ) is not assumed to be used for meeting the strict user plane latency requirements of URLLC. A URLLC device MAC entity may be supported by more than one numerology/TT! durations. The NR design aims to meet the URLLC QoS requirements only after the control plane signaling for session setup has completed (to eliminate the case that the UE is initially in idle). Discontinuous reception (DRX) design will not optimize for URLLC service requirements. For DL, dynamic resource sharing between URLLC and eMBB is supported by transmitting URLLC scheduled traffic. URLLC transmission may occur in resources scheduled for ongoing eMBB traffic. Asynchronous and adaptive HARQ is supported for URLLC DL. At least an UL transmission scheme without grant is supported for URLLC. Resources may or may not be shared among one or more users.

In an implementation, mini-slots have the following lengths. At least above 6 GHz, mini-slot with length 1 symbol supported. Lengths from 2 to slot length–1 may be supported. It should be noted that some UEs 102 targeting certain use cases may not support all mini-slot lengths and all starting positions. Mini-slots can start at any OFDM symbol, at least above 6 GHz. A mini-slot may contain Demodulation RS(s) (DM-RS) at position(s) relative to the start of the mini-slot.

A wide range of URLLC use cases may be supported by NR. 5G aims to support a broad range of use cases (or services) and enable ground-breaking performance of the URLLC devices (e.g., robots, smart cars, etc.). Some URLLC applications are discussed herein.

One URLLC use case is robotics. 5G needs to improve the response time for diagnostic situations. For instance, in the near future, robots will be very low-cost, since robots will only carry around a set of sensors, cameras, actuators and mobility control units. All the intelligent computation system, requiring expensive hardware, may be remotely run on an edge cloud.

The sensors and cameras on the robots may be used to monitor the environment and capture the data in real time. The captured data will be immediately transmitted to a central system in a few milliseconds. The center processes the data in an intelligent way (e.g., based on machine learning and AI (artificial intelligent) algorithms) and makes decisions for the robots. The decision/commands may be delivered to the robot very quickly and the robots will follow the instructions.

The targeted maximum round trip time for this kind of robotic scenario is 1 ms. This may include starting with capturing data, transmitting the data to the center, progressing data on the center and sending the command to the robot, and running the received command.

Another URLLC use case is industrial automation. Industrial automation (together with MTC) is one of the key applications that are considered within 5G systems. Current industrial control systems rely on fast and reliable wired links. However, there exists a large interest in utilizing flexible wireless systems provided by 5G in the future.

This use case considers a combined indoor factory environment, where a number of objects (e.g., robots, self-driving heavy machines, etc.) perform various dedicated tasks as parts of a production process. All these objects are controlled by a production center. These kinds of industrial applications require a guaranteed reliability, higher data rate and minimum end-to-end latency within various control processes.

Another URLLC use case is remote surgery and health care. Remote surgery can be considered as another 5G URLLC use case. With a sense of touch, 5G can enable a surgeon to diagnose (e.g., identify cancerous tissue) where the specialist and the patient physically are not able to be present in the same room/environment.

In this 5G medical use case, there may be a robotic end which in real time will provide the sense of touch to the surgeon during a minimally invasive surgery. The sense of touch will be captured at the robotic end and, with a latency of few milliseconds, the sensed data will be reflected to the surgeon who is at the other end and wears haptic gloves. On top of that, the surgeon needs to be able to remotely control the robotic end as well in a visualized environment. In the remote surgery scenario, the e2e latency is ideally in the order of several milliseconds.

Another URLLC use case is interactive augmented-virtual reality. A high-resolution augmented-virtual reality system is an efficient way to display a real or manipulated environment in three-dimensions for educational purposes, for instance. In one scenario, a number of trainees are connected in a virtualized real environment/system simulator, where the trainees are able to jointly/collaboratively interact with each other by perceiving the same environment and the same artificial subjects and objects. Since the scenario requires interaction between the trainees in real time, the targeted round-trip time from trainee to the simulator and from simulator back to the trainee should be in the order of milliseconds and not exceed human perception time.

Another URLLC use case is smart vehicles, transport and infrastructure. Self-Driving vehicles can be interpreted as automated driving where vehicle-to-infrastructure (e.g., smart bus stop, smart traffic lights, etc.) and vehicle-to-vehicle real-time communication is required. All these communications can be coordinated in real time by a centralized system (e.g., Intelligent Traffic Management Center (ITMC)).

In such a scenario, the ITMC aims to estimate hazardous conditions well in advance and decrease the risk of traffic accidents. As an example, as an intelligent system, the ITMC can monitor attributes of the objects in the traffic based on the object's received data. By doing that, fatal situations will be anticipated and the system will interact directly (e.g., steer vehicles) even before the drivers to prevent accidents. In this kind of traffic scenario, round-trip latencies from vehicles to ITMC and ITMC to the vehicles in the order of milliseconds will increase the traffic safety.

Another URLLC use case is drones and aircraft communication. Drones are getting increasingly important, especially in the surveillance, public safety and media domain. All of these domains come under the critical communication with strict requirements on latency and reliability. The motivation for such requirements varies from mission criticality to monetary benefits (e.g., coverage of sports events using drones leading to in-demand content with high copyrights cost).

Latency and reliability are key factors to control the drones given the nature of use cases considered. Similarly, aircraft communication is also being considered using NR which also demands the highest standard of reliability and strict latency requirements. The long distances and mobility aspects together with latency and reliability requirements present challenges in this use case.

As observed by these use cases, in some URLLC scenarios, mobility is a key requirement together with latency and reliability. A core need of each URLLC use case is reliability and latency and these needs should have precedence over resource efficiency due to criticality of the scenarios.

Both International Telecommunication Union (ITU) and 3GPP have defined a set of requirements for 5G, including URLLC. For URLLC reliability, the requirement is the same, whereas for URLLC latency, 3GPP places a stricter requirement of 0.5 ms one-way end-to-end latency in UL and DL, compared to 1 ms in ITU.

3GPP has agreed on the following relevant requirements. Reliability can be evaluated by the success probability of transmitting X bytes within a certain delay, which is the time it takes to deliver a small data packet from the radio protocol layer 2/3 SDU ingress point to the radio protocol layer 2/3 SDU egress point of the radio interface, at a certain channel quality (e.g., coverage-edge). A general URLLC reliability requirement for one transmission of a packet is 1-105 for 32 bytes with a user plane latency of 1 ms.

User plane (UP) latency can be described as the time it takes to successfully deliver an application layer packet/message from the radio protocol layer 2/3 SDU ingress point to the radio protocol layer 2/3 SDU egress point via the radio interface in both uplink and downlink directions, where neither device nor base station reception is restricted by DRX. For URLLC, the target for user plane latency should be 0.5 ms for UL, and 0.5 ms for DL. Furthermore, if possible, the latency should also be low enough to support the use of the next generation access technologies as a wireless transport technology that can be used within the next generation access architecture. The value above should be considered an average value and does not have an associated high reliability requirement.

According to IMT 2020, LTE Rel-15 should be able to separately fulfill low latency and reliability requirements. Low latency may be defined as the one-way time it takes to successfully deliver an application layer packet/message from the radio protocol layer 2/3 SDU ingress point to the radio protocol layer 2/3 SDU egress point of the radio interface in either uplink or downlink in the network for a given service in unloaded conditions, assuming the mobile station is in the active state. In IMT 2020, the minimum requirements for user plane latency is 1 ms for URLLC.

Reliability may be defined as the success probability of transmitting a layer 2/3 packet within a required maximum time, which is the time it takes to deliver a small data packet from the radio protocol layer 2/3 SDU ingress point to the radio protocol layer 2/3 SDU egress point of the radio interface at a certain channel quality (e.g., coverage-edge). This requirement is defined for the purpose of evaluation in the related URLLC test environment.

The minimum requirement for the reliability is 1-10-5 success probability of transmitting a data packet of size (e.g., 20 bytes) bytes within 1 ms in channel quality of coverage edge for the Urban macro-URLLC test environment.

Apart from the ITU and 3GPP requirements, there are other interesting combinations of latency and reliability that may apply to future use cases. One such case is a wide-area scenario with a more relaxed latency but with high reliability. Therefore, we argue that a network should be able to configure a wide range of latency-reliability settings. To enable this, several different technological components may be considered for URLLC. Therefore, URLLC may fulfil IMT 2020 requirements and also a wider range of requirements relevant for future use cases.

As mentioned above, a wide range of performance requirements calls for a set of tools for the network to apply according to use case and scenario. At the physical layer, this can include enhanced coding, diversity, repetitions, and extra robust control and feedback. At higher layers, the focus is fast and reliable scheduling, data duplication, and mobility robustness.

Diversity is a key to achieve high reliability. Whereas one single transmission (including control message) can be robust (e.g., low BLER), it requires a very low code rate and therefore wide allocations to reach the target. With diversity, the transmission is spread out in time, space, and frequency, exploiting variations in the channel to maximize the signal.

In time domain, at least two main options may be employed. One option is that the transmission is extended over more OFDM symbols and thereby the code rate is reduced. Alternatively, the transmission is repeated. A repetition can be automatic (bundled transmissions), or a retransmission triggered by feedback.

In frequency domain, the transmission of control and data may be repeated on multiple carriers to exploit frequency diversity of the channel. Frequency repetition of data can be done on lower layers (e.g., MAC) or in higher layers (e.g., PDCP). Another possibility for achieving frequency diversity is to spread out parts of the transmissions over a wider bandwidth.

For UL transmissions, the basic access may be based on a scheduling request (SR). The SR may be followed by an UL grant, and only after receiving this grant can the UE transmit UL data. The two first transmissions (SR and grant) cause an extra delay, which may be an issue for delay sensitive traffic.

Latency reduction is a feature in LTE-14 to scale down the minimum schedulable time unit so that the absolute time duration of the first two transmissions is scaled down proportionally. Similar principles can be applied to 5G with tools such as higher numerology. This, in principle, can satisfy the latency requirements and allow several HARQ retransmissions round-trip-time that further enhance the reliability. However, with higher numerology, it poses challenges to support wide-area deployment with power-limited UEs 102 and requires a larger bandwidth. Last but not the least, additional works to enhance reliability for SR and UL grant are required.

As an alternative, the UL grant can be configured (e.g., like SPS UL) with skip padding in LTE. This may be referred to as "Fast UL." With Fast UL, the UE has a configured UL grant that it may use when it has UL data. In this setup, the UL latency is similar to that of DL, making it an important enhancement for URLLC.

Given the large BW allocations expected for URLLC UL traffic, a configured grant where the gNB 160 pre-allocates a part of the band to a UE can lead to UL capacity problems. This leads to even larger resource waste if the URLLC UL traffic is less frequent and sporadic. This issue can be solved if the same time-frequency resource can be given to multiple UEs 102.

Collisions may occur in contention-based access. To satisfy the strict URLLC requirements, resolutions must be resolved in a reliable way and remedial solutions may be in place in the event of the collisions. As a baseline, reliable UE identification should be available for contention-based access in the case of collided transmissions. After detecting the collision, fast switching to grant-based resources should be available. In addition, automatic repetitions with a pre-defined hopping pattern can reduce requirements on collision probability and UE identification detection.

The requirement on latency and reliability is not only for static UEs 102, but also for UEs 102 with different mobility levels for different use cases.

Increased robustness can be achieved at higher layers by transmitting duplicates of the data in either the spatial domain (e.g., Dual Connectivity), frequency domain (e.g., Carrier Aggregation), or in time domain with MAC/RLC layer duplication. Optionally, without duplication, better reception quality can be achieved by properly selecting between a set of available connecting links (e.g., Multiple Connectivity).

In another aspect, a buffer status reporting (BSR) procedure may be used to provide the serving eNB 160 with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signaling logical Channel Group, which allocates the logical channel to a Logical Channel Group (LCG).

For the Buffer Status reporting procedure, the MAC entity may consider radio bearers that are not suspended and may consider radio bearers that are suspended. For narrowband Internet of Things (NB-IoT), the Long BSR is not supported and all logical channels belong to one LCG.

A (BSR) may be triggered if any of the following events occur. A BSR may be triggered if UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG. In this case, the BSR may be referred to as a "Regular BSR."

A BSR may also be triggered if UL resources are allocated and the number of padding bits is equal to or larger than the size of the BSR MAC control element plus its sub header. In this case, the BSR may be referred to as a "Padding BSR."

A BSR may also be triggered if the retxBSR-Timer expires and the MAC entity has data available for transmission for any of the logical channels which belong to a LCG. In this case, the BSR may be referred to as a "Regular BSR."

A BSR may also be triggered if a periodicBSR-Timer expires. In this case, the BSR may be referred to as a "Periodic BSR."

For a Regular BSR, if the BSR is triggered due to data becoming available for transmission for a logical channel for which logicalChannelSR-ProhibitTimer is configured by upper layers, a UE may start or restart the logicalChannelSR-ProhibitTimer. Otherwise, if running, the UE may stop the logicalChannelSRProhibitTimer.

For Regular and Periodic BSR, if more than one LCG has data available for transmission in the TTI where the BSR is transmitted, the UE may report a Long BSR. Otherwise, the UE may report a Short BSR.

For a Padding BSR, if the number of padding bits is equal to or larger than the size of the Short BSR plus its sub header but smaller than the size of the Long BSR plus its sub header and if more than one LCG has data available for transmission in the TTI where the BSR is transmitted, the UE may report a truncated BSR of the LCG with the highest priority logical channel with data available for transmission. Otherwise, the UE may report a Short BSR. If the number of padding bits is equal to or larger than the size of the Long BSR plus its subheader, the UE may report a long BSR.

If the BSR procedure determines that at least one BSR has been triggered and not cancelled and if the MAC entity has UL resources allocated for new transmission for this TTI, then the UE may instruct the Multiplexing and Assembly procedure to generate the BSR MAC control element(s). The UE may start or restart the periodicBSR-Timer except when all the generated BSRs are Truncated BSRs. The UE may start or restart a retxBSR-Timer.

If a Regular BSR has been triggered and logicalChannelSR-ProhibitTimer is not running, and if an uplink grant is not configured or the Regular BSR was not triggered due to data becoming available for transmission for a logical channel for which logical channel SR masking (logicalChannelSR-Mask) is setup by upper layers, then a Scheduling Request may be triggered.

A MAC PDU may contain at most one MAC BSR control element, even when multiple events trigger a BSR by the time a BSR can be transmitted in which case the Regular BSR and the Periodic BSR have precedence over the padding BSR. The MAC entity shall restart retxBSR-Timer upon indication of a grant for transmission of new data on any UL-SCH.

All triggered BSRs may be cancelled in case the UL grant(s) in this TTI can accommodate all pending data available for transmission but is not sufficient to additionally accommodate the BSR MAC control element plus its subheader. All triggered BSRs may be cancelled when a BSR is included in a MAC PDU for transmission.

The MAC entity may transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI may reflect the buffer status after all MAC PDUs have been built for this TTI. Each LCG may report at the most one buffer status value per TTI and this value may be reported in all BSRs reporting buffer status for this LCG.

It should be noted that padding BSR is not allowed to cancel a triggered Regular/Periodic BSR, except for NB-IoT. A Padding BSR is triggered for a specific MAC PDU only and the trigger may be cancelled when this MAC PDU has been built.

A MAC PDU is a bit string that is byte aligned (i.e., multiple of 8 bits) in length. As described herein, bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU is represented with the first and most significant bit in the leftmost bit and the last and least significant bit in the rightmost bit.

MAC SDUs are bit strings that are byte-aligned (i.e., multiple of 8 bits) in length. An SDU is included into a MAC PDU from the first bit onward. The MAC entity may ignore the value of Reserved bits in downlink MAC PDUs.

A MAC PDU includes a MAC header, zero or more MAC Service Data Units (MAC SDU), zero, or more MAC control elements, and optionally padding, as illustrated in FIG. 4. Both the MAC header and the MAC SDUs may be of variable sizes. A MAC PDU header may include one or more MAC PDU subheaders. Each subheader may correspond to either a MAC SDU, a MAC control element or padding.

Examples of MAC PDU subheaders are described in connection with FIG. 5.

A MAC PDU subheader may include the five or six header fields R/F2/E/LCID/(F)/L but for the last subheader in the MAC PDU and for fixed sized MAC control elements. The last subheader in the MAC PDU and subheaders for fixed sized MAC control elements may include the four header fields R/F2/E/LCID. A MAC PDU subheader corresponding to padding includes the four header fields R/F2/E/LCID.

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes are allowed. When single-byte or two-byte padding is required, one or two MAC PDU subheaders corresponding to padding are placed at the beginning of the MAC PDU before any other MAC PDU subheader. A maximum of one MAC PDU can be transmitted per Transport Block (TB) per MAC entity. A maximum of one MCH MAC PDU can be transmitted per TTI.

In the system of FIG. 1A-1D, multiple-input, multiple-output antenna systems coordinate two or four antennas at a time to simultaneously send data over the same radio channel, increasing data speeds. A phone might have a 4×2 MIMO system with 4 receiving (downloading) antennas and 2 transmitting (uploading) antennas, with up to an 8×8 array for 5G. To address multiple customers at once, new cell towers will include "massive" 128-antenna arrays with 64 receiving and 64 transmitting antennas. In one embodiment, each antenna of the phone and the cell tower is individually steerable. The steering can be done using individual motor/actuator, or can be done as a small group of 2×2 antennas on the cell tower that communicate with a particular phone. A group of antennas can be coordinated to beam at each other. This can be done using neural network or machine learning to provide real time beam steering. Moreover, the antennas support carrier aggregation that enables a radio to increase data capacity. Known as "channel bonding," 5G supports aggregation of up to 16 channels at once, including mixes of separate 4G and 5G frequencies. As used herein, beam sweeping may be broadly defined to include steering, pointing, or directing an antenna beam, electronically and/or mechanically, to provide coverage to a desired region in a service area. Beam sweeping may be commonly applied to both transmission and reception beams, or separate controls may be applied independently to the transmission beam and reception beam. As used herein, the transmission beam is the antenna beam used to provide gain and directivity to the transmission signal, and the reception beam is the antenna beam used to provide gain and directivity to the received signal. In an embodiment, a network control device within the network may control and coordinate beam sweeping across radio nodes and/or UE devices. A traffic distribution pattern may be characterized by traffic distribution data which represents, for example, the amount of data flowing through network elements and/or network branches interconnecting network elements. The traffic distribution data may include a time history of the amount of data, the location of the point of interest where the data stream is flowing, the types of data in the data stream, etc.

Figure 1E:
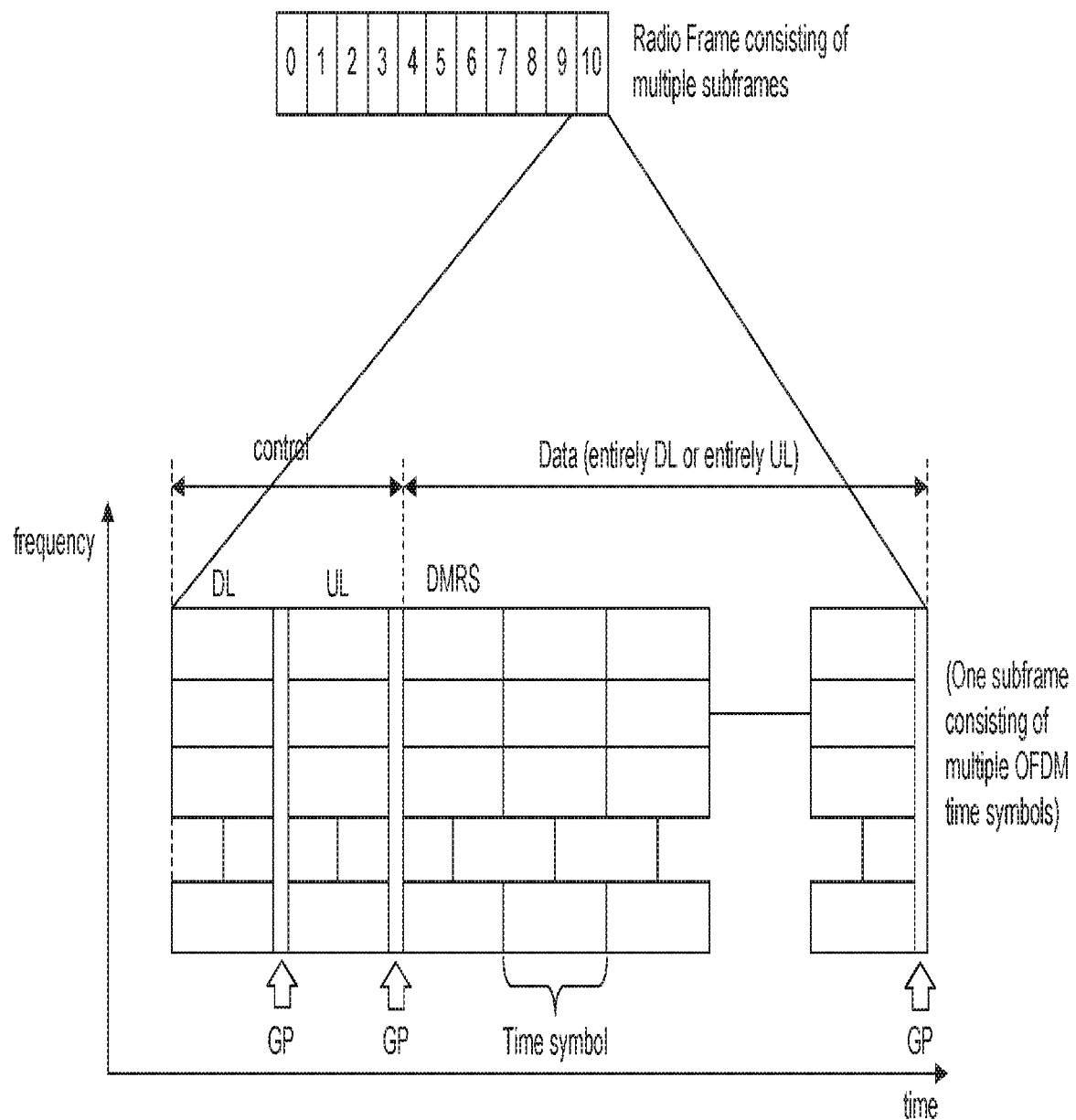

FIG. 1E shows an exemplary 5G millimeter wave frame structure. As shown DL refers to downlink transmission from eNB to UEs and UL refers to uplink transmission from UEs to eNB. As shown control and data planes are separate, which helps in achieving lesser latency requirements. This is due to the fact that processing of control and data parts can run in parallel. The mm wave has small antenna and hence large number of antennas are packed in small size. This leads to use of massive MIMO in eNB/AP to enhance the capacity. Dynamic beamforming is employed and hence it mitigates higher path loss at mm wave frequencies. 5G millimeter wave networks support multi-gigabit backhaul up to 400 meters and cellular access up to 200-300 meters. Hover, 5G millimeter wave goes through different losses such as penetration, rain attenuation etc. This limits distance coverage requirement of mm wave in 5G based cellular mobile deployment. Moreover path loss at mm is proportional to square of the frequency. It supports 2 meters in indoors and about 200-300 meters in outdoors based on channel conditions and AP/eNB height above the ground. It supports only LOS (Line of Sight) propagation and foliage loss is significant at such mm wave frequencies. Power consumption is higher at millimeter wave due to more number of RF modules due to more number of antennas. To avoid this drawback, hybrid architecture which has fewer RF chains than number of antennas need to be used at the receiver. Moreover low power analog processing circuits are designed in mm wave hardware.

Between bands 30 Ghz and 300 Ghz, mmWave promises high-bandwidth point-to-point communications at speeds up to 10 Gbps. But the signals are easily blocked by rain or absorbed by oxygen, which is one reason why it only works at short ranges. Beamforming is a way to harness the mmWave spectrum by directly targeting a beam at a device that is in line of sight of a base-station. But that means antennas in devices, and base-stations on network infrastructure, have to be designed to handle the complexity of aiming a beam at a target in a crowded cellular environment with plenty of obstructions.

Figure 1F:
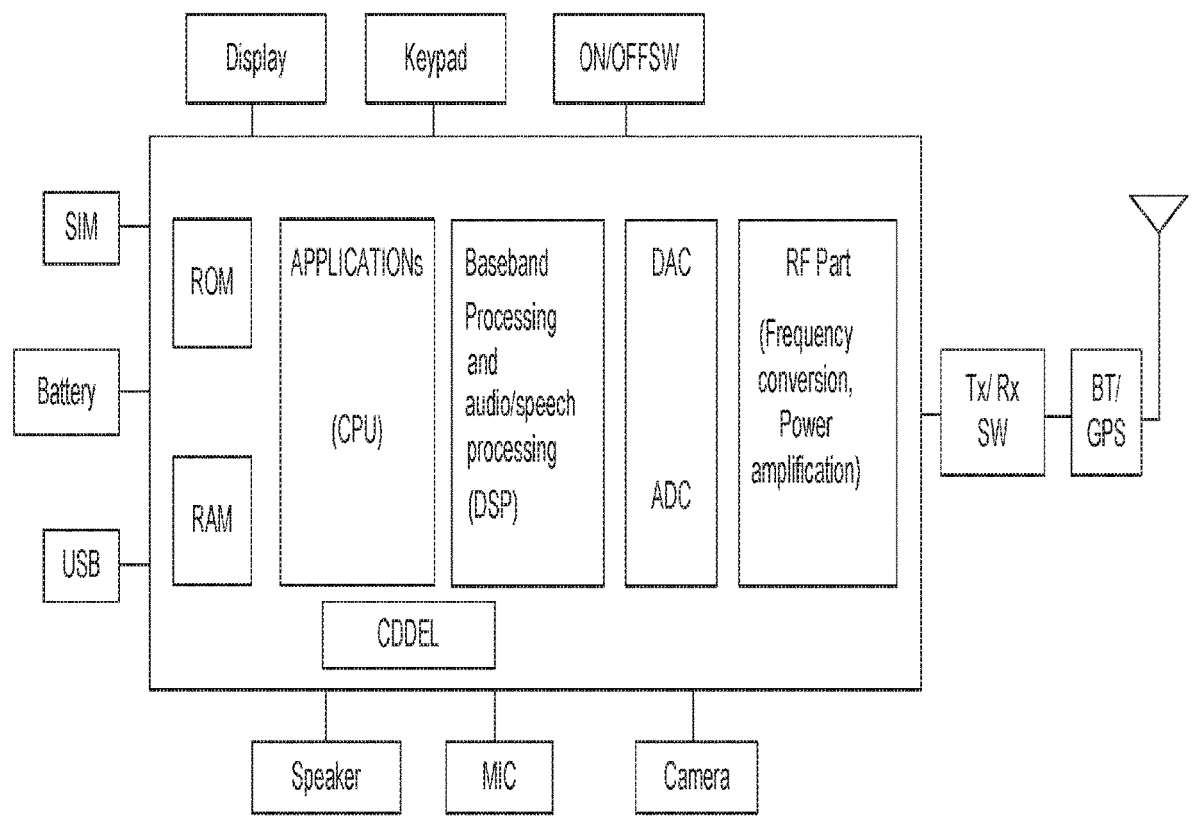
FIGS. 1F-1G show exemplary 5G mobile devices.
Figure 1G:
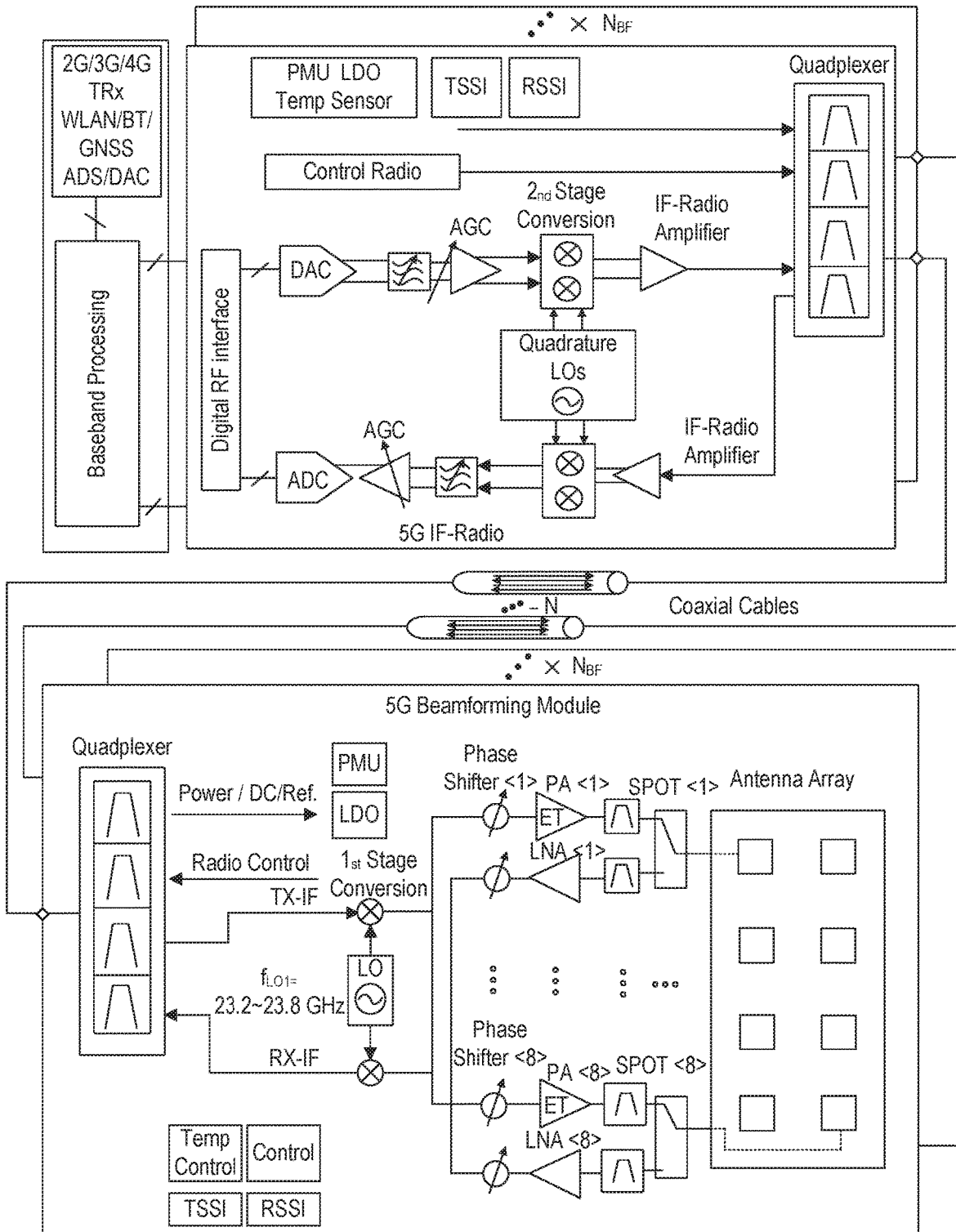

FIGS. 1E and 1F depict a cell phone that has an RF part including RF Transceiver chip, baseband part comprising of DSP and CPU for controlling the data/control messages. ADC/DAC chips are used for interfacing both RF and baseband parts. The other basic cell phone components include touchscreen display, battery, RAM, ROM, RF antenna, MIC, Speaker, camera, diplexer, micro-USB, SIM slots and others. FIG. IF shows an exemplary 5G cell phone architecture. As shown the architecture include baseband part, digital RF interface such as DigRF, ADC/DAC and RF Transceiver. The basic components are same in the 5G phone except antenna array is used instead of one antenna to support massive MIMO and beamforming. Quadplexer is used instead of diplexer to support multiple bands. Quadplexer or Quadruplexer is used to multiplex and demultiplex four radio frequencies to/from single coaxial cable as shown. This helps in reducing cost and weight as well as uses very smaller area of the phone. This shown 5G cell phone architecture supports millimeter wave frequency bands. In order to support massive MIMO/beamforming multiple PAs, LNAs, phase shifters, RF filters and SPDT switches are incorporated in the 5G cell phone design. The 5G phone is backward compatible to 2G/3G/4G, WLAN, Bluetooth, GNSS
etc. The 5G phone shown is based on heterodyne architecture and advantages of Heterodye receiver. Radio Frequency Front End (RFFE) control signals are used to carry transmitter signal strength indicator (TSSI) and receiver signal strength indicator (RSSI) signals. The temperature control of the beamforming module and its calibration are performed. PMUs (Power Management Units) and LDOs (low drop-out regulators) are used in beamforming part of the 5G cell phone. They transform DC voltage of coaxial cable to different power supplies for use in various dies for cell phone operation.

The RF frontend transceiver can realize the beam scanning function through a plurality of antenna elements, T/R switches, power amplifier in the transmitter, low noise amplifiers in the receiver, low noise switches, phase shifters, and RF signals. The transceiver switches and the low loss switches can control whether the antenna elements in the system receive RF signals or transmit RF signals. When the RF signals are controlled to be transmitted, the RF signals have different phase information for each link through the phase shifters, and then the RF signals are amplified by the power amplifiers, which consists of a pre-power amplifier and a power amplifier, and finally RF signals are transmitted to the antenna elements. With different phases of the antenna elements, antenna array can form different beam directions, so that an optimum beam pointing can be achieved in real time.

Since numerous antennas need to be provided on the mobile device, an antenna system applied in the metal back cover of the 5G mobile terminal, which includes a metal back cover, a signal feeder line, and a plurality of antenna elements. Preferably 3D printing to create a capacitive coupled patch antenna array capable of providing high gain and 360-degree coverage in the elevation plane. A material with a relative dielectric constant 2.2 and loss tangent 0.0009 at the frequency band of 24-28 GHz is used as the substrate for printed circuit board (PCB). The patches are printed at the top layer of the substrate. The bottom layer of the substrate consists of the ground plane. The inner conductor of the coaxial probe feed extends from the ground plane through the PCB substrate to reach the top layer feed which capacitively couples the patches. The antenna element covers 24-28 GHz, which is a possible frequency band for future 5G applications.

Four sub-arrays of 12 antenna elements, each providing 90 degrees in the elevation plane, were integrated into the mobile phone chassis for 360-degree coverage. The antenna array achieved a high gain of 16.5 dBi in the boresight and can be steered from −60° to 60° in the phi plane. The physical size of the antenna is relatively small compared to existing designs, meaning that it consumes less space and more antenna elements can be arranged along the width of the mobile phone ground plane. The bandwidth of the antenna is sufficient for 5G applications and can be further widened by modifying the antenna structure.

Turning now to 5G cell towers, a 5G tower is different than a 4G tower both physically and functionally: more are needed to cover the same amount of space, they're smaller, and they transmit data on an entirely different part of the radio spectrum. Small cells support high frequency millimeter waves, which have limited range. The antennas within the small cell are highly directional and use what's called beamforming to direct attention to very specific areas around the tower. These devices can also quickly adjust power usage based on the current load. The small cell antenna needs to be installed with minimal disruption to local people—no street works or construction—and without changing the look of the area. They are connected using optical fiber high speed converged network, which also supports other mobile technologies, home broadband, Internet of Things (IoT) and business services. The housing of the mobile equipment can be done within street furniture such as manhole covers, lamp-posts and phone boxes to increase the speed and extend the coverage of a mobile signal along busy roads, town squares and in shopping and entertainment areas. For example, the manhole cover antennae can be installed with minimal disruption to local people—no street works or construction—and without changing the look of the area, as the kit is below ground. By connecting the street furniture to 5G network, the fiber-connected 5G-enabled small antennae are the foundation on which connected smart cities will be built. 5G connectivity will allow connected traffic lights instantly to reroute road traffic around congestion, councils automatically to schedule repairs for broken infrastructure like street lighting, and businesses to manage how much energy they use intelligently.

The 5G ecosystem is expected to support high-density networks by adding new features to the radios and to the overall system layout. The traditional combination in 3G/4G networks of a remote radio head connected to an external antenna will be extended by active antenna systems (AAS) or active phased-array antennas with massive antenna elements (massive APAA's), in which the electronics will be embedded in the antenna system and operating over a wide frequency range (600 MHz to 28 GHz and above) GHz. This primary system will be supported by complementary systems in dense areas with a high number of antennas to support multi-user MIMO (MU-MIMO). These antenna elements will feature their own control electronics, requiring new connectivity solutions. Frequencies above 6 GHz will be predominately supported by highly integrated systems.

These radio frequency integrated circuits (RFIC) can feature integrated antennas on the top surface of the chipset.

FIG. 2A shows an exemplary light post mounted 5G antenna system mounted on a plurality of light posts 11. The light post 11 can also be a traffic light or street sign or utility pole. Small cells are periodically placed on the traffic light, street sign, or utility pole in a neighborhood. A system 1 with a computing unit 10 in communication with 5G antenna and city monitoring units, each monitoring unit arranged to monitor an operational status of at least one street lighting device 11. Hence, a single monitoring unit may be configured to monitor one or several lighting devices 11 with respect to operational status. The monitoring units may e.g. be mounted in (or at or in the vicinity of) the street devices 11. In the present example, the street devices 11 are road lamps arranged to illuminate a road 15 but may alternatively be any other kind of street devices, such as traffic enforcements cameras or traffic lights. The computing unit 10 may be in communication with a user interface 19 and a database 18 (or memory or any other means) for storing region description data. The region description data may e.g. be a region map (such as a road map or geographical map) and/or data indicative of industrial areas, parks, museums parking lots, average number of people in the region or any other information which may be utilized to prioritize regions e.g. with respect to maintenance urgency. The region description data may be presented e.g. in a map and/or a table over a region in which the street devices 11 are located.

The city/traffic light post cellular device can communicate with a cellular device belonging to a person who is crossing a street near the city light or street light. This is confirmed with camera detection of the person crossing the street and if confirmed, the cellular device emits a person to vehicle (P2V) or a vehicle to person (V2P) safety message to oncoming vehicles to avoid a collision. This system can help elderly users cross the street safely. The quick speed of the 5G network enables cars, bikes, and moving vehicles to stop quickly to protect the person in an emergency where the person is crossing the street without advanced notice to others.

In another embodiment, the camera can detect a pedestrian or person walking and facing a crossing point. The system sends a confirmation to the person's cell phone indicating whether the person desires to cross the street. Once confirmed the system can look up oncoming traffic to determine a gap in traffic to allow the user to cross the street. Alternatively, instead of automated traffic crossing detection using the camera, a walking person activates a street button or a cell device pointing to a desired traversal, the person waits for an indication to cross the street, the system can identify a gap in traffic and signal vehicles behind the gap to stop at the intersection and allow the user to traverse the desired path. After the person safely reaches the other side of the street, the system can signal vehicles to move again. The cameras can capture scenarios including: vehicle going straight, vehicle turning right, vehicle turning left, pedestrian crossing, pedestrian in the road, and pedestrian walking adjacent to the road. The vehicle going straight and the pedestrian crossing scenario is the most frequent pre-crash scenario and has the highest cost. The vehicle turning (right or left) scenarios result in less severe injuries, V2P systems functioning correctly within these scenarios would help maximize crash avoidance. The vehicle going straight and pedestrian either in road or adjacent to the road is lower in occurrence but these crashes tend to result in fatalities.

In addition to pedestrian assistance, the 5G vehicle communication and camera combination can handle the following patterns as well:

Intersection Movement Assist (IMA) warns drivers when it's unsafe to enter an intersection due to high collision probability with other vehicles at intersections. The street cameras capture location information from the "cross traffic" vehicle enables the vehicle attempting to cross the intersection to avoid danger, even if the view is blocked.

Electronic Emergency Brake Light (EEBL) enables a vehicle to broadcast a self-generated emergency brake event to surrounding vehicles. Upon receiving information from the cameras, the processor determines the relevance of the event and, if appropriate, provides a warning to the cars/drivers, helping to prevent a crash.

Forward Collision Warning (FCW) warns drivers of an impending rear-end collision with another vehicle ahead in traffic, in the same lane and moving in the same direction. The camera, along with data received from other vehicles, determines if a forward collision is imminent and to warn drivers to avoid rear-end vehicle collisions.

Blind Spot Warning (BSW) and Lange Change Warning (LCW) warn drivers during a lane change attempt if the blind-spot zone into which the vehicle intends to switch is, or will soon be, occupied by another vehicle traveling in the same direction. This is detected by the camera in conjunction with data from vehicles, and the processor sends an advisory message to the car/driver indicating a vehicle in the blind spot zone. When attempting to merge into the same lane as the conflicting vehicle, the processor sends a warning to the car/driver.

Do Not Pass Warning (DNPW) warns drivers during a passing maneuver attempt when a slower-moving vehicle ahead cannot be passed safely using a passing zone, because the passing zone is occupied by vehicles moving in the opposite direction. A vehicle sends out an indication on the V2V it will pass, and the camera captures data and sends advisory information that the passing zone is occupied when a vehicle is ahead and in the same lane, even if a passing maneuver is not being attempted.

Left Turn Assist (LTA) warns drivers during a left turn attempt when it is not safe to enter an intersection or continue in the left turn attempt, due to a car approaching the same path with no intent of stopping. The camera and processor can provide collision warning information to the vehicle operational systems, which may perform actions to reduce the likelihood of crashes at intersections and left turns.

Each monitoring unit may be configured to continuously and/or at predetermined time intervals and/or upon request (e.g. from the computing unit 10) measure (or check) the operational status of the street device 11. The operational status may e.g. be indicated by parameters such as light output, energy consumption or any other parameter relating to the operational condition of the street device 11. Further, the operational status of the street device 11 may be indicated by a failure signal. The monitoring units may be configured to automatically transmit the failure indication signal in case the street device is (or is soon) out of function. Further, the monitoring units may be configured to store or measure the geographical positions of the street devices 11. For example, a monitoring unit (or the street devices) may comprise a GPS receiver for obtaining a GPS position of the street device 11.

The monitoring units may communicate (directly or indirectly) with the computing unit 10, preferably in an automatic manner. For example, the monitoring units may communicate with the computing unit 10 by means of radio (or any wireless) communication and/or wired communication such as electrical/optical communication (e.g. via Ethernet). The monitoring units may communicate via other units (e.g. servers), which in turn communicates with the computing unit. Hence, the computing unit 10 may obtain information indicative of the operational statuses and positions of the street devices 11 from a peripheral server, which has gathered such information e.g. from the monitoring units.

FIG. 2B shows a block diagram of the unit 11. While the unit can include conventional yellow sodium vapor lights, white light emitting diode (LED) light is preferred with an adaptive control system to provide energy efficient lighting. Smart LED streetlights enable the city to monitor energy consumption and provide the opportunity to dim lighting levels during late evenings. The unit 11 includes an electronic nose to detect air pollution level. The electronic nose can simply be a MEMS device acting as a particle counter. Alternatively, the electronic nose can detect composition of gas and provide a more detailed report, for example identifying air pollution as gun power smell, illegal drug substance smell, car exhaust smell, industrial pollutant, or rotting mammal smell and such information can be relayed to suitable trash removal contractors. The unit 11 also includes a microphone array that can detect sound and direction of sound. This is useful to detecting gunshots, and the direction of the sound can be triangulated to pinpoint the position of the shooting. The unit 11 also includes a camera, which can be a 360 degree camera. Alternatively, the camera can be a 3D camera such as the Kinect camera or the Intel RealSense camera for ease of generating 3D models and for detecting distance of objects. To reduce image processing load, each camera has a high performance GPU to perform local processing, and the processed images, sound, and odor data are uploaded to a cloud storage for subsequent analysis.

The IoT device can run code to minimize light pollution by lighting only with a moving person or vehicle in proximity to the light source. This is done by detecting motion near each light pole, and turning on only a few lights in the area of motion while keeping the other lights off. This approach has the advantage of shining light on those who hide in the darkness for nefarious purposes. The IoT device can run code to detect water pipe rupture by recognizing the position of a fire hydrant and when water motion is detected at the hydrant, the IoT device can run code to report a fire or emergency to a fire department. The IoT device can run code to gate off traffic to the fire or emergency. The IoT device can run code to detect car accident and request assistance from police or ambulance by detecting car collisions or detecting unusual prolonged traffic at a spot. The IoT device can run code to detect crime using a combination of video and sound. The IoT device can run code to discover anomalies with a particular city block. The IoT device can run code for providing sensor data to a crowd and requesting from the crowd as a game one or more reasons explaining sensor data.

The device can run code to detect sound direction of sound such as gunshot or gang fight or a crime in progress. Because each light pole is sequential, the microphone arrays have high resolution and a combination of microphone data from an array of light poles on both sides of a street or freeway provides valuable information in detecting sources of sound, much like SONAR systems.

Figure 2C:
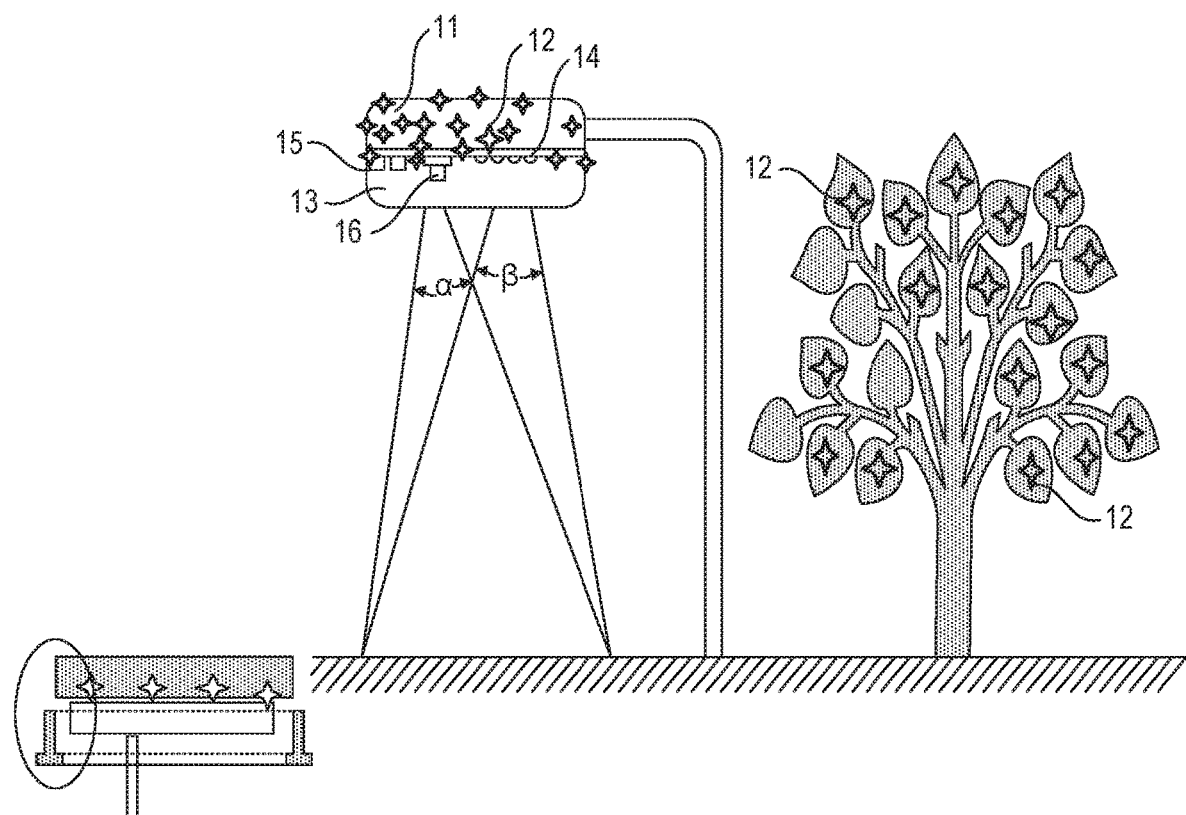
FIG. 2C shows a ground based, light based, and plant based antenna network.

On each lighting device 11 is a massive MIMO antenna detailed in FIG. 2C hidden into street furniture such as manhole covers, light poles, and real/fake trees or plants, or even utility poles. As shown therein, the combined camera, light, sensor, and massive MIMO antenna unit 11 is mounted on a pole which is secured to the traffic pole cross bar via mounts. For example, a fake tree can be used with solar cells on the top of the leaves and the antenna 11 on the top/bottom of the leaves. The antenna can be near the top of the manhole cover.

Figure 2D:
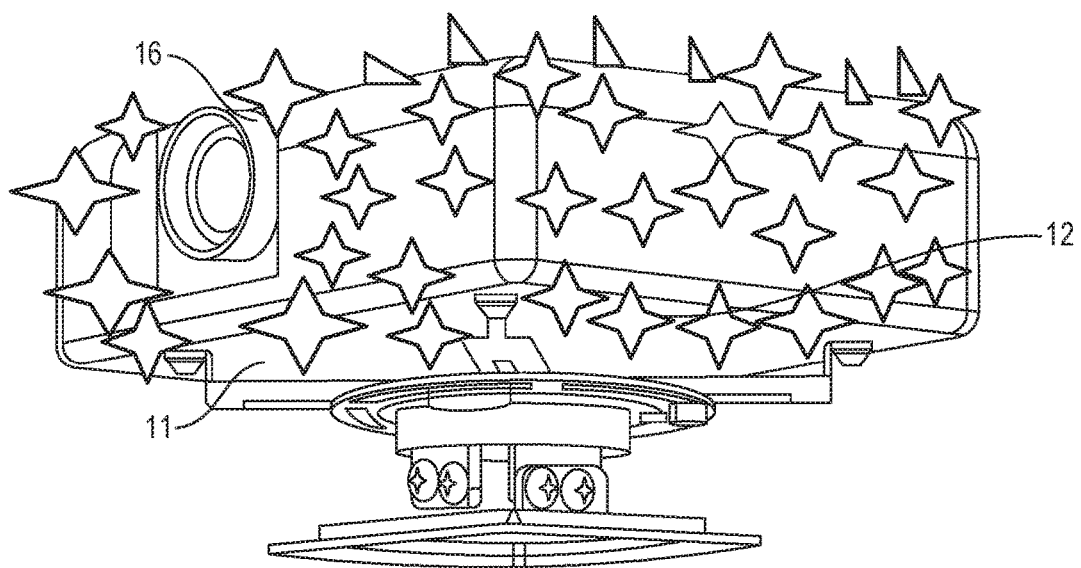
FIG. 2D shows an exemplary security camera with small cell and antennas.
Figure 2E:
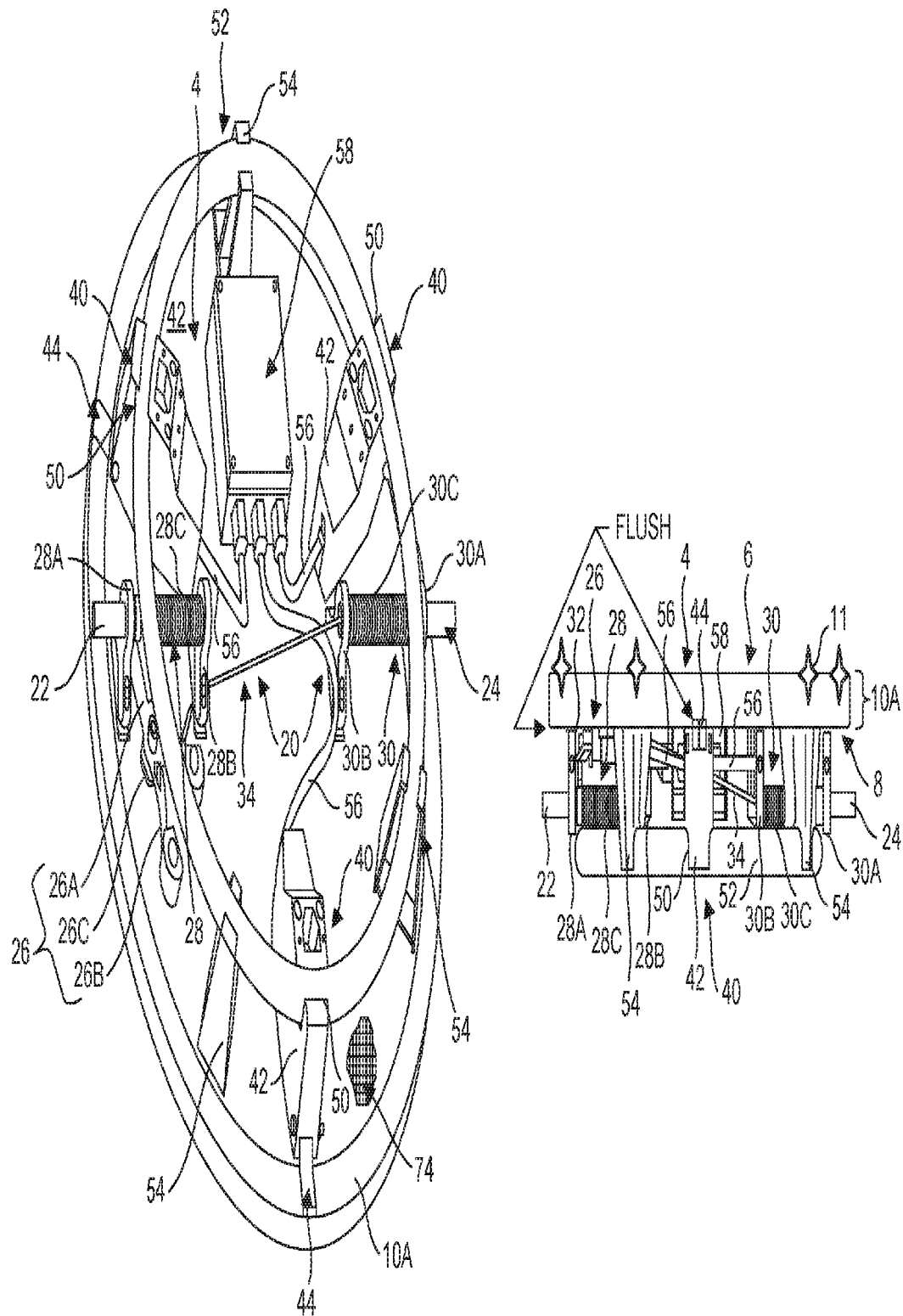
FIG. 2E shows an exemplary man-hole cover with a small cell and steerable antennas.

Referring to FIG. 2C, the street lamp includes one or more sensors 13 (including microphone), a light source 14, a light pervious cover 15, a camera module 16, and a lamppost. The light source 14 include a plurality of LEDs (light emitting diodes). It is understood that the light source 14 can also be incandescent lamps and fluorescent lamps. The light pervious cover is light-permeable. The light beams emitted from the light source 14 are transmitted through the light pervious cover 15 to illuminate the street. FIG. 2D shows a mounted system 12 that does not have light source 14, but has camera 16 and antennas 11.

The antennas 11 can be part of a 5G manhole cover. The manhole cover antennae can be installed with minimal disruption to local people—no street works or construction—and without changing the look of the area, as the kit is below ground.

Figure 2F:
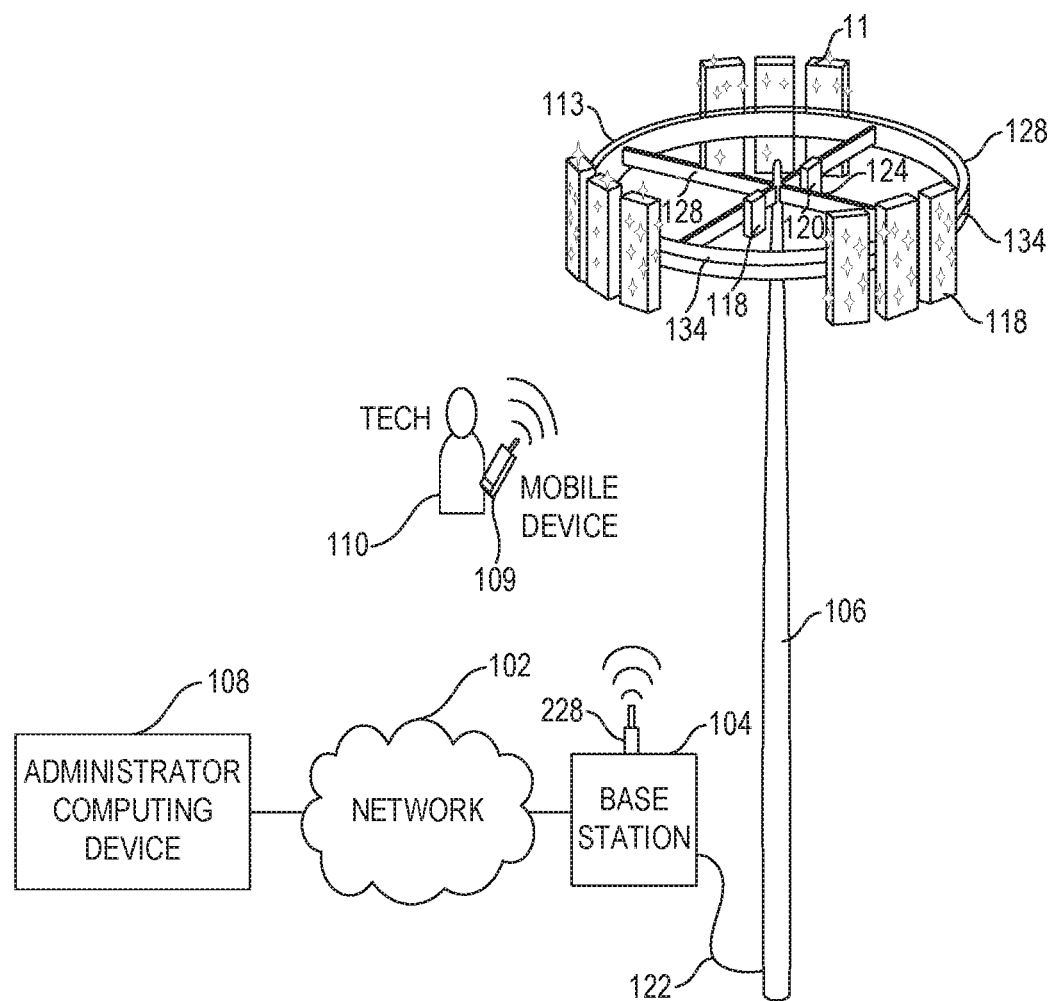
FIG. 2F shows an exemplary 4G-5G network in accordance with one aspect.

The antenna in unit 11 can also work with traditional cell tower antennas, as shown in FIG. 2F. Among other components not shown, the environment 100 generally includes a network 102, a base station 104 communicatively coupled to a communications tower 106, and an administrator's computing device 108. The environment 100 might also include a technician 110 and a mobile device 109. The components of the environment 100 may communicate with each other via the network 102, which may include, without limitation, one or more local area networks (LANs), wide area networks (WANs), and any available networking configuration useable to communicate between networked computing devices. The network might also include telecommunications networks like a public-switched telephone network (PSTN), 2G/3G/4G/5G, Global System for Mobile Communications (GSM), code division multiple access (CDMA), time division multiple access (TDMA), Wi-Fi, Worldwide Interoperability for Microwave Access (WiMAX), or the like. The network may include private or proprietary networks as well as public networks. Such networking environments are commonplace in telecommunications industries, offices, enterprise-wide computer networks, intranets, and the Internet. A number of administrator computing devices 108, mobile devices 109, and user devices (not shown), among others, may be employed within the environment 100 within the scope of embodiments of the invention. Each may comprise a single or multiple devices cooperating in a distributed environment. The administrator's computing device 108 and the mobile device 109 include any computing devices available in the art such as a for example a laptop computer, desktop computer, personal data assistant (PDA) mobile device, or the like. The computing device 108 and the mobile device 109 include one or more processors, memories, busses, input/output devices, and the like as known in the art. Further detail of components and internal functionality of the computing device 108 or the mobile device 109 is not necessary for understanding embodiments of the invention, and as such, is not described herein. The computing device 108 is communicatively coupled to the network while the mobile device 109 may be communicatively coupled to the network and/or may be coupled directly, either wirelessly or through a hardwire connection, to the tower 106. In an embodiment, a plurality of computing devices 108 and/or mobile devices 109 is included in the network. The base station 104 comprises any components useable to receive, handle, transmit, and/or operate on data received via the network 102 or from components on the communications tower 106. In an embodiment, the base station 104 is a base transceiver station. The base station 104 is configured like base stations known in the art and thus may include or be communicatively coupled to components such as a home location registry (HLR), a short-message service center (SMSC), a multimedia message service center (MMSC), signal processors, routers, control electronics, power sources, and the like. Further detail of components and functionalities of the base station 104 in addition to those described below will be understood by one of skill in the art and are thus not described in detail herein. The data received and transmitted by the base station 104 over the network and via the components on the tower 106 includes voice and/or data communications for transmission to, or receipt from a wireless communications network by methods known in the art. The data might also include control signaling for operation of components mounted on the tower 106 as described below. The base station 104 is communicatively coupled to components mounted on the communications tower 106. The tower 106 includes an antenna mount 113 with a plurality of antennas 116 mounted thereon for broadcasting voice or data signals to a plurality of mobile user devices (not shown) or other receiving units. Any configuration of components necessary for transmitting signals from the base station 104 through the antenna housings 116 with antennas 11 mounted on the tower 106 may be employed in embodiments of the invention. For example, antenna housings 116 with antennas 11 are associated with one or more radio units 118 and control units 120 that may be included in the base station 104 or mounted at the base or top of the tower 106 with the antenna housings 116 with antennas 11. One or more cables 122, wires, fiber-optic lines, or other communicative couplings extend from the base station to the tower 106 and up the tower 106 to the one or more of the radios 118, control units 120, antenna housings 116 with antennas 11, or other components disposed on the tower 106. In an embodiment, a wireless transceiver 124 is disposed on the tower 106 for wireless communication of one or more signals to/from the base station 104 or to/from the technician's mobile device 109 to one or more of the radios 118, control units 120, antenna housings 116 with antennas 11, or other components mounted on the tower 106. In an embodiment, the base station 104 might include a transmitter 228 that provides such wireless communications with the transceiver 124.

The tower 106 can comprise any available tower structure known in the art, such as, for example and not limitation, a mast, a tower, a steel lattice structure, a concrete reinforced tower, a guyed structure, a cantilevered structure, or the like. Or the tower 106 might comprise other structures like a church steeple, a geologic structure, a building, or other structure cable of supporting the antenna mount 113 of embodiments of the invention described herein.

The antenna mount 113 can be a ring or generally circular structure 126 mounted on the tower 106. The ring structure 126 can be mounted at the top or at any point along the length of the tower 106 and substantially encircles the tower 106. One or more spokes 128 extend radially outward from the tower 106 to the ring structure 126 and couple the ring structure 126 to the tower 106. One or more of the spokes 128 includes a passageway 130 interior to the spoke 128 and traversing the length of the spoke 128. The passageway 130 is configured to receive cables 132, wires, fiber optic strands, or other communications components therein. The ring structure 126 is generally circular in shape but may comprise any form or shape that substantially encircles the tower 106. In an embodiment the ring structure 126 only encircles a portion of the tower 106. The ring structure 126 has a generally C-shaped cross section that forms a channel 134 disposed therein that is open to the environment generally along the perimeter of the ring structure 126. The channel 134 extends into a body 136 of the ring structure 126.

While housing 116 is rectangular in shape, it can be spherical, balloon shape, semispherical, parabolic, inverse parabolic, pyramidal, among others. A spherical dielectric lens can provide a multi-beam, high gain antenna system for fifth generation (5G) wireless communications. The lens is ideally of the Luneburg type lens. To approximate the focusing properties of the Luneburg lens in a manner that is practical for fabrication purposes, monolithic lenses can be used where the lens is comprised of a single, homogeneous dielectric material, layered lenses where the lens is formed of spherical shells of homogeneous material, and lenses formed by additive or subtractive manufacturing methods where the lens dielectric constant is synthesized by voids formed in otherwise solid dielectric materials. The shells could be connected in any suitable manner, such as by being bonded together on their touching surfaces, or they could be bolted together with non-metallic fasteners.

Objects that have the same shape as each other are said to be similar. If they also have the same scale as each other, they are said to be congruent. Many two-dimensional geometric shapes can be defined by a set of points or vertices and lines connecting the points in a closed chain, as well as the resulting interior points. Such shapes are called polygons and include triangles, squares, and pentagons. Other shapes may be bounded by curves such as the circle or the ellipse. Many three-dimensional geometric shapes can be defined by a set of vertices, lines connecting the vertices, and two-dimensional faces enclosed by those lines, as well as the resulting interior points. Such shapes are called polyhedrons and include cubes as well as pyramids such as tetrahedrons. Other three-dimensional shapes may be bounded by curved surfaces, such as the ellipsoid and the sphere. A shape is said to be convex if all of the points on a line segment between any two of its points are also part of the shape. The housing 116 can have any of these shapes.

Another embodiment uses an active antenna architecture with combined antenna/radio head with distributed radio functionality across antenna elements. The term fronthaul is used to describe the connection between the cell tower radio itself and the mobile network control backbone (the Baseband Unit or BBU) and CPRI is a well-known standard for this interconnection. Backhaul is the linkage between a base station and the core wired network, and is often fiber or coax, and in some cases broadband, proprietary wireless links. Fronthaul, backhaul, and various hybrid architectures will be needed to accommodate cost efficient, backwards compatible, dense deployment of network infrastructure necessary to provide the broadband, low latency demands for 5G systems. In one embodiment, a remote fronthaul access point is placed in the center of the triangle and communicates with the radio head in the active antenna via fiber optics or ultrawideband radios.

Another embodiment fuses fronthaul and backhaul into an integrated 5G Transport Network as a flexible, reconfigurable, software defined transport architecture. A single network is used support a variety of functional splits between the antenna and the packet core. This aligns with the evolution of Network Function Virtualization (NFV) and Cloud RAN (CRAN) which points to the neural network plane or data center that can be configured to support whatever functional split is deployed in the network. At one extreme, a legacy base station and backhaul can be accommodated. At the other extreme, a network of densely distributed radio heads configured for massive MIMO can exchange compressed digitized radio samples for cloud-based processing. 5G-Crosshaul, a European 5GPPP project, can act as a bus/transport network connecting Radio Heads to BBUs which will be virtualized. Once virtualized, base station functions can be flexibly distributed and moved across data centers, providing another degree of freedom for load balancing.

Near the tower can be mounted a baseband unit cabinet. The baseband in the cabinet has a fiber optic output connection using the common public radio interface (CPRI) protocol and small form factor pluggable (SFP) connectors to fiber. The baseband also has a power output 216 to deliver power for the active antenna. CPRI fiber extends up the pole or mast to the active antennas. The antennas are arranged in the figure as four antennas for each of three sectors. In the active antenna, the radio head takes the output of the CPRI interface, which is digital, turns it into an analog radio frequency signal, amplifies it through a PA and drives the 5G antenna.

Wireless radios may be integrated into the antennas for short-distance inter-antenna communication. The radios may operate at a high frequency, such as millimeter-wave or 60 GHz, and may be ultrawideband UWB radios. At high frequencies such as used by these radios, high data rates are possible, sufficient to handle the digital data demands for digital fronthaul traffic, with minimal interference to the reception and transmission frequencies of the radios. The wireless range limitations of frequency bands in the tens of gigahertz (i.e., microwave or millimeter wave) are not problematic, as the antennas are co-located/mounted on the same radio tower. In some embodiments, backhaul may also be wireless using UWB radios. Backhaul to one antenna may be shared with other antennas, in a mesh network.

A baseband board may be provided to perform all baseband functions specific to an antenna. The baseband board may include DPD and CFR functions, as well as self-test routines and modules, as well as handling for one or more channels of MIMO, or one or more channels of multiple radio access technologies, e.g., 2G, 3G, 4G, 5G, 6G UMTS, LTE, and the like. At the bottom of the mast, cabinet 421 no longer needs a shelter with air conditioning, as the reduction in power wastage and increase in thermal mass enables passive cooling at the cabinet. Therefore, no AC and no baseband unit are found at the cabinet; instead, only a passively cooled power supply and a backhaul network terminal are provided in the cabinet.

In some embodiments, a power tilt antenna chassis may be provided. In some embodiments, a winch that can lower itself and that causes the antenna to guide itself into position when it is raised can be deployed at the tower in a base or cradle for the antenna module. A drone may operate an electric latch to release an antenna module, and the antenna module may lower itself to the ground using the winch. In some embodiments, a boom and trolley may be attached at the center of a tower for attaching and detaching antenna modules. The antenna chassis and/or base may be physically designed to be self-guiding, such that a new antenna may be inserted into the base by a drone or by an operator.

In some embodiments, wireless synchronization may be used between antennas. Synchronization is important for various applications, such as time division duplexing (TDD) for certain cellular bands. Direct wireless synchronization could be provided or each antenna subsystem may be equipped with its own GPS antenna, and the GPS antennas may be used to sync the antennas together down to approximately 50 parts per billion (ppb).

Figure 2G:
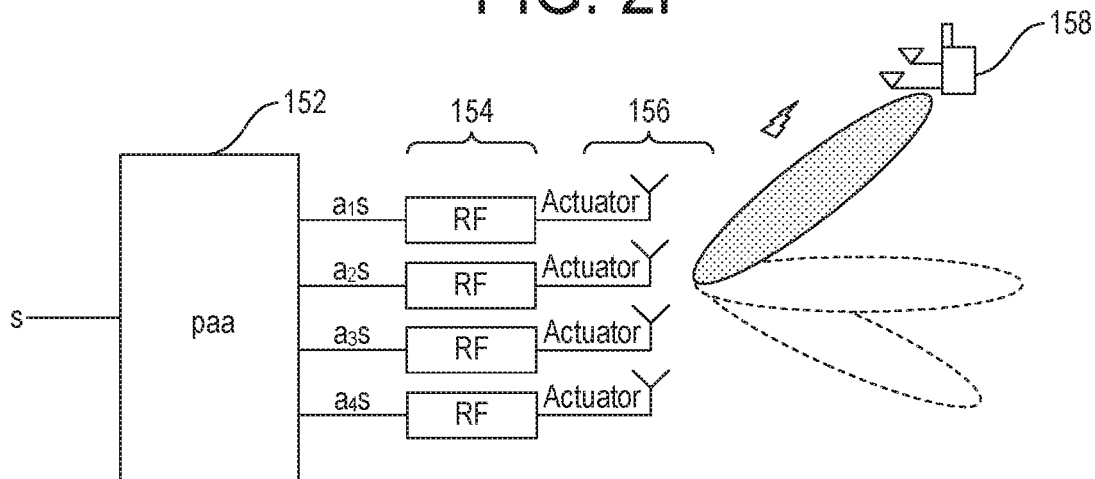
FIG. 2G shows vehicles for 5G operations.

FIG. 2G illustrates a simplified digital baseband beamforming architecture that digitally applies complex beamforming weights (composed of both a gain and phase factor) in the baseband domain. Antenna-based communication systems may utilize beamforming in order to create steered antenna beams with an antenna array. Beamforming systems may adjust the delay and/or gain of each of the signals transmitted by (or received with in the receive direction) the elements of an antenna array in order to create patterns of constructive and destructive inference at certain angular directions. Through precise selection of the delays and gains of each antenna element, a beamforming architecture may control the resulting interference pattern in order to realize a steerable "main lobe" that provides high beam gain in a particular direction. Many beamforming systems may allow for adaptive control of the beam pattern through dynamic adjustment of the delay and gain parameters for each antenna element, and accordingly may allow a beamformer to constantly adjust the steering direction of the beam such as in order to track movement of a transmitter or receiver of interest.

Digital beamformers may employ digital processing in the baseband domain in order to impart the desired phase/delay and gain factors on the antenna array. Accordingly, in digital beamforming systems, the phase and gain for each antenna element may be applied digitally to each respective antenna signal in the baseband domain as a complex weight. The resulting weighted signals may then each be applied to a separate radio frequency (RF) chain, which may each mix the received weighted signals to radio frequencies and provide the modulated signals to a respective antenna element of the antenna array.

As shown in FIG. 2G, digital beamformer 150 may receive baseband symbols and subsequently apply a complex weight vector pBB=[a1 a2 a3 a4] T to s to generate pBBs, where each element a1, I=1, 2, 3, 4 is a complex weight (comprising a gain factor and phase shift). Accordingly, each resulting element [a1s a2s a3s a4S] T of pBBS may be baseband symbols multiplied by some complex weight a1. Digital beamformer 150 may then map each element of pBBs to a respective RF chain of RF system 152, which may each perform digital to analog conversion (DAC), radio carrier modulation, and amplification on the received weighted symbols before providing the resulting RF symbols to a respective element of antenna array 154. Antenna array 154 may then wirelessly transmit each RF symbol. This exemplary model may also be extended to a multi-layer case where a baseband symbol vectors containing multiple baseband symbols s1, s2, etc., in which case baseband precoding vector pBB may be expanded to a baseband precoding matrix pBB for application to baseband symbol vectors. In this case, a1, i=1, 2, 3, 4 are row vectors, and pBBs=[a1s a2s a3s a4s] T. Thus, after multiplying pBB ands, the overall dimension is the same as the overall dimension at the output of digital beamformer 150. The below descriptions thus refer to digital beamformer 150 as pBB and transmit symbol/vector ass for this reason while this model can be extended to further dimensions as explained.

By manipulating the beamforming weights of pBB, digital beamformer 150 may be able to utilize each of the four antenna elements of antenna array 154 to produce a steered beam that has a greater beam gain compared to a single antenna element. The radio signals emitted by each element of antenna array 154 may combine to realize a combined waveform that exhibits a pattern of constructive and destructive interference that varies over distances and direction from antenna array 154. Depending on a number of factors (including e.g. antenna array spacing and alignment, radiation patterns, carrier frequency, etc.), the various points of constructive and destructive interference of the combined waveform may create a focused beam lobe that can be "steered" in direction via adjustment of the phase and gain factors a1 of pBB. FIG. 2G shows several exemplary steered beams emitted by antenna array 154, which digital beamformer 150 may directly control by adjusting pBB. Although only steerable main lobes are depicted in the simplified illustration of FIG. 2G, digital beamformer 150 may be able to comprehensively "form" the overall beam pattern including nulls and sidelobes through similar adjustment of pBB.

In so-called adaptive beamforming approaches, digital beamformer 150 may dynamically change the beamforming weights in order to adjust the direction and strength of the main lobe in addition to nulls and sidelobes. Such adaptive approaches may allow digital beamformer 150 to steer the beam in different directions over time, which may be useful to track the location of a moving target point (e.g. a moving receiver or transmitter). In a mobile communication context, digital beamformer 150 may identify the location of a target User Equipment (UE) 158 (e.g. the direction or angle of UE 156 relative to antenna array 154) and subsequently adjust pBB in order to generate a beam pattern with a main lobe pointing towards UE 156, thus improving the array gain at UE 156 and consequently improving the receiver performance. Through adaptive beamforming, digital beamformer 150 may be able to dynamically adjust or "steer" the beam pattern as UE 156 moves in order to continuously provide focused transmissions to UE 156 (or conversely focused reception).

Digital beamformer 150 may be implemented as a microprocessor, and accordingly may be able to exercise a high degree of control over both gain and phase adjustments of pBB through digital processing. However, as shown in FIG. 1 for RF system 152 and antenna array 154, digital beamforming configurations may require a dedicated RF chain for each element of antenna array 154 (where each RF chain performs radio processing on a separate weighted symbol a is provided by digital beamformer 102); i.e. NRF=N where NRF is the number of RF chains and N is the number of antenna elements.

Hybrid beamforming solutions may apply beamforming in both the baseband and RF domains, and may utilize a reduced number of RF chains connected to a number of low-complexity analog RF phase shifters. Each analog RF phase shifter may feed into a respective antenna element of the array, thus creating groups of antenna elements that each correspond to a unique RF phase shifter and collectively correspond to a common RF chain. Such hybrid systems may thus reduce the number of required RF chains by accepting slight performance degradations resulting from the reliance on RF phase shifters instead of digital complex weighting elements.

In one embodiment the digital beam former provides a method of mitigating interference from interfering signals. The system tracks the location of interfering signals and readjusts the digital beam forming coefficients to create nulls in the antenna pattern directed towards that interfering signal. The digital beam forming coefficients are adjusted to improve or maximize the signal quality of communication signals received from the UEs. The UE provides the cell tower BS with quality indicators which indicate the quality of the signals received by the UE. In response to received link quality indicators, the digital beam former in the BS dynamically adjusts its antenna directionality and the antenna beam pattern to help optimize the signal transmitted to the UE. The digital beam forming coefficients are readjusted to continually help maintain and help improve or maximize the signal quality of the received signals as the UE and/or the cell tower change their relative positions. The digital beam former coefficients are adjusted to provide more antenna beams to geographic regions having high demand for communication services and also adjusted to provide fewer antenna beams to regions having a low demand for communication services. In the preferred embodiment, as the demand for communication services changes with respect to geographic location, the digital beam former dynamically assigns antenna beams or assigns additional beams in response to the changes in demand for communication services.

In another embodiment the UE receives a link quality indicator from a BS (or another UE) that it is communicating with. The link quality indicator (LQI) provides preferably 3 data bits indicating of the quality of the signal received at the BS. This link quality indicator is provided back to BS or UE which accordingly adjusts its transmit digital beam forming coefficients dynamically to improve the quality of its transmitted signal. In this embodiment a local processor, DSP, or a neural network plane evaluates the link quality indicator and adjusts the beam forming coefficient provided to transmit digital beam forming network. In general this causes the transmit and receive antenna beam characteristics to be more optimized for the particular situation the UE is currently experiencing. The situation includes interference characteristics from other signals, interference characteristics caused by ground terrain and the specific receiver antenna characteristics of the receiving base station and/or satellite.

In another embodiment the UE tracks the communication signal from the base station and cell tower as the UE moves. This tracking is done by one of a variety of ways including using the receive signal and analyzing the angle or direction of arrival of the receipt signal. Alternatively, as the UE moves, the antenna beams, preferably both transmit and receive, are continually adjusted to help improve signal quality. Accordingly, the resulting antenna beam patterns are directed towards the communication station, while nulls are directed toward any interfering signal source. As the UE moves (or the small cell/cell tower moves), the antenna beam characteristics, through the use of the digital beam former, are adjusted to maintain improved communication with the BS and preferably remain directed towards the BS as the BS moves relative to the UE or vice versa.

Digital beam former of FIG. 2G provides for positioning of nulls in the antenna beam pattern and provides for beam shaping and other beam characteristics that are dynamically modified through the use of these digital beam forming techniques. In a preferred embodiment, the digital beam former provides dynamically reconfigurable antenna patterns based on current traffic demand levels. For example, one antenna beam provides broad coverage over a large region having a low demand for communication services, while other antenna beams are small and provide a high concentration of communication capacity in a region having high demand for communication services. In another embodiment, antenna beams are shaped in responsive to demand for communication services. Antenna beams are modified and shaped, for example, to approximate the contour of a geographic region having high demand for communication services next to an area having virtually no demand for communication services. Accordingly, communication capacity may be concentrated where it is needed. In the preferred embodiment, antenna beams are dynamically configured in real time in response to demand for communication services. However, in other embodiments of the present invention, antenna beams are provided based on historic and measured demand for communication services.

In one embodiment, the UE listens for signals, preferably within the small cell's footprint. Preferably, receive beam controller module configures the antenna beams to provides at least one broad antenna beam covering substantially an entire small cell footprint. Accordingly, signals are received from anywhere within that footprint on that one antenna beam. Signals that are received may include signals from existing users that are already communicating with the small cell system, interfering signals, e.g., signals from non-system users including interfering signals, and signals from system users requesting access to the system.

The neural network plane determines whether or not the signal is one from an existing user. In general, the location of existing users is known. If the signal received is not from an existing user, the system determines the location of that signal source. Those of skill in the art will recognize that various ways may be used to determine the geographic location of a signal source. Those ways may include analyzing the angle of arrival, the time of arrival, frequency of arrival, etc. Alternatively, if the signal source is a user requesting system access, that UE may provide geographic coordinates on its system access request signal.

Once the location of the signal source is determined the system determines whether or not the signal is an interfering signal. In other words, the system determines if the signal source will interfere with a portion of the spectrum assigned to the small cell system, or alternatively, if the interfering signal is a communication channel currently in use with a UE communicating with the small cell. If the system determines that the signal source is not an interfering signal and that the signal source is a request for a new channel, the system assigns an antenna beam to that user. The system may employ various security and access request procedures which are not necessarily important to the present description. Beam control modules then generate individual receive and transmit antenna beams directed to that UE at that UE's geographic location. The system preferably, repeatedly adjusts the DBF transmit and receive coefficients to help provide improved signal quality received from the UE.

In one preferred embodiment of the present invention the UE provides a link quality indicator (LQI) that indicates the quality of the received signal. The UE provides that link quality indicator to the small cell. The link quality indicator is evaluated causing transmit beam control module to adjust DBF control coefficients to help optimize the transmitted antenna beam to the UE.

When the system determines that the signal source is an interfering signal, for example a non-system user, the system calculates and adjust the receive DBF coefficients provided to receive DBF network to help reduce or minimize interference from the interring signal. In one embodiment of the present invention, the system places a "null" in the antenna pattern in the direction of the interfering signal. The interfering signal is continually monitored and tracked as either the UE moves or the interfering signal moves.

When the system has determined that the signal source is an existing user, the system determines when a hand-off is required. In some embodiments of the present invention the UE requests hand-offs while in other embodiments, the neural network plane determines when a hand-off is necessary. Preferably, hand-offs are determined based on signal quality. In general, a hand-off is requested when a user is near the edge of the antenna pattern footprint region or exclusion zone.

In one preferred embodiment of the present invention, antenna beams are individually provided to the UE and the individual antenna beam tracks the location of the UE. Accordingly, hand-offs are only between small cells and necessary at the edge of the small cell footprint. When a hand-off is necessary, the system assigns a new antenna beam from another small cell to the user. If a hand-off is not required, in-band interference is monitored along with received power level and link quality metrics.

The receive and transmits digital beam former (DBF) coefficients are adjusted to help maintain an improved or maximum signal quality, to help reduce or minimize in-band interference and to help maximize receive power level. During this "tracking" mode, additional interfering signals may cause a degradation in signal quality. Accordingly, the system dynamically readjusts the DBF coefficients to help maintain signal quality. In one embodiment of present invention link quality indicators are provided by BS s or UEs. Accordingly, the combination provide for tracking of the UE as the relative location between the UE and the small cell change. The system determines when a hand-off is required. If a hand-off is not required the UE remains in the tracking mode. When the hand-off is required the system will execute a hand-off to the next small cell. In one embodiment of the present invention the next small cell is notified that a hand-off is required and it is provided the geographic location of the UE. Accordingly, the next small cell can assign and generate an antenna beam specifically for that UE before being released from its present small cell. Once the UE is handed off to the next small cell, the system adds the available antenna beam to its resource pool, allowing that antenna beam to be available to be assigned to another UE.

In another embodiment, the neural network plane determines the location of high demand and low demand geographic regions and this can be accomplished in any number of ways. For example, each UE communicating with the system has a geographic location associated therewith. Furthermore, each UE requesting access to the system may provide the system with geographic location data. Once the geographic locations of high demand and low demand areas are determined, the system causes the DBF beam control modules to provide less antenna beams in low demand areas and provide more antenna beams in high demand areas. In one embodiment of the present invention, each antenna beam provides a limited amount of communication capacity.

Low demand areas are provided with antenna beams having a much larger coverage region than antenna beams being provided to high demand areas. For example, antenna beam covers a large geographic region that currently has a low demand for communication services. Alternatively, antenna beams have much smaller geographic coverage regions and provide more communication capacity for a region that currently has a high demand for communication services. In another embodiment of the present invention the systems adjust the shape of the antenna beams based on the demand for communication services. For example, antenna beams can be long narrow beams formed to provide better area coverage for communication services.

As the demand for communication services changes, antenna beams are dynamically provided in response. As the day begins, antenna beams are initially at homes. As the day progresses, the antenna beams transition to office locations as the time of day changes in response to demand for communication services. In the case of a natural disaster where demand for communication services may be particularly great, dedicated antenna beams may be provided. A small cell control facility may direct small cell's digital beam former to allocate beams accordingly. In general, antenna beams preferably are provided in response to the changing demand of communication services using the neural network plane without the assistance of operators.

A network element may control beam sweeping of radio nodes and/or user equipment (UE) devices within a service area based upon traffic distribution data, networking requirements (e.g., such as user service requirements and/or application service requirements) and/or prior beam sweeping history. Beam sweeping may be broadly defined to include steering, pointing, or directing an antenna beam, electronically and/or mechanically, to provide coverage to a desired region in a service area. Beam sweeping may be commonly applied to both transmission and reception beams, or separate controls may be applied independently to the transmission beam and reception beam. As used herein, the transmission beam is the antenna beam used to provide gain and directivity to the transmission signal, and the reception beam is the antenna beam used to provide gain and directivity to the received signal. In an embodiment, a network control device within the network may control and coordinate beam sweeping across radio nodes and/or UE devices. In an embodiment, the network control device may be a centralized, self-organizing network engine which has visibility into the traffic distribution patterns of the network. As used herein, a traffic distribution pattern may be characterized by traffic distribution data which represents, for example, the amount of data flowing through network elements and/or network branches interconnecting network elements. The traffic distribution data may include a time history of the amount of data, the location of the point of interest where the data stream is flowing, the types of data in the data stream, etc. The system may determine beam sweeping patterns for antenna beams associated with one or more transmission reception points (TRP). TRPs may be located at one or more antennas attached to radio nodes and/or UE devices. Network control device may have visibility into traffic distributions and network requirements, and may receive various inputs from different sources to calculate beam sweeping commands based on the received inputs. In an embodiment, inputs received by network control device 120 may include the traffic distribution data and other networking requirements. Based on the received inputs, network control device may provide beam sweeping commands to radio nodes and/or UE devices. The networking requirements may include, for example, service requirements associated with one or more applications on one or more UE devices 160 (also referred to herein as "application service requirements") in service area. The application service requirements may include requirements defined by a subscription and/or service contract corresponding to a user and the user's associated UE (also referred to herein as "user service requirements"). Beam sweeping commands may be provided to individual radio nodes and/or UE devices via core network and mobile backhaul network. Radio nodes may forward beam sweeping commands to respective UE devices 160 over a wireless channel (e.g., a wireless control channel). Additionally, network control device 120 may prioritize particular antenna beams, where high priority beams are reserved to service users having high networking requirements. In an embodiment, high priority beams may be classified as "active" beams. Beams having lower priority than active beams may be classified as "candidate" beams, which may be selected to replace active beams if necessary. Beams having lower priority than active and candidate beans may be classified as "alternative" beams, which may be used as backup beams in case an active beam is temporarily blocked and a suitable candidate beam is unavailable. In addition, the priority of beams may be updated according to the time of day, particular days or dates (e.g., workdays, weekends, holidays, etc.), and/or the time of season (to account for seasonal effects of propagation, seasonal variations of the density of users, and/or variations in objects which may block signal propagation). In addition, network control device 120 may also use prior knowledge of prior beam sweeping patterns to influence the determination of current and/or future beam sweeping patterns. Moreover, the beam sweeping patterns associated with control signaling broadcast between radio nodes and UE devices may be adjusted differently than antenna beams associated with data bearing channels. Additionally, differences between beam sweeping patterns may be based on the beam width of individual antenna beams and/or the number of beam sweeping positions.

Once the beam sweeping pattern is determined, processor may provide beam sweeping commands to control the beam sweeping pattern for one or more radio node(s) and/or one or more UE device(s) in the service area. For example, for radio node(s), beam sweeping commands may be provided over the network and received by network interface in radio node(s), and be used by antenna controller to control antenna array. In another example, the beam sweeping commands may be provided over the network and be used by antenna controller to control antenna array.

The processor can provide commands, to at least one of a radio node or the UE device in the service area, wherein the provided commands control the beam sweeping patterns for at least one of the radio node or the UE device. The system can receive performance requirements corresponding with an application associated with the at least one UE device. The processor can receive, from the core network, service requirements associated with the at least one UE device. The determining the beam sweeping pattern for all the beam sweeping positions further includes: ordering the sweeping factors associated with each beam sweeping position; and determining a priority value of each beam sweeping position based on the ordering.

In an embodiment, process may iterate over N beam sweeping positions, and in each loop the process includes receiving location data from UE device(s) and may identify, at each beam sweeping position, the UE device(s) located therein and traffic distribution data associated with UE device(s). The traffic distribution data may define data traffic patterns to provide quantitative and/or qualitative information of network data traffic for each UE. The process can also base its beam sweep from performance requirements corresponding with applications associated with UE device(s) or service level requirement or application service requirements. The needs for each UE are summed up to determine sweeping factors and the process may determine the beam sweeping pattern by ordering the sweeping factors associated with each beam sweeping position, and then determining a priority value of each beam sweeping position based on the ordering. This may be performed by determining the rank of the sweeping factors or by classifying each beam sweeping position. Once the beam sweeping pattern is determined, processor may provide beam sweeping commands to control the beam sweeping pattern for one or more radio node(s) and/or one or more UE device(s) and may be used by antenna controller to control antenna array.

Figure 2H:
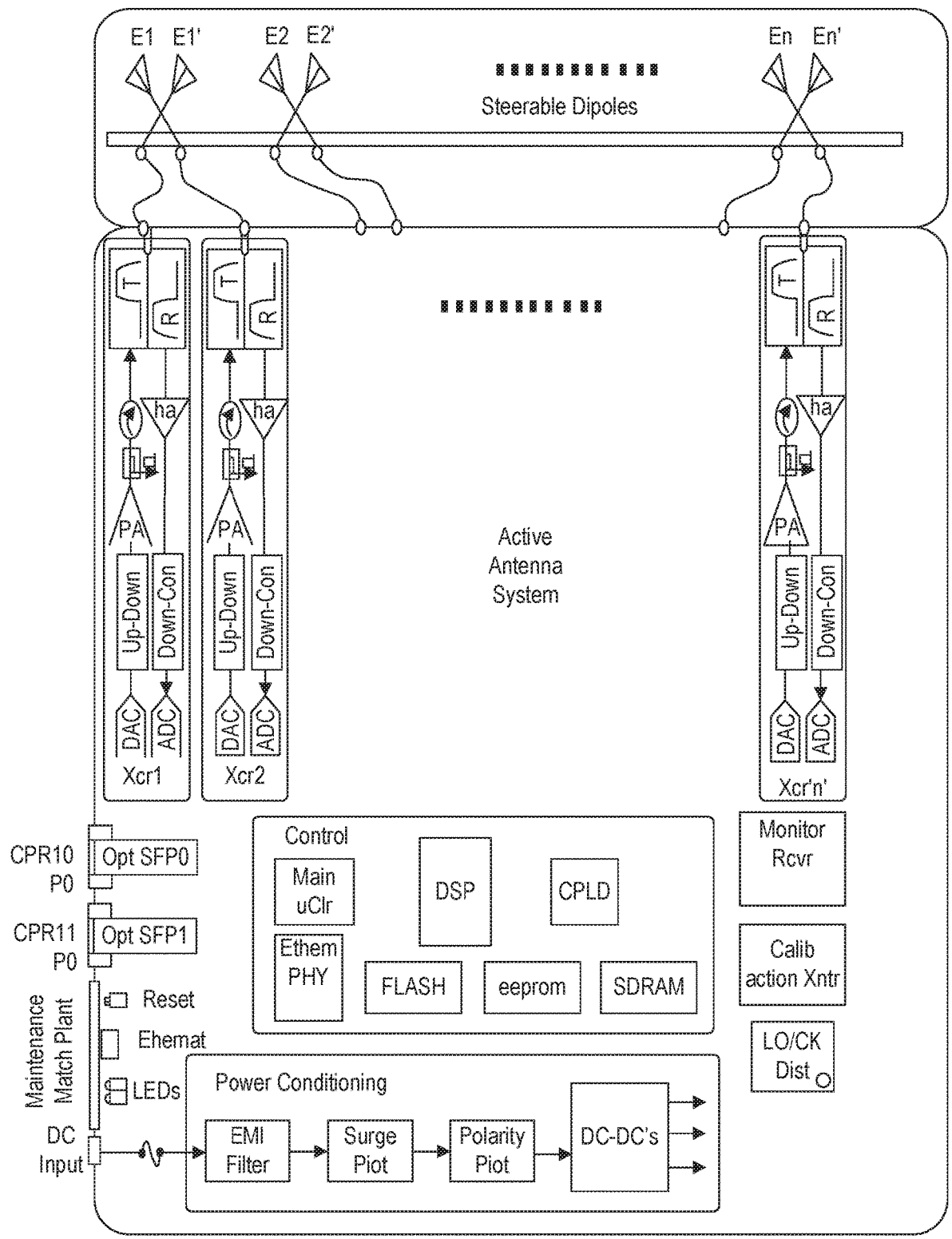
Figure 21:
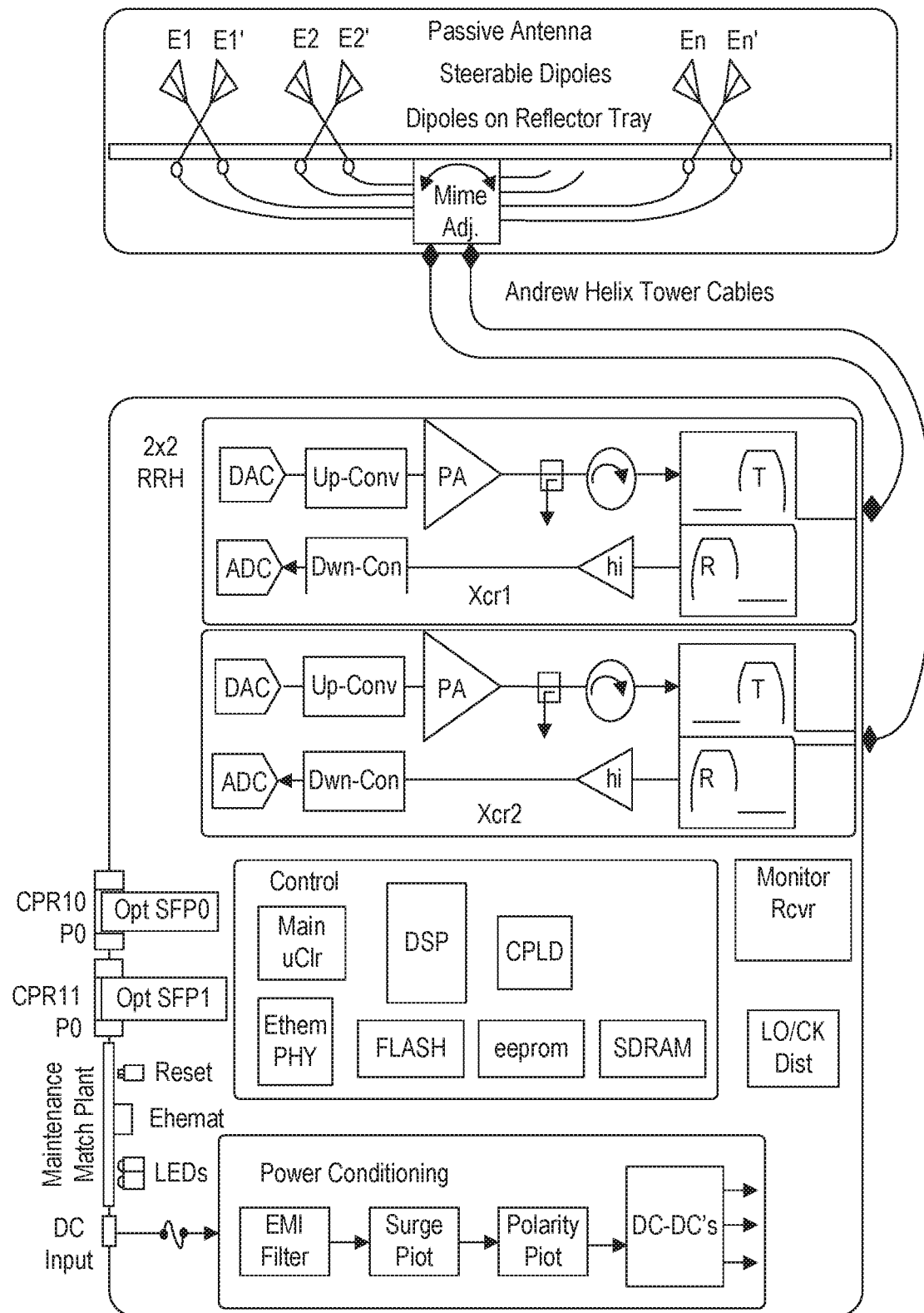

FIG. 2H-2I shows an exemplary active antenna system (AAS) and a remote radio head (RRH) connected to a baseband unit with a high-speed serial link as defined by the Common Public Radio Interface (CPR1), Open Base Station Architecture Initiative (OBSAI), or Open Radio Interface (ORI). The high speed serial link is used to transport the Tx and Rx signals from the BBU to the RRH or AAS. In an RRH, the downlink (Tx) signal is digitally upconverted and amplified on the downlink path. Correspondingly the analog uplink (Rx) signal is processed by a low noise amplifier (LNA), downconverted and digitized. The duplexed outputs from the RRH feed a passive antenna array via a corporate feed network with RET support. The RRH comprises two transceivers, one for each MIMO path. Each transceiver incorporates an upconverter, an amplifier, an LNA, a downconverter, and a duplexer.

In an active antenna, each element in the antenna array is connected to a separate transceiver element. A typical AAS system may therefore have multiple transceivers (for example 8-16). Since there are many more transceivers/amplifiers in an AAS, each amplifier in an AAS delivers a much lower power when compared to an amplifier in an equivalent RRH. The benefits of AAS over an RRH based site architecture include: site footprint reduction, distribution of radio functions within the antenna results in built-in redundancy and improved thermal performance, and distributed transceivers can support a host of advanced electronic beam-tilt features that can enable improvements in network capacity and coverage.

The integration of the radio within the antenna is the elimination of components like cables, connectors, and mounting hardware and an overall reduction in the physical tower space required. By integrating the remote radio head functionality into the antenna, the aesthetics of the site can be improved and wind load reduced, resulting in lower leasing and installation costs.

The active antenna architecture can eliminate a substantial portion of the power losses in the RF feeder cables when compared to a conventional BTS. Additionally, the active antenna can support an electronic beam tilt without requiring a Remote Electrical Tilt (RET) feeder network. This further reduces the power loss for an AAS when compared to an RRH with a RET. In most configurations this can increase the power delivered to the antenna when compared with an RRH. The additional margin can be used to lower the overall thermal dissipation in the amplifiers.

Further, with the radios integrated directly into the antenna housing, and with replacement of a small number of large amplifiers with many small amplifiers, the heat is spread over the larger antenna structure as opposed to the smaller RRH or amplifier shelf. This availability of higher surface area for heat dissipation results lower temperature rises in the components, which results in improved thermal margins and better reliability.

The distributed and redundant architecture of the AAS, wherein each antenna element is fed by its own transceiver, provides reliability benefits as the failure of one transceiver does not cause a critical failure. The system is intelligent and can sense a transceiver failure. When a transceiver does fail, the amplitude and phases on the remaining elements are automatically adjusted digitally to compensate for the elevation beam distortion and the reduction of EIRP on the horizon. With the appropriate sizing of the amplifiers and intelligent readjustment of the amplitudes and phases, the AAS can be designed to have minimal or no loss in coverage performance with a single transceiver failure and minimal degradation with two transceiver failures. Since the likelihood of more than one transceiver failing in a single AAS is minimal, very high system availabilities can be achieved.

Since the AAS can be designed to have minimal loss in performance with a single transceiver failure, repairs and site upgrades for failed units can be delayed and scheduled. For a site with several sectors and bands, multiple unscheduled repair visits (as would be the case for an RRH based system) can be replaced by a single scheduled visit that is less frequent. This can significantly reduce the operational costs for operators.

The AAS can electronically tilt elevation beams by having independent baseband control of the phase, amplitude, and delay of individual carriers on each antenna element. This supports multi-mode systems where different carriers in the same frequency band, with different air interfaces, may require different tilt orientations. The flexibility with tilt control in AAS enables advanced RF planning features, much of which can potentially reduce the cost to operators by reducing the number of sites required. The electronic tilt capability also allows for the separate beam tilting and optimization of the Tx (downlink) and Rx (uplink) paths for cases when the link budgets for the Tx and Rx paths are unequal. It may also be used to optimize cell radii when the physical layer (modulation scheme) for the Tx and Rx paths is different, as is the case with LTE. Tilt can be adjusted on a per-carrier basis. This can be used vertical sectorization in LTE and RAN sharing for UMTS. In UMTS/LTE networks, adding sectors in the vertical plane can be done where the first carrier may cover an inner sector whereas a second carrier covers an outer sector.

As multiple operators vie for precious real estate on tower tops, antenna sharing and RAN sharing amongst two or more operators can be done. The RAN that supports a multicarrier UMTS system is shared by two operators with each operator controlling/owning one or more of the individual carriers. Since the RF planning and site deployments are likely to differ among operators, each UMTS carrier may need to be tilted by different amounts in order for each operator to achieve optimal network performance and optimizing beam tilt on a per-carrier basis based on active channel loading using Self-organizing networks (SON) algorithms can provide even higher network efficiencies.

Figure 2J:
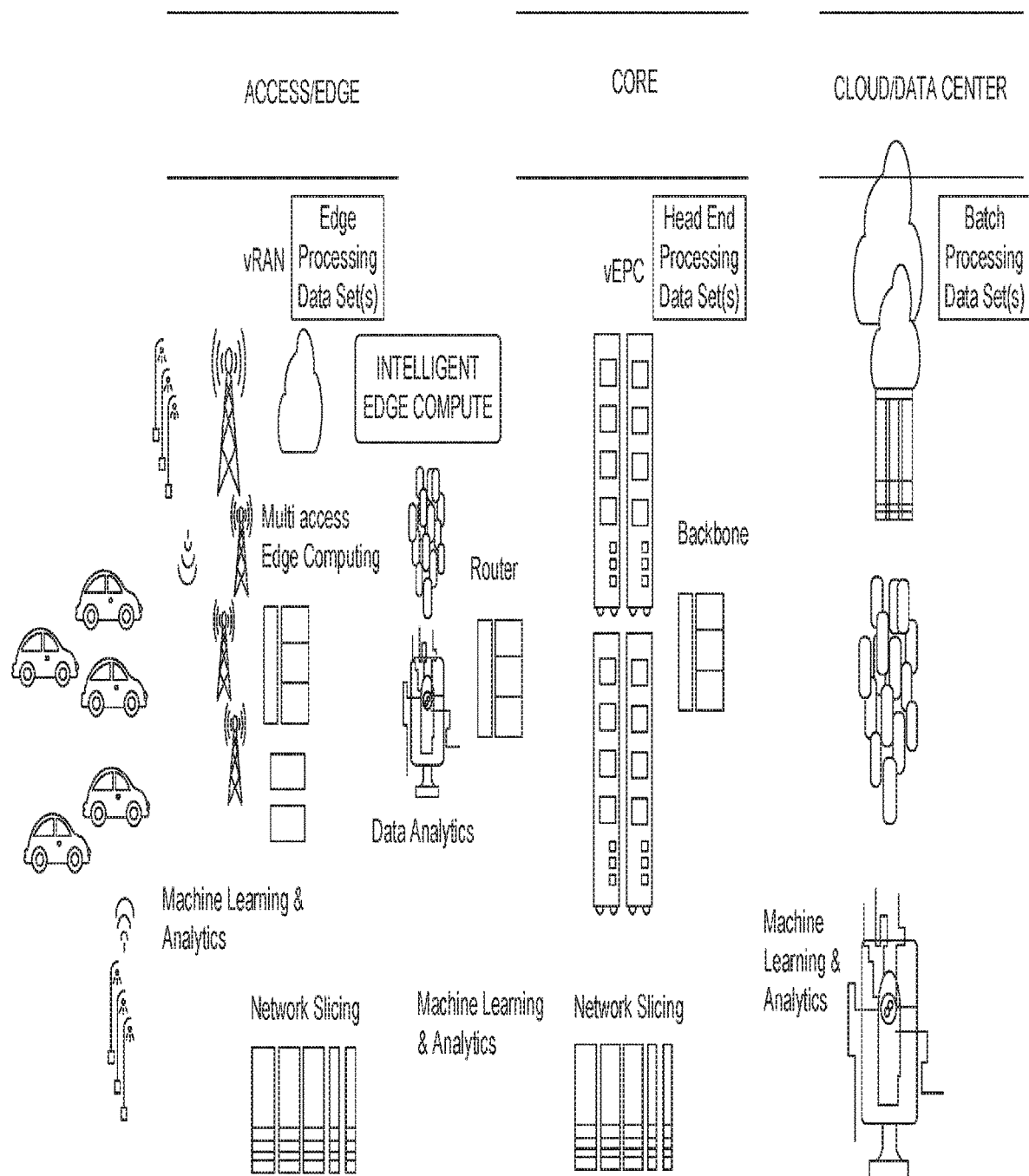
FIG. 2J shows an exemplary edge processing system.

FIG. 2J shows an exemplary edge processing system with an example of Edge Computing Support to Services for Connected and Autonomous Vehicles). In this system, vehicles can off load certain autonomous driving tasks to powerful edge processors (processor, graphical processing units, field programmable gate arrays (FPGA), or specialized learning/inferencing systems), and to edge sensors (radar, lidar, high resolution camera, V2X sensors). Such use of edge processing with low latency allows costs to be shifted from the car or the phone to resources on the 5G network. Battery life also improves due to reduced work on the car or the phone, for example.

Exemplary edge compute systems and methods are described herein. In one embodiment, an antenna system includes edge computing cluster with multiple CPU/GPU on the antenna for the lowest latency. In FIG. 2J, the system includes an antenna, an ultrawideband (UWB) transceiver (5G transceiver) coupled to the antenna (such as a mm antenna), and a compute array including at least a CPU and a GPU to perform edge processing at the antenna site with data sets that require ultra-low latency access. For additional loads that require intermediate low latency access, the processing load can be transferred to a compute cluster of CPUs/GPUs at a 5G head end. For non-time sensitive large loads, cloud servers such as those at a remote data center such as Amazon or IBM data center can process the data and return the result to the phone. Machine learning and analytics are provided at the edge level, the core level, and the cloud/data center level.

To illustrate one example, when an application captures a video of a scene that includes a building with video recognition operations, which may include breaking a frame of video camera input into an array of features and sending those features to the GPUs on the antenna to do feature recognition and send results identifying the building to the application. Alternatively, the system may offload feature recognition processing to an intermediate edge layer, an intermediate core layer, or even to a cloud/data center layer to do batch processing in the cloud if there is no need for instant recognition. While the offloaded feature recognition processes are being executed at one of the layers may continue with other processing, such as rendering, doing a base feature analysis to identify features in frames, and retrieving virtual objects for display to augment captured video camera frames. By intelligently and dynamically determining how to assign processing of components and tasks based on predefined factors, the edge processing may adjust how components and tasks are performed on demand and in a manner that may facilitate efficient use of resources and/or an improved user experience. Thus, the system may determine best resources (e.g., best paths and best processor slicing per GPU) from task to task on an as needed basis, instead of being preprogrammed. This may provide potentially unlimited ability to process components and tasks at least because processing of the components and tasks may be divided up across the network in an intelligent and meaningful way that facilitates efficient use of resources and/or an improved user experience. With low latency of data communications between the application and processing capacity located at the antenna edge of network, specific latency-sensitive and/or computationally intensive components or tasks of client may be offloaded in a manner not doable previously in conventional data-processing architectures. The offloaded tasks may be executed using shared, accelerated microservices at the edge of network, at acceptable latencies due to the 5G speed. In addition, hardware-based encoding and decoding processes on the application and various layers may enable high-speed and/or low-latency offloading such as loading data into flat buffers and streaming the flat buffer data.

In certain examples, the edge processing system may support a virtual reality streaming architecture with end-to-end streaming delivery of virtual reality content on demand and/or in real time (e.g., without having to download data for an entire virtual reality world in advance of rendering). For example, in VR, the cloud layer and the edge layer may receive distinct and matching datasets from a smart phone or an external source for processing. The edge layer may process on its copy of the data stream to generate real-time views, and cloud layer may process on its copy of the data stream to generate batch views. In certain implementations, computing components and/or tasks that may be offloaded to the edge layer may include, without limitation, distributed rendering, certain components or tasks of distributed rendering such as light map and/or light field tasks (calculating and providing a light field), computer vision such as image and object recognition and/or tracking tasks, state management such as state management of a virtual reality world (e.g., state management of rooms and/or users of a virtual reality world), procedural generation of assets such as virtual reality assets, world caching such as virtual reality world caching, screen space processing components or tasks such as calculations related to determining field of view in a virtual reality world, indirect lighting components or tasks such as ray tracing operations, physics processing components or tasks such as fluid dynamics operations, any other suitable components or tasks of an application executing on client device, or any combination or sub-combination of such components and/or tasks. For example, in an AR application, the camera on the glass/phone can capture the environment and edge processors on the 5G network antenna or head end can perform object recognition and sizing and return such info to the glass/phone. When the user selects a prospect furniture, for example, a 3D rendering of the furniture in the environment can be done so that the glass/phone can do AR without consuming significant compute cycle, leading to longer battery life for the client glass, phone, or device. In another application for maintenance, a user can select a unit to be repaired, and the image of the unit is processed by edge processor/GPUs to identify the serviceable unit, and instructions are retrieved from a cloud data center with images, and the edge processor combines the data to overlay with the views on the glass/phone to provide step by step repair instructions to be rendered on the glass, phone, or wearable device to avoid reducing battery life of the wearable device.

In another VR example, a user controlling an avatar in a first-person virtual reality experience may direct the avatar to open a door to a room to reveal a new scene to the avatar. The local edge processors/GPUs may quickly render lower-quality graphics of the room first and then scale up the graphics so that the user can see immediately instead of waiting for higher-quality graphics to become available. In certain implementations, the edge or core layers may provide a close-by cache of graphics at the edge of network to allow fast rendering of a view at low quality while higher-quality models are computed and/or retrieved.

In certain implementations, systems and methods described herein may be used to provide a streaming virtual reality service to end uses of the service. This may include streaming virtual reality data representative of one or more persistent 3D virtual reality worlds, which streamed data may be fundamentally different from virtual reality data representative of other types of conventional virtual reality worlds in various ways. For example, conventional technologies stream virtual reality worlds by virtualizing hardware and software needed to process and render the virtual reality worlds. As such, when a conventional service provides a streaming virtual reality world to a user using this virtualization paradigm, there may be a virtualization of hardware and software of a virtual reality presentation system (e.g., a gaming PC loaded with software representative of the virtual reality world) that exists within the cloud (i.e., exists on one or more servers with which a client device used by the user is communicating by way of a network). The virtualized system may be dedicated to providing a virtual reality world to a particular user and may thus correspond to the client device used by the user in a one-to-one fashion. For example, user inputs may be communicated from the client device to the cloud-based virtualization system, and a video stream may be communicated from the virtualization system back down to the client device.

As a result, users experiencing a virtual reality world by way of this conventional paradigm may be assigned such cloud-based virtualizations of virtual reality presentations systems, and each system may provide a respective user with virtual reality content in essentially the same way that a system would if it were localized to the user, rather than in the cloud. For example, even though a particular user may receive virtual reality data in a stream (e.g., from the cloud) rather than from a local virtual reality presentation system (e.g., a gaming PC owned by the particular user), the software running on the respective virtualized system assigned to the particular user must be compiled, built, and distributed to be run and used by the user. Consequently, just as with non-streamed virtual reality data that is processed and rendered locally, changing aspects of virtual reality data streamed in this conventional way (e.g., aspects such as the presence, behavior, functionality, appearance, etc., of objects within the virtual reality world) may require recompilation, rebuilding, and redistribution of the virtual reality data loaded onto the virtualized system. At the very least, a software patch or the like would need to be distributed and installed by each virtualized system streaming the conventional virtual reality world.

In contrast, virtual reality data representative of persistent 3D virtual reality worlds may operate using a one-to-many stateful paradigm that is fundamentally different from the one-to-one paradigm described above. Rather than loading software representative of the virtual reality world onto dedicated, one-to-one virtualizations of virtual reality presentation systems as described above, a single system maintaining a world state of a persistent 3D virtual reality world (e.g., data representative of which objects are within the world, where the objects are disposed within the world, how the objects are moving and/or interacting within the world, etc.) may deliver the same state information to many different clients (e.g., client devices of different users) that may perform the processing and rendering on their own and/or by offloading certain components or tasks to edge servers relatively proximate to the clients as latency limitations may allow. Accordingly, virtual reality data representative of a persistent 3D virtual reality world may be broadcast or multicast to many client devices simultaneously to allow many users to jointly experience the persistent 3D virtual reality world while only one instance of the world is maintained (e.g., rather than many different instances of the world being maintained on individual virtualized systems, as described above). Additionally, as these persistent 3D virtual reality worlds are continuously streamed, all aspects of the appearance and functionality of the persistent 3D virtual reality worlds and components therein may be modular, open, dynamic, and modifiable at run time.

As such, one benefit of persistent 3D virtual reality worlds (e.g., virtual reality worlds streamed using a stateful, one-to-many paradigm such as described above) is that 3D virtual reality worlds may be dynamically changed (e.g., on demand, at run time as the virtual reality data is streaming) in various ways without the virtual reality data representative of persistent 3D virtual reality worlds being recompiled, rebuilt, or even updated by way of a software patch or the like. For example, as the virtual reality data of persistent 3D virtual reality worlds is streaming, a provider of the virtual reality data may be able to freely add or remove objects from the worlds, add games that may be played by users, update or adjust the code on which the world is running (e.g., to add new features or functionality, to fix bugs, etc.), change the functionality of the worlds (e.g., modify the physics of the worlds, etc.), and/or otherwise dynamically contextualize the worlds in any suitable way.

Another benefit of persistent 3D virtual reality worlds is that virtual reality data of such worlds may be broadcast to many users at once without requiring dedicated virtualizations of hardware and software to be assigned and reserved for all of the users. In some examples, various different persistent 3D virtual reality worlds offered by a provider may be broadcast to a subscriber base of many users as virtual reality experience options. As such, users in the subscriber base may instantly switch from world to world in an analogous way as users may switch through different television channels. Like television channels, various 3D virtual reality worlds may persistently exist and be persistently provided to users as options to experience regardless of which worlds (if any) the users actually select and experience. Also analogous to television channel surfing, client devices used to instantly switch from world to world in this way may not store or receive any data related to the different persistent 3D virtual reality worlds prior to presenting the worlds to respective users. All the data needed to process, render, and present a particular persistent 3D virtual reality world to the user may be provided at run time when the world is selected.

By offloading compute intensive tasks to the 5G network, the result is a high-performance system that is inexpensive yet has low power consumption. For example, in AR/VR application, the 3D rendering can be done at the antenna or head end so that light weight, fashionable glasses can be worn; in autonomous application, non-critical image processing and learning can be offloaded to the edge computers. Example of such automotive applications include the generation of HD maps, in-cab entertainment, non-invasive health monitoring (drugs, distraction, drowsiness, . . . ) among others.

In one embodiment, smart vehicles share the expensive peripherals such as lidars, radars, high resolution cameras, or people/obstacle sensors, which are located at the 5G antennas for rapid local response. It is expected that roll out of 5G would initially be in metropolitan areas, so such sharing results in low vehicular cost as such vehicles would use inexpensive radar and cameras. However, when the smart vehicle leaves 5G coverage area, such resources may not be accessible. In such case, the vehicles would only need inexpensive radars and cameras, with HD maps and inter-vehicle communication for self-navigation.

In another embodiment, a virtual reality/augmented system transfers the graphics processing to the edge node to either 1) save power consumption if the GPU is in the phone, or 2) avoid the cost of a high-end GPU in the phone.

In another embodiment, learning systems on the phone may need to be updated with new training data. Such updates can be offloaded to the GPU on the antenna, and the neural network weights on the learning machine running on the phone can be updated.

In another embodiment, for additional processing need, the CPU/GPU cluster can be located at the head. Such system provides low-latency data communications over a network and utilizes the low-latency data communications and network-based computing resources to optimize performance of computing tasks of an application executing on a client device, particularly performance of computing tasks that are computationally intensive and/or latency sensitive. For example, systems and methods described herein may leverage low-latency data communications and a distributed data-processing architecture to offload performance of select computing tasks of the application to one or more edge computing devices while performing other select computing tasks of the application at the client device. This may allow offloading of certain latency-sensitive and/or computationally intensive tasks that previously could not be offloaded from the client device due to latencies and configurations of conventional data-processing architectures.

The Edge Computing system provides application and content providers with cloud computing capabilities and IT service environment at the very edge of the mobile network. This environment is characterized by the proximity, often in both physical and logical sense, to the clients, enabling very low latency between the client and the server applications, high bandwidth for the application traffic, and near real-time access of the applications to context-rich information, e.g. related to device locations and local radio network conditions. Edge computing thus ensures high quality of experience with highly contextualized service experience and efficient utilization of radio and network resources. The edge processing enables cars, AR/VR units, surround video systems, or other compute intensive devices to better handle the big volume of data while the 5G network can dynamically allocate CPU and Acceleration resources based on the services' needs (e.g., computer vision Vs. video streaming Vs. data aggregation).

Network Slicing can tailor the capacity and capabilities of the network for each different service. Service-specific profiles can be used for dynamic assignment of service-specific HW-acceleration to optimize the compute and storage based on simultaneous services requirements. Network slicing may be implemented based on cloud technologies, SDN, NFV, network orchestration, OpenFlow, etc., and network slices may be configured to meet specific applications, services, and end devices demands. For example, a network slice may be expected to meet certain reliability, latency, bandwidth, and/or other quality-of-service (QoS) requirement.

First, network resource and capability information pertaining to a network may be stored and a request for a network service, from a user, may be received. Network level requirement information, which supports the network service, may be generated based on the request. Available network resources, which satisfy the network requirement level requirement information, may be selected based on the network resource and capability information. The system may select network resources (e.g., communication links, network devices, a RAN, a core network, a data center, etc.) that satisfy the prescriptive information and are available. A cost pertaining to the selected available network resources may be calculated, for example the cost can be indexed to a network resource, a group of network resources, and/or an aggregate of end-to-end network resources, as previously described, based on the selected available network resources.

A network slice deployment layout information may be generated based on the selected network resources and the calculation. For example, depending on the network service requested, the network service may be deployment in a centralized manner or in a distributed manner. Depending on the number of locations of end users relative to the destination network device that provides the network service, transport costs may differ between a centralized-based network slice delivery layout compared to a distributed-based network slice delivery layout. Additionally, for example, for each type of layout (e.g., centralized, distributed, etc.), there may be multiple networks, routing within a network, data centers to use, and/or other network resources from which to select. The system may determine an optimal usage of network resources based on the cost information from an end-to-end network side perspective, a network perspective, and/or a network resource perspective. The candidate network slice deployment layout information may include virtual network function descriptor information, network service descriptor information, and network slice descriptor information. Next, the network slice deployment layout may be provisioned based on the generation. For example, the system can determined the candidate network slice deployment layout information to provision the network service based on the network slice deployment layout information.

The network infrastructure for connected autonomous driving (AD) vehicles will provide not only Network as a Service (NaaS) but also Infrastructure as a Service (IaaS) in a multi-tenancy fashion. The edge computing infrastructure represents a pool of connected resources that can be used by the Mobile Network Operators (MNOs) and also by diverse service/application providers who commercialize services as well as micro-services (e.g., Augmented Reality to serve multiple services, Video Analytics to serve diverse services) for connected AD vehicles. The information exchanged between vehicles, infrastructure, pedestrians, and network using V2X technology enables a multitude of new and exciting applications.

Edge computing deployment can be used for Real-Time Situational Awareness & High Definition (Local) Maps use case due to the real-time and local nature of the information needed for accurate and augmented situational awareness of the road users. An alternative to edge computing is to make the road users themselves create and maintain their real-time situational awareness from the broadcast information they receive from peer users. Edge computing solution allows offloading such tasks to the network edge, by augmenting the broadcast information with other available information via data fusion from available sources, and efficiently broadcast large amounts of data to many users locally.

Advanced Driving Assistance can use the edge processing. In Real-Time Situational Awareness & High Definition Maps use, the system can alert driver of Host Vehicle (HV) moving forward of hazard (icy) road conditions in front. In Cooperative Lane Change (CLC) of Automated Vehicles Driver of Host Vehicle (HV) signals an intention to change the lane with at least one Remote Vehicle (RV) in the target lane in the vicinity of the HV. In See-Through use cases (part of a class of applications called High Definition Sensor Sharing), vehicles share camera images of road conditions ahead of them to vehicles behind them. The See-Through (For Passing) application is an example of an Advanced Driving Assistance application. It warns the driver of a host vehicle who is intending to pass a remote vehicle of potential hazards such as an oncoming remote vehicle in the passing lane or a lack of room in front of the leading remote vehicle. The goal of the use case is to prevent catastrophic head-on collisions during a passing maneuver. Other cases include Safety (intersection assist), Convenience (software update), and Vulnerable Road User (VRU). The VRU use case covers pedestrians and cyclists. A critical requirement to allow efficient use of information provided by VRUs is the accuracy of the positioning information provided by these traffic participants. Additional means to use available information for better and reliable accuracy is crucial to allow a real-world usage of information shared by VRUs. The VRUs making their presence/location known through their mobile devices (e.g., smartphone, tablets), along with vehicle's use of that information, can improve traffic safety and to avoid accidents.

Figure 2K:
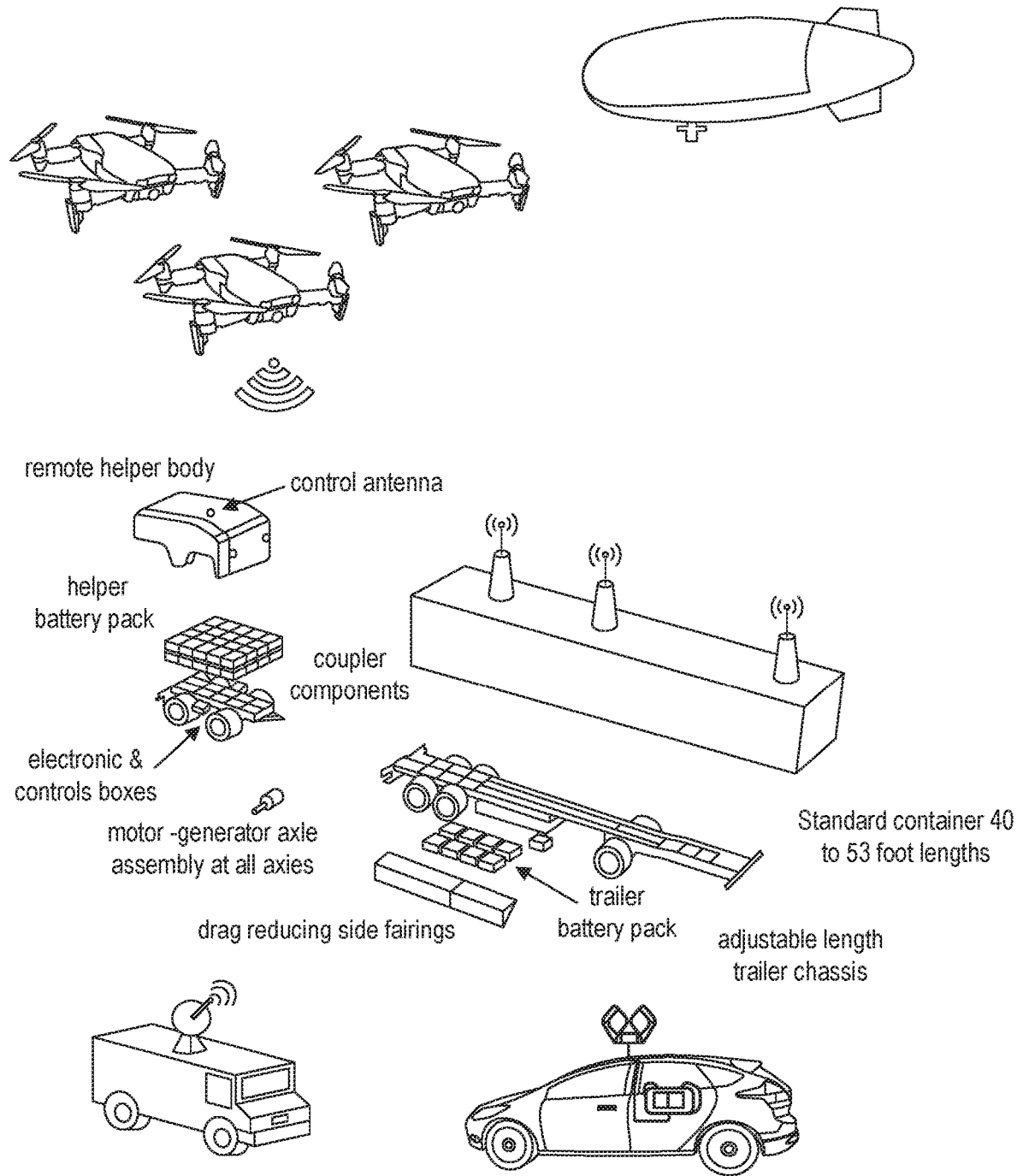
FIG. 2K shows exemplary vehicles that can be used to supplement 5G services as mobile 5G cell towers.

FIG. 2K shows exemplary vehicles that can be used to supplement 5G services as mobile 5G cell towers. For example, drone arrays can be set up to beam signals to client devices and carry 5G active antennas to allow the BS to communicate with the UEs. On the air, balloons/planes/ helicopters, and even LEOs can be used to provide radio communications to the client devices with the 5G active antennas to allow the BS to communicate with the UEs. On the ground, trucks/buses/vans/cars can provide mobile 5G radio support. Such ground vehicles can use elevatable antenna that extends to increase height to the 5G active antennas to allow the BS to communicate with the UEs.

In one embodiment, a hybrid lighter than air/heavier than aircraft or air vehicle can be used as a Geostationary balloon satellites (GBS) are atmosphere analogues to satellites at a fixed point over the Earth's surface and the GBS can carry 5G active antennas to allow the BS to communicate with the UEs. In one embodiment, the lighter than air gas can be helium to ascend, and an airbag that compresses air to allow the drone to descend. Alternatively air can be liquified using ultra low temperature refrigeration such as LN2 cryogenic refrigeration. Solar cells provide energy for the GBS, and the hybrid air propulsion system spends about half of its time as heavier than air and half of its time as lighter than air vehicle to provide propulsion using variable buoyancy propulsion to allow the balloon to move into and maintain its position with minimal power consumption. In another embodiment, in addition to solar panels the GBS can receive laser power from a ground device that the GBS hovers over. Antennas would be auto-steered to aim directly at UEs they communicate with. In yet another GBS embodiment, an autonomous variable density, variable volume articulated aircraft has an aircraft body including a section defining a contractible and expandable aircraft body in cross section, a storage tank fixed to the aircraft body, a mass of first gas having a density less than air within one of the chambers, a medium for readily absorbing large masses of the first gas within the storage tank to appreciably reduce the volume of the one chamber carrying the gas, the amount of the first gas and the absorbing medium being sufficient to permit a change in density of the aircraft from lighter than air to heavier than air and vice versa, a pump to transporting the first gas from the one chamber to the tank absorption thereof, and a pump for selectively driving the gas from the absorbing within the tank to the one chamber for increasing the volume of gas within the compartment and the size of the aircraft body and reduction in density of the aircraft. In one embodiment, the medium for absorbing the first gas comprises water, the aircraft further comprising conduit fluid connecting the one chamber to the storage tank, pump provided within the conduit means for pumping gas from the one chamber to the storage tank and the conduit terminating in a gas diffuser within the tank submerged within the water. One embodiment drives the gas from the absorbing medium with a heater operatively positioned with respect to the tank for heating the solution formed by the water absorbing the first gas to release the gas from the liquid.

In another aspect, a drone can be used to supply the GBS with power. In one embodiment, the drone can swap battery with the GBS. In this embodiment, the GBS has a plurality of energy sources including at least one battery port or chamber having a latch to secure the battery to the GBS. A drone brings up a battery unit near the battery port of the drone, unlatches or unscrews the depleted battery and stores the depleted battery into a chamber. Lowering the battery can disconnect one or more couplings. One or more other disconnects can be used in some implementations. For example, separate quick disconnects can be used for respective high-voltage connection, low-voltage connection and a coolant connection. When the battery is successfully mounted onto the GBS, any quick disconnects on the GBS are then properly connected with corresponding disconnects on the new battery pack. This can ensure proper connection of high voltage, low voltage and liquid coolant to the GBS. For example, the GBS's internal system can check whether there is any water intrusion into the battery pack, or whether there are any short circuits. A replacement battery is then positioned in the exposed battery chamber, and arms on the drone secure the latch to seal the battery chamber. The refueling drone can detach from the GBS and goes to the next battery to be swapped on the GBS, and if done, the drone can return to a home station.

In another embodiment, the GBS is powered by hydrogen fuel cells, and the drone can refuel the GBS with gas or hydrogen fuel. Prior to flying to the GBS to refuel it, the internal hydrogen storage tanks in the refueling drone must be filled. A hydrogen storage subsystem is provided within the transportable hydrogen refueling station to refill or charge the lightweight composite hydrogen storage tanks, a quick connect, which can be any standard hydrogen connector, is used to connect an external hydrogen source to hydrogen storage subsystem. Downstream from the quick connect is a pressure release valve. The pressure release valve is a safety element to prevent hydrogen, at a pressure exceeding a pre-determined maximum, from entering the hydrogen storage subsystem. If the pressure of hydrogen being introduced through the quick connect exceeds a safe limit a restricted orifice working in combination with a pressure relief valve causes the excess hydrogen to be vented through a vent stack. In general, the valves are used to affect the flow of hydrogen within the refueling station. A check valve, between the vent stack and pressure relief valve, maintains a one way flow of the flow of pressurized hydrogen being relived from the storage subsystem. The restrictive orifice also prevents the hydrogen from entering the pressure rated feed line at a rate which causes extreme rapid filling of the lightweight hydrogen storage tanks. Prior to connecting the quick connect nitrogen gas, or other inert gas can be introduced into the feed line to purge any air from the feed line. Pressurized nitrogen dispensed from a nitrogen tank can be introduced through a nitrogen filling valve. One or more hydrogen leak sensors are also distributed and connected to the system controller. The pressure of the gaseous hydrogen is measured by one or more pressure sensors placed in the feed line. The first compressor subsystem contains an oil cooled first intensifier. An oil to air heat exchanger for cooling hydraulic oil which is supplied to a first intensifier heat exchanger to cool the first intensifier. The intensifier is a device, which unlike a simple compressor, can receive gas at varying pressures and provide an output stream at a near constant pressure. However, it may be suitable in some cases to use a compressor in place of an intensifier. The pressure of gaseous hydrogen which enters a second compressor subsystem at about 4,000 psi can be increased to achieve the desired 10,000 psi. The system controller can be used to maintain balance during the refilling of the lightweight composite hydrogen storage tanks by monitoring the pressure of each of the lightweight composite hydrogen storage tanks via adjacent pressure sensors. The system controller, in turn can switch between storage tanks and select which tank to fill at a given time interval during the filling.

The refueling drone can be used for refueling from the high pressure tanks. The hydrogen fueling subsystem is used to refuel an external hydrogen storage vessel in the GBS with pressurized hydrogen from the refueling drone. As the refueling begins after the system controller will check pre-identified parameters, such as, temperature and pressure of the external hydrogen storage vessel, confirmation of ground connection and in some cases, confirmation from vehicles of readiness to fill, in order to determine whether hydrogen should be dispensed to the external hydrogen vessel. The actual hydrogen refueling process can be preceded by safety measures. Pressurized nitrogen, or other inert gas, may be introduced through a purge line into the hydrogen dispensing feed lines to purge any air from the hydrogen dispensing feed lines. The purge is to manage the risk of dangerous hydrogen-air (oxygen) mixtures being formed and or being supplied to the external hydrogen vessel. Purge pressure relief valves are appropriately located to vent gas from the hydrogen dispensing feed lines. One proposed industry standard for a fuel cell vehicle fill coupler is described in the proposed "Fueling Interface Specification" prepared by the California Fuel Cell Partnership that description which is hereby incorporated by reference. The fill coupler, indicated in the proposed "Fueling Interface Specification", has a "smart" connect which, among other parameters, checks the pressure, temperature and volume of hydrogen within the tanks of a vehicle 12 (the external hydrogen storage vessel 25) being refueled. It will also check that the vehicle is grounded. The "smart" fill coupler can communicate with the refueling drone and after the external hydrogen vessel and the fill coupler are connected, recharging or filling of the hydrogen receptacle can occur. When refueling or recharging an external hydrogen storage vessel preferably a map of the external hydrogen vessel should be obtained. A map should check the temperature, volume and pressure of the hydrogen gas in the external hydrogen vessel and the volume pressure and temperature of the hydrogen in each lightweight composite hydrogen storage tanks and the map may include information about the pressure rating and capacity of the external hydrogen vessel. By controlling the temperature of the hydrogen gas during refueling a faster refueling can take place. If the temperature of the hydrogen in the external hydrogen vessel increase past ambient the volume of hydrogen which the external hydrogen vessel can store is decreased. Temperature management supports faster dispensing of dense gaseous hydrogen.

Preferably, the refueling drone designed for boom-type transfers in which a boom controller extends and maneuvers a boom to establish a connection to transfer hydrogen fuel from the refueling drone to the refueling drone. Prior to refueling, the refueling drone extends a refueling probe. The refueling probe, when fully extended, may be long enough for the refueling drone to safely approach and connect to the refueling probe. The distal end of the refueling probe connects to a receptacle 108 on an exterior of the refueling drone.

The refueling drone needs to be able to maneuver into position for aerial refueling and maintain its position during the refueling. The refueling drone includes a navigation system that may be used for positioning the refueling drone during aerial refueling. The GBS navigation system provides inertial and Global Positioning System (GPS) measurement data to the refueling drone via a data link. The navigation system then uses the inertial and GPS data for both the refueling drone and the GBS to compute a relative navigation solution, otherwise referred to as a relative vector. Preferably, the relative navigation solution is a GPS Real-Time Kinematic (RTK)/INS tightly coupled relative navigation solution. The relative navigation solution is calculated based on what data is available to the navigation system and allows the GBS to accurately and confidently maintain its relative position to the refueling drone. The navigation system includes an Inertial Navigation System (INS), a GPS, a navigation processor, and a system processor. The navigation system may have other sensors, such as magnetometer, an air data computer, and antennas for the data link and the GPS sensors. The INS may provide acceleration and angular rate data for the refueling drone. The refueling drone may include a similar INS for generating inertial data to be transmitted to the refueling drone. Typically, the INS relies on three orthogonally mounted acceleration sensors and three nominally orthogonally mounted inertial angular rate sensors, which can provide three-axis acceleration and angular rate measurement signals. For example, the INS may include three accelerometers and three gyroscopes. The three accelerometers and three gyroscopes may be packaged together with a processor, associated navigation software, and inertial electronics. The inertial electronics may be used to convert the acceleration and angular rate data into a digital representation of the data. The type of relative navigation solution provided by the system processor depends on the type of data available to the system processor. The relative position may be a simple difference of the platform (i.e., the GBS and the refueling drone) reported PVTs of a uniquely derived integrated relative GPS/INS solution. The types of platform navigation solutions include a GPS-only solution, a loosely coupled GPS/INS solution, and a tightly coupled GPS/INS solution that incorporates any combination of the other solutions. In addition to the platform PVT solutions, measurement data from both platforms may also available and be used to compute the relative solution independently of the PVT solutions being provided by each platform. It is important to note that the relative navigation solution is not limited to these solutions. For example, the relative navigation solution may also be an ultra-tightly coupled solution. The relative vector is calculated using the available data and processing techniques. A fixed solution is possible when a double difference (DD) process is able to confidently resolve the carrier phase DD integer ambiguities. A float solution is available when there exists five or more common sets (i.e., common to the GBS and the refueling drone) of GPS pseudorange and carrier phase. Relative GPS (RGPS) refers to a GPS-based relative solution that does not take into account the inertial measurement data from either the GBS or the refueling drone. Coupled or blended solutions integrate the available data (both GPS and INS) to form a relative vector between the GBS and the refueling drone. Depending on the distance between the refueling drone and the GBS, and the data link message content, the refueling drone selects the best available solution for relative navigation. The required level of performance, in terms of accuracy and integrity, is a function of the level of safety required for navigation. In general, the closer the GBS is to the refueling drone, the more accurate the relative navigation solution should be to avoid an unanticipated collision, while maintaining the refueling position. The protection levels associated with the relative vector are a function of the type of measurements available for processing and the confidence in those measurements from the GBS to the refueling drone. The protection levels associated with the relative vector may also be a function of the range from the GBS to the refueling drone. With multiple sets of measurement data, it is possible to calculate several relative navigation solutions. For example, if the refueling drone has three EGI systems on board and the GBS has two EGI systems on board, the system processor may form up to thirty independent relative navigation solutions. The multiple navigation solutions may be compared. If one or more of the navigation solutions is not consistent with the other navigation solutions, the system processor 208 may discard the inconsistent relative navigation solutions. In this manner, the failure of a GPS receiver and/or an inertial sensor may be detected and isolated by the system processor 208. A threshold for identifying inconsistent navigation solutions may be adjusted based on the requirements of aerial refueling. Aerial refueling requirements may be set by one or more regulatory agencies.

In one embodiment, a plurality of relative navigation solutions is calculated by the system processor. A flock of bird approach may be used. The type of relative navigation solution can vary based on the data available to the system processor. The number of relative navigation solutions calculated depends on the number of EGI systems on board the GBS and the refueling drone, and the currently available data from each sensor. Preferably, each of the solutions has the same baseline (assumes lever arms between EGI systems and accompanying GPS antennas). Next, the relative navigation solutions are compared with each other. The comparison detects whether any of the relative navigation solutions is inconsistent with the other solutions. An inconsistent solution may be an indication that one or more of the GPS receivers and/or inertial sensors is malfunctioning. The consistency information may be used to form a protection level for the relative navigation solution. The relative navigation solutions are compared to a threshold, such as the protection level determined by the consistency information. At block 308, if a particular relative navigation solution exceeds the threshold, the system processor 208 discards the solution. Otherwise, at block 310, the solution is used to navigate the refueling drone during aerial refueling. As a result, the refueling drone may safely and efficiently rendezvous with the GBS for aerial refueling.

In another embodiment, a kite can be tethered to a ground station and carry 5G active antennas to allow the BS to communicate with the UEs. The kite can carry propeller engines to provide propulsion if needed. The cable tethering the kite to the ground station supplies power and fiber optic broadband communication for the 5G active antennas to allow the BS to communicate with the UEs.

In another aspect, a moveable vehicle including a pole and a top portion to mount 4G antennas and a 5G housing, wherein the pole is retractable and extendable during 5G operation; and one or more antennas mounted on the 5G housing and in communication with a predetermined target using 5G protocols.

In another aspect, a system includes an airborne frame to mount 4G antennas and a 5G housing; and one or more antennas mounted on the 5G housing and in communication with a predetermined target using 5G protocols.

Turning now to the details of the antenna that converts electric currents into electromagnetic waves and vice versa, the antenna can be considered a complex resistive-inductive-capacitive (RLC) network. At some frequencies, it will appear as an inductive reactance, at others as a capacitive reactance. At a specific frequency, both reactance's will be equal in magnitude, but opposite in influence, and thus cancel each other. At this specific frequency, the impedance is purely resistive and the antenna is said to be resonant. The frequency of the electromagnetic waves is related to the wavelength by the well-known equation $A=c/f$, where f is the frequency in hertz (Hz), A is the wavelength in meters (m), and c is the speed of light ($2.998 \times 10^8$ meters/second). Since resonance will occur at whole number fractions (½, ⅓, ¼, etc.) of the fundamental frequency, shorter antennas can be used to send and recover the signal. As with everything in engineering, there is a trade-off. Reducing the antenna's size will have some impact on the efficiency and impedance of the antenna, which can affect the final performance of the system. A half-wave dipole antenna has a length that is one-half of the fundamental wavelength. It is broken into two quarter-wave lengths called elements. The elements are set at 180 degrees from each other and fed from the middle. This type of antenna is called a center-fed half-wave dipole and shortens the antenna length by half. The half-wave dipole antenna is widely used as it cuts the antenna size in half while providing good overall performance. The dipole antenna can have one of the quarter-wave elements of a dipole and allow the ground plane on the product's pc board to serve as a counterpoise, creating the other quarter-wave element to reduce size. Since most devices have a circuit board, using it for half of the antenna is space efficient and can lower cost. Generally, this half of the antenna will be connected to ground and the transmitter or receiver will reference it accordingly. This style is called a quarter-wave monopole and is among the most common antenna in today's portable devices. Another way to reduce the size of the antenna is to coil the element. This is where the straight wire is coiled or wrapped around a non-conductive substrate to create a helical element. This has the advantage of shortening the apparent length, but it will also reduce the antenna's bandwidth. Like an inductor, the tighter the coil and the higher the Q, the smaller the bandwidth.

It is stressed, however, that the present system is not limited to dipole elements, but rather any suitable structure can be utilized. Crossed dipoles are used in many mobile base station antennas to provide orthogonal, dual linear polarization for polarization diversity. The lens may be fed by any style of radiating antenna element such as the patch antenna, open-ended waveguide antenna, horn antenna, etc. Generally, low gain antennas are selected as feed elements for the spherical lens in order to maximize the lens efficiency and the directivity of the secondary radiation beam. The present invention is also capable of operating with multiple polarizations thanks to the spherically symmetric nature of the dielectric lens. The radiating antenna elements may exhibit single linear, dual linear, or circular polarization. Multiple polarizations may be important for future 5G systems where polarization selection may be different depending on the operating frequency and the intended user. Therefore, the multi-beam antenna should perform sufficiently no matter the desired polarization with a minimum of 20 dB isolation between orthogonal polarizations.

In one embodiment, a half-wave dipole antenna receives a radio signal. The incoming radio wave (whose electric field is E) causes an oscillating electric current within the antenna elements, alternately charging the two sides of the antenna positively (+) and negatively (−). Since the antenna is one half a wavelength long at the radio wave's frequency, the voltage and current in the antenna form a standing wave. This oscillating current flows down the antenna's transmission line through the radio receiver (represented by resistor R).

Figure 3A:
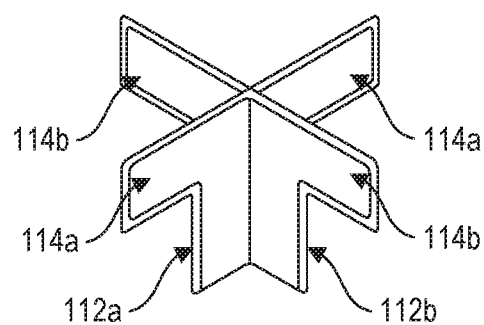
FIGS. 3A-3B show an exemplary antenna element.
Figure 3B:
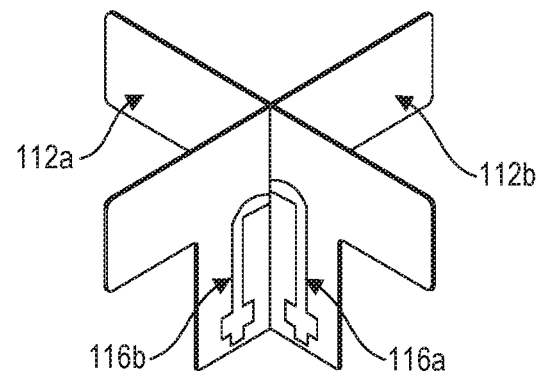

The antenna can be crossed dipole elements. In one illustrative non-limiting embodiment in FIG. 3A, the elements 111 are fabricated from double sided printed circuit board (PCB) material where the +45° dipole PCB material 112a is positioned substantially orthogonal (90°) with respect to the −45° dipole PCB material 112b. Thus as best shown in FIG. 3B, the first portion 112 extends substantially orthogonal to the second portion 114 to form a general T-shape. The first portion 112 is coupled with and extends substantially orthogonal to the inner platform surface 124. The second portion 114 is coupled with the first portion 112 and extends substantially parallel to and spaced apart from both the inner platform surface 120 and the outer lens body surface 104. The focal surface 130 is aligned with the phase center of the element feeding the lens. As shown, the focal surface 130 can be aligned with the middle of the second portion 114, though need not be aligned with the middle of the second portion 114. The particular PCB material may be chosen from a plethora of available materials, but the material is generally chosen to have a dielectric constant value in the range of a=2-5 with a low dielectric loss tangent. For example, a suitable material would be Arlon 25N with a dielectric constant a, : : : , 3.38 and a loss tangent tan 8, : : : , 0.0025. The dipole arms 114a/114b and the baluns 116a/116b are generally copper and can be formed by etching or milling away the copper cladding from the PCB material. The dipole arms 114a/114b form the radiating structures for the antenna while the baluns 116a/116b provide a transition from the feed network generating the proper phase on each dipole arm as those skilled in the art can appreciate. Any suitable structure and arrangement for the baluns 116 can be utilized. Instead of the PCB material, the electrically conductive material used in the antenna can be made of or include an electrically conductive fabric, which can include any kind of electronic textile or "e-textile". E-textiles can include any textile that can be applied to the physical manipulation of electrical or electromagnetic signals or radiation; most often, this is associated with devices that incorporate one or more electronic devices. Conductive fabric used in the manufacture of c-textiles can have a surface resistance ranging from a low of about 0 Q/sq. to a high of about 1 Q/sq. and can provide at least partial shielding and/or at least partial blocking of electromagnetic wave transmission or radiation. Many methods for construction of these conductive fabrics exist, such as weaving metal, metalized fiber strands, or other conducting fabric strands into non-conductive fabric. Another method for constructing conductive fabrics includes spraying and/or painting conductive material onto a base layer, where the base layer is usually non-conductive. Metals that can be used in the construction of electronic textiles can include, but are not limited to, copper, nickel, gold, silver, steal, zinc, tin, tungsten, iron, iridium, aluminum, alloys thereof, or other conductive elements. Metalized fiber strands can include polymers coated with metal. Other conducting fabric strands can include electrically conducting polymers or plastics. Electronic textiles can include multiple metalized fibers wrapped together to form electrically conductive strands. Electronic textiles can include nano-tubes or other Nanoparticles that have advanced electronic function. In another embodiment, the electrically conductive region 130 can be made using metal meshes, such as a copper wire or gold wire mesh. Just as there can be many different means to creating conductive fabrics for use with c-textiles, numerous non-conductive materials can be used in conjunction with the aforementioned conductive materials. Suitable non-conductive materials can include, but is not limited to, nylon, NOMEX®, KEVLAR®, aromatic polyamide polymers, polyester, cotton, Rip-stop nylon, canvas, other common textiles or materials having bulk electrical properties fitting the description a good non-conductor, or combinations thereof. The non-conductive material can be in the form of a web having air or a vacuum dispersed through non-conductive strands.

The antenna element 111 can be a spring-like material, which may be described as any elastic body or device that recovers its original shape when released after being distorted. The spring-like material of the antenna can be deformable and can be conductive, non-conductive, or partially conductive and partially non-conductive. For example, the spring-like material can include, but is not limited to, plastic, metal, rubber, fiber, fiberglass, carbon, carbon-glass composites, or a combination thereof. Other materials that can be used in the support member include shape memory allows, shape memory polymers, or a combination thereof. Suitable shape memory alloys can include, but are not limited to, Ag—Cd 44/49, Au—Cd 46.5/50, Cu—Al—Ni, Cu—Sn, Cu—Zn, Cu—Zn—Si, Cu—Zn—Al, Cu—Zn—Sn, Fe—Pt, Mn—Cu 5/35, Fe—Mn—Si, Pt alloys, Co—Ni—Al, Co—Ni—Ga, Ni—Fe—Ga, Ti—Pd, Ni—Ti, Ni—Mn—Ga, Fe—Ni, Fe—Pt, Fe—C, Fe—Ni—C, Fe—Cr—C, Au—Mn, In—TI, In—Cd, In—Pb, Fe—Pd, Ni—Al, Ti—Mo, Ti—V, Cu—Al, Ti—Ta, or combinations thereof.

Figure 4A:
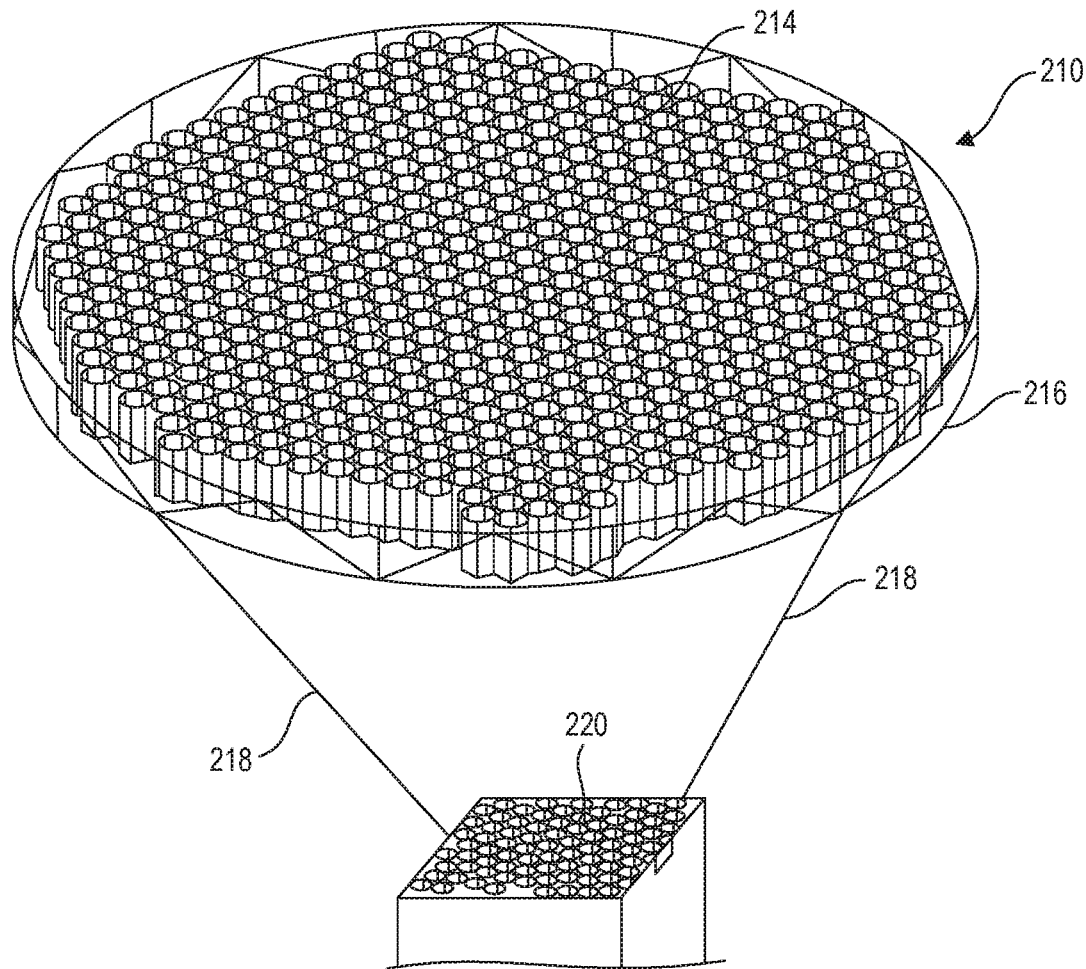
FIG. 4A shows an exemplary array of antennas.
Figure 4B:
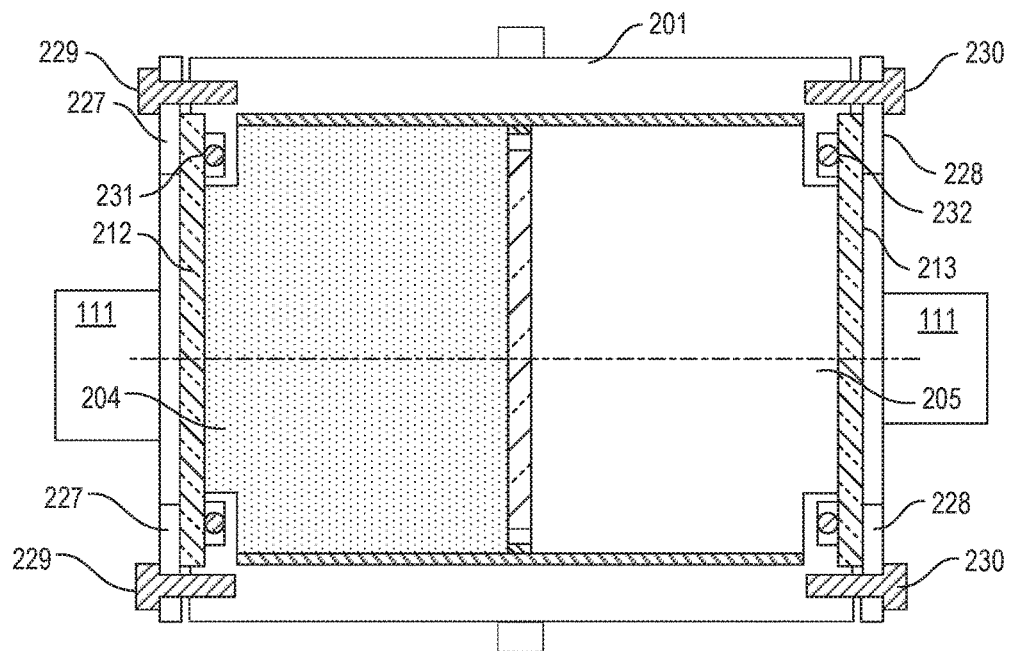
FIG. 4B-4C shows an exemplary lens-based array antenna whose orientation can be controlled.
Figure 4C:
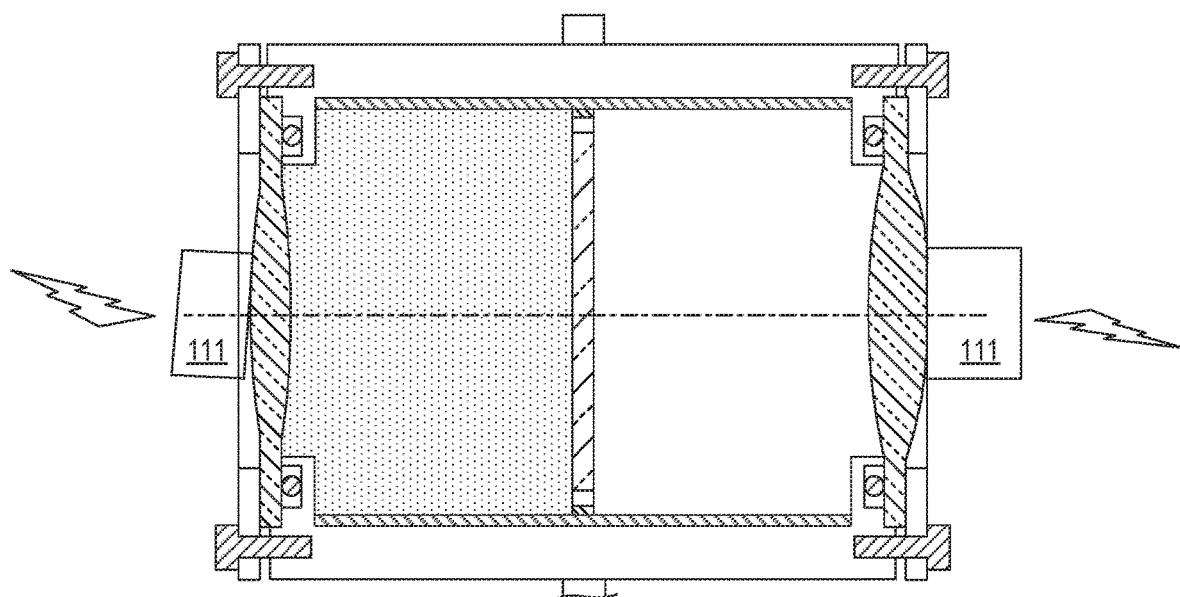
Figure 4D:
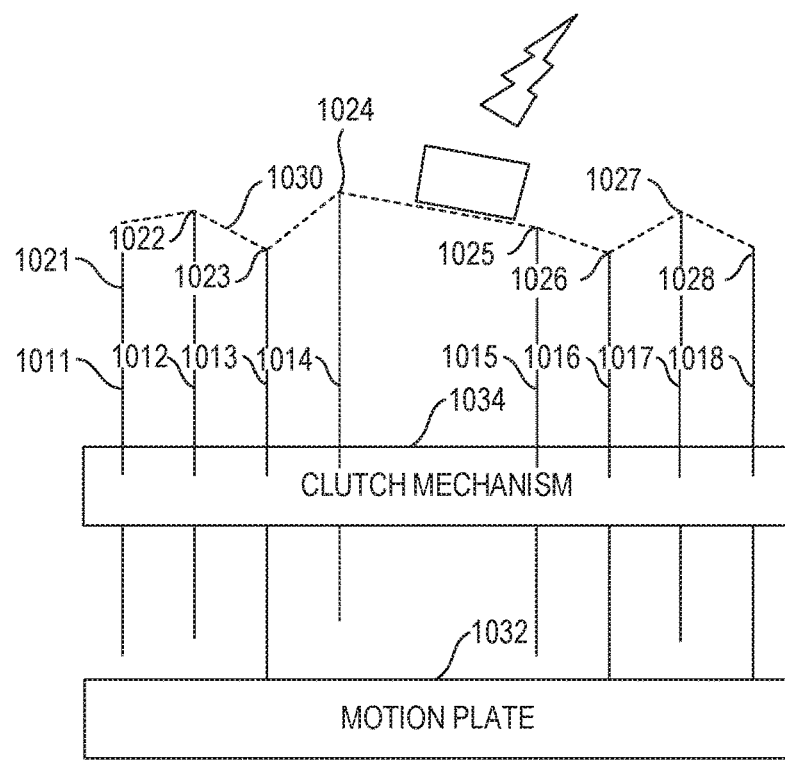
FIGS. 4D-4E shows an array of actuators to point an antenna element in a selected direction.
Figure 4E:
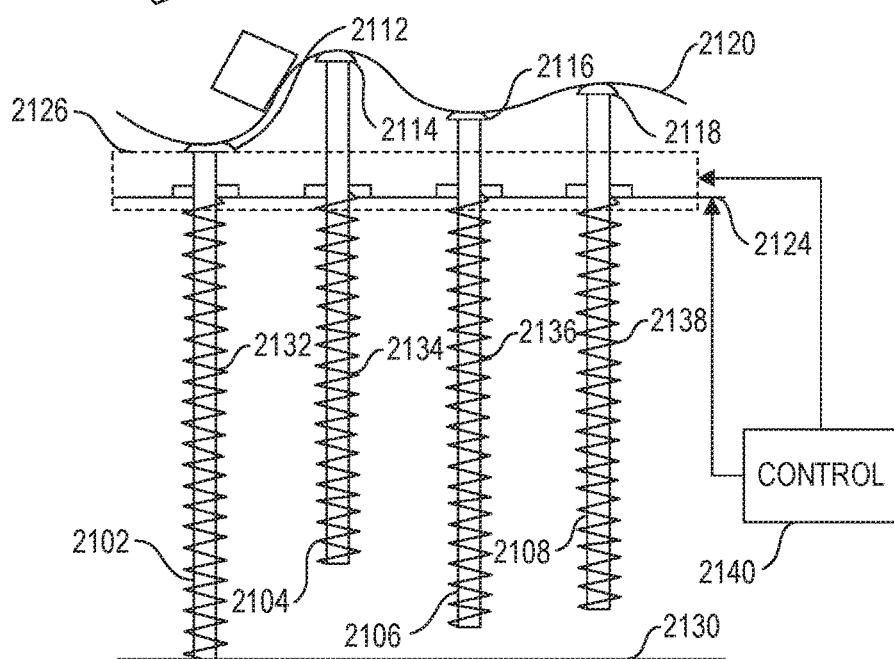

In one embodiment shown in FIG. 4A, a plurality of antenna element 111 can be placed on a substrate in a bee-eye arrangement. In one embodiment of FIG. 4A, the array is fixed. In another embodiment, each element 214 is motorized and steerable. In such motorized embodiment, an array of motors (such as linear motors) can move up and down and affect the directionality of the associated antenna element 111. In the embodiment of FIGS. 4B-4C, liquid lenses are provided on both sides, and antenna element 111 directionality can be fine tuned to optimize communication. The liquid lenses enable the antenna to move similar to the eyes to gaze toward the corresponding remote 5G cellular transceiver.

Turning now to FIG. 4A, a lens antenna system 210 is shown coupled to a conventional deployed small cell. As used herein, the term "lens" can refer to any three-dimensional structure, through which electromagnetic waves can pass and that uses either refraction or diffraction to control the exiting aperture distribution as a function of its position and shape. As used herein, the terms "Fresnel lens" or "Fresnel zone plate" can refer to a type of lens that produces focusing and imaging of electromagnetic waves using diffraction, rather than refraction. It is noted that a lens and hence, a Fresnel lens, are not antennas. An antenna is a transducer that transmits or receives electromagnetic waves. Conversely, a Fresnel lens does not transmit or receive electromagnetic waves. As stated above and as will be discussed in more detail supra, electromagnetic waves are passed through a Fresnel lens wherein said electromagnetic waves may be focused into Fresnel zone regions. The lens system 210 includes tubular waveguide lens cells, indicated generally at 214, interconnected to form a collapsible honeycomb array. The array 214 is constructed of a plurality of cells, each of the cells in the cell array 214 is hexagonal in cross-section as shown at 24 in FIG. 2a with equiangular sides having uniform lengths of about three inches. Each hexagonal cell preferably has a length uniform with other array cells of from six inches to twelve inches, depending upon the particular application and the frequency of the signals to be focused.

Each antenna element can rest on a corresponding actuator to adjust the aiming direction. Alternatively, a group of elements can be moved by one actuator to save cost. Thus, in one system 210, sub-groups of nearly antenna elements can be aimed/focused as a group.

One embodiment mounts the antenna elements on a hard lens at the front and a softer, flexible plastic sheet at the back. In between is a layer of viscous liquid. By pumping more of less of this liquid between the layers, the system can custom fit the curvature of the lens, thus finely aiming the antenna at a target for tuned reception. The system can calibrate the connection by examining the RSSI and TSSI and scan the moveable lens until the optimal RSSI/TSSI levels are reached. In another embodiment, a group of antennas can be moved to optimize data transmission. Two of the lenses can be placed on opposite sides for common control if desired.

FIG. 4B is a sectional view illustrating a liquid lens in which antenna mount portions 212 and 213 provided on the opposite ends of the protection member 201, and are formed of a member that is different from that of the protection member 201. The antenna element 111 is positioned on the liquid lens and can be pointed using the liquid lens, similar to an eye gaze. The antenna mount portions 212 and 213 are pressed by covering members 227 and 228 each having a hole. The covering members 227 and 228 are fixed to the protection member 201 by screws 229 and 230, respectively. To prevent the liquids 204 and 205 from leaking through a gap between the protection member 201 and antenna mount portions 212 and 213, O-rings 231 and 232 are provided between the protection member 201 and the transparent portions 212 and 113.

FIG. 4C is a sectional view illustrating a liquid lens in which antenna mount portions 214 and 215 provided on the opposite ends of the protection member 201. During operation, an elastic member in the middle of the chamber can be used for change in surface shape of the elastic member 206 when the elastic member 206 is moved. In the case of using an incompressible liquid, since volumes of the liquids 204 and 205 are constant before and after the movement of the elastic member 106, the surface shape of the elastic member changes in such a manner that the volumes of the liquids 204 and 205 are constant. Since the surface shape of the elastic member 206 is uniquely determined by the distance of movement of the elastic member 206, the elastic member 206 can be controlled to form a desired surface shape by controlling the position of the elastic member 206.

In an alternate embodiment, instead of liquid lens, an array of actuators can be used to aim the antenna array. Based on the desired antenna directionally, one embodiment of the antenna actuator 1004 forms a 3D shape by having an array of computer controlled moveable pins whose height is adjusted in accordance with the CAD design file, and the overall shape is smoothed by a Lycra sheet or felt sheet. The pins or rods lift the felt or Lycra sheet to form a 3D shape that points the antenna at a desired aim. In this embodiment, an array of N×N micro hydraulic actuators can be used to form the shape. This embodiment is a dense hydraulic planar pin-rod matrix array. Another embodiment actuates an N×N pin-rod matrix driven by servomotors. In either case, each pin-rod is controlled individually, similar to pixels on a screen except that the pixel has height as well.

In some embodiments, an optional automatic focus training mode is provided, wherein the 5G antennas automatically learn the compensation necessary for an individual's unique desired data speed, and thus generate at least some of the desired data speed information for the user. In some embodiments, the process for the focus training mode may operate in the matter of an autorefractor (as referred to an automated refractor), an autorefractor being a computer-controlled machine that may be used during 5G set up, the autorefractor operating to provide an objective measurement of a 5G refractive error and desired data speed for 5G antenna. In some embodiments, 5G antennas may generate a wavefront distortion map for use in evaluating the performance of the 5G antennas.

In some embodiments, an algorithm for a focus training process for the autofocus 5G antennas may include, for each of multiple RF views, such as RF views of targets that are near, medium, and far distances:

(a) Adjusting the lens to determine a setting that provides maximum RF clarity, the setting being a lens offset value; and (b) Saving the lens offset value for use in the automatic adjusting mode for the 5G antennas.

In some embodiments, the focus training mode may include menus that are provided to a user during a focus training process, wherein the focus training process may include the provision of alternative focus settings for a user and providing an inquiry to the user regarding which setting is better in order to hone in on an optimal desired data speed using a binary tree or a learning machine/neural network, among others.

In one embodiment of a process for a focus training mode of autofocus 5G antennas, upon the 5G antennas entering a training mode, a menu sequence for training is loaded to guide a user through the RF focus training process. In some embodiments, the system may instruct the user to view a 5G object at a first distance. In some embodiment, the view may be of symbols or images generated by the 5G antennas that assist a viewer in determining whether an image is in focus. In some embodiments, a set of views with alternative lens settings are provided to the viewer 546, where the set of view may include a first view at a first focus setting and a second view at a second focus setting. In some embodiments, a request is provided to the viewer to choose one view of the set of views as being better focused 548.

In some embodiments, if a certain speed threshold for the testing is not yet met, the process continues with provision of alternative RF focus settings to continue working towards an optimal focus setting for the distance. In some embodiments, if the speed threshold is met, then, if there is an additional distance to test, then the system communicates with an object at a next distance, with the processing returning to providing images with alternative lens settings for view by the user. In some embodiments, if there are no more additional distances to test, then the desired data speed of the user is determined based on the user choices of focus settings, the determined vision desired data speed is stored in the autofocus 5G antennas or in a companion device, and the training mode is ended.

Coinciding with a signing-off of global standardizations for 5G radio technology by 3GPP is the need for faster 6G wireless. One hundred gigabits-per-second speeds will be streamed to 6G users with very low latency. For comparison, the telecommunications union ITU's IMT-2020 has projected that 5G speeds is around 20 Gbps. In contrast, 4G at frequencies below a few gigahertz, provides generally available average downloads speeds at rates below 20 Mbps. High frequencies, in the range of 100 GHz to 1 THz (terahertz) are used for 100 Gbps 6G.

To allow for ease of upgrading from 5G to 6G, reconfigurable antennas can used. A reconfigurable antenna is an antenna capable of modifying its frequency and radiation properties dynamically, in a controlled and reversible manner. The liquid metal antenna discussed above is an example of a reconfigurable antenna. Reconfigurable antennas can tune to different frequency bands. Such an antenna would not cover all bands simultaneously, but provides narrower instantaneous bandwidths that are dynamically selectable at higher efficiency than conventional antennas. Such tunable-antenna technology is an enabler for software-definable radios, the RF front ends of which must be reprogrammable on the fly.

Figure 5A:
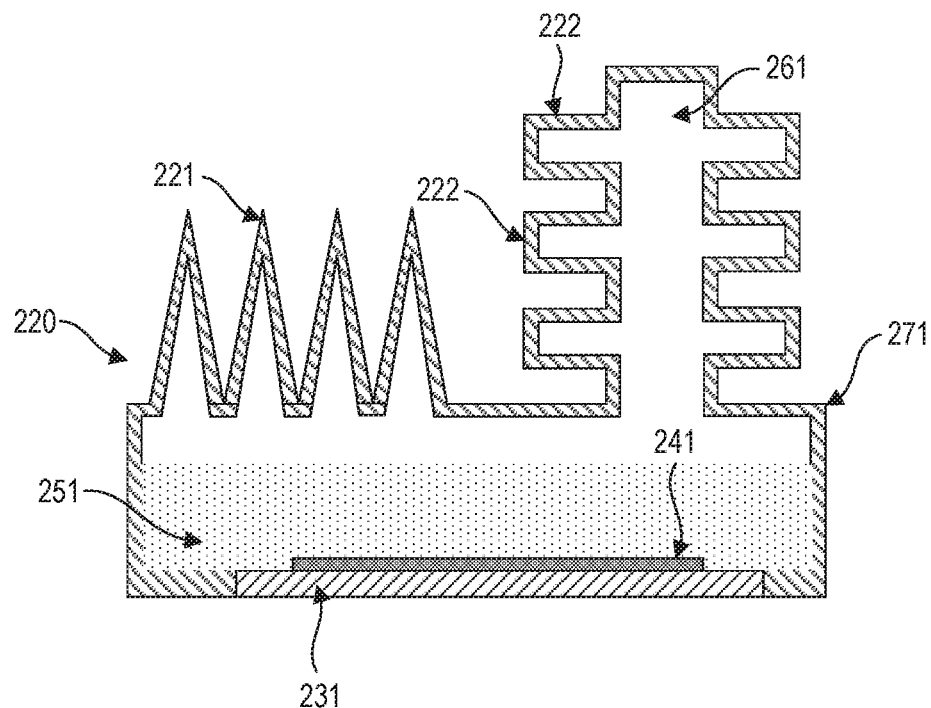
FIGS. 5A-5B show exemplary cooler and antenna combination for 5G electronic chips.
Figure 5B:
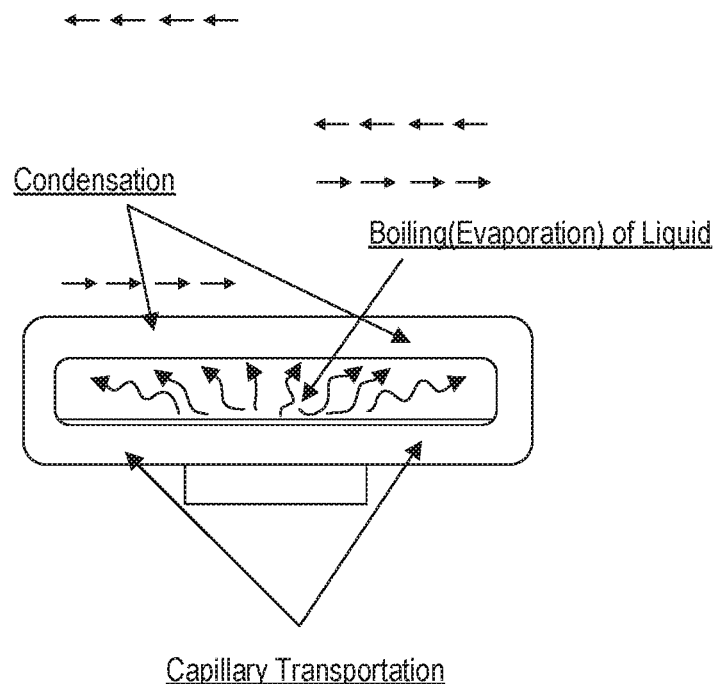

FIG. 5A-5B shows two exemplary 5G IC (such as power amplifier) with integrated cooling heat spreader and antenna structures. FIG. 5A illustrates an example of such a boiling cooler with a vessel 220 enclosed by a body-shell 271 comprising multiple 5G antennas such as upper chambers 221 and 222 in irregular shapes and different heights, for example, on top of a common base chamber. The boiling cooler also comprises a boiling enhancement surface 241 on a thermally conductive side shell 231 (a part of the body-shell 271), partially filled liquid coolant 251. Vapor generated from boiling helps spread heat over all extended space 261 adding extra pathway for cooling through convection. In some cases, the electric circuit module boards and/or system line cards, on which many electric or photonic components/devices are tightly packed, have very stringent requirements in the mechanical design for the associated or integrated coolers. While the embodiment shown in FIG. 5A is shown with the die 241 for horizontal operation, it can be placed for vertical operation.

FIG. 5B illustrates current two-phase cooling chamber with integrated electro-deposited surfaces that utilize boiling (evaporation), condensation, and capillary pumping action. Liquid will be vaporized (boiled) from the electro-deposited surface designed for boiling (evaporation) enhancement, then the vapor will be condensed at the enhanced surface for condensation by electro-deposition on top plate. Finally the condensed liquid will be supplied back to the heated region by another electro-deposited surface aimed for capillary pumping action. The system of FIG. 5B ensures that the heat absorbing surface or coating contacts the liquid coolant to ensure an efficient transfer of heat from the heat source to the liquid and to the rest of the module. The system allows the integrated circuit to run at top performance while minimizing the risk of failure due to overheating. The system provides a boiling cooler with a vessel in a simplified design using inexpensive non-metal material or low cost liquid coolant in combination with a boiling enhancement surface or coating.

Figure 6:
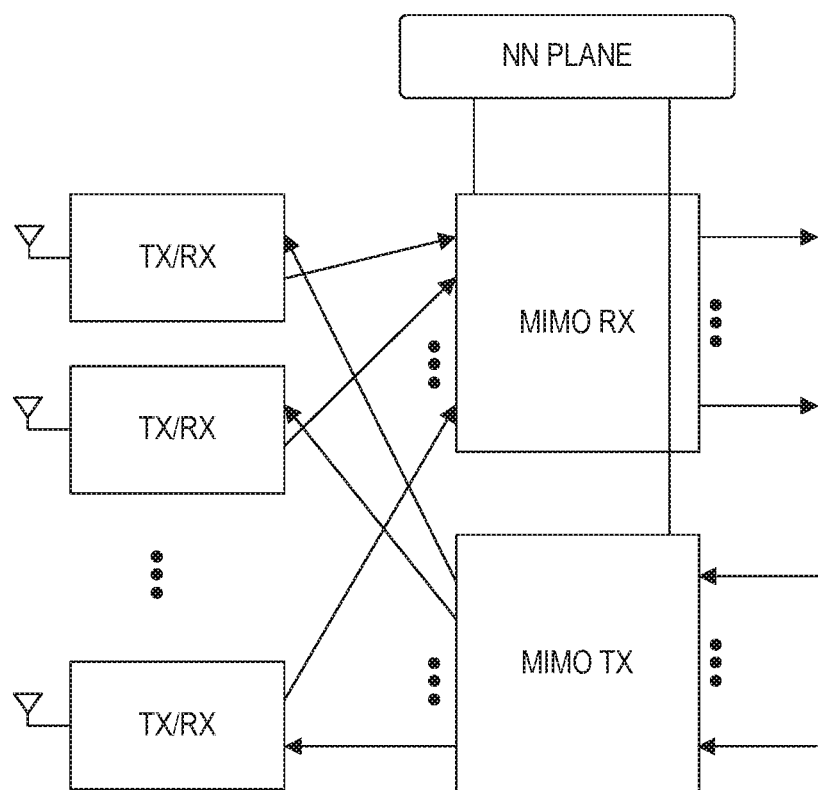
FIG. 6 shows an exemplary neural MIMO system.

FIG. 6 shows an exemplary simplified massive MIMO system with antenna ports for user streams. Each user stream is a spatial stream of data. Each spatial stream that may include data from multiple users that are allocated different frequencies within the same spatial stream, in some embodiments. Further, a given user may be allocated multiple spatial streams, in some embodiments. Therefore, the number of users communicating with the system may or may not correspond to the number of antenna ports. In some embodiments, MIMO RX is configured to perform the functionality of channel estimator, MIMO detector, link quality evaluator, etc. In some embodiments, MIMO TX is configured to perform MIMO precoder.

During operation, a base station selects a number of antennas from among a plurality of available antennas for use in MIMO wireless communications. For example, the system may include 128 antennas but the base station may select to use only 64 antennas during a given time interval based on current operating conditions. The decision of how many antennas to use may be based on user input, a number of users currently in a cell, wireless signal conditions, bandwidth of current communications, desired testing conditions, etc. The base station may select different numbers of antennas at different times, e.g., a larger number during peak communications intervals and a smaller number during trough intervals. The base station determines a number of processing elements for processing received signals from the selected number of antennas. In the illustrated embodiment, this is based on the number of antennas selected and one or more threshold throughput values. In some embodiments, this determination may be based on any of various appropriate parameters in addition to and/or in place of the parameters, including without limitation: the processing capacity of each processing element, the amount of data per sample or entry for various information, a sampling rate, the number of spatial streams, number of users, etc. Determining the number of processing elements may include determining a number of parallel receive chains for MIMO RX. In some embodiments, each receive chain includes a configurable MIMO core and a configurable linear decoder. The base station processes incoming wireless communications using the determined number of processing elements. This may include applying a MIMO signal estimation techniques such as MMSE, ZF, or MRC and decoding received data streams After processing, the decoded data from the determined number of processing elements may be reformatted and routed and transmitted to appropriate destinations (e.g., via another network such as a carrier network, the Internet, etc.). In some embodiments, the base station dynamically switches between different MIMO signal estimation techniques, e.g., based on user input, operating conditions, or any of various appropriate parameters.

The neural network control of the MIMO system may, in some embodiments, facilitate testing of MIMO base stations, reduce power consumption during MIMO communications, allow for flexibility in capacity, allow for flexibility in MIMO signal estimation, allow routing around defective processing elements or antennas, etc. In some embodiments, the base station may also be dynamically or statically customized for a wide variety of operating conditions and/or research needs and may be configured for real-time processing.

The massive MIMO system may be included in base station, for example, and the TXRX data is provided to the neural network plane for optimization. Data on the operation of any of the subunits of the MIMO system can be captured for learning system behavior and for optimizing the system by the neural network or learning machine. In one embodiment, the subsystem includes front-end TX/RX units, antenna combiner, antenna splitter, bandwidth splitter, bandwidth combiner, channel estimator, MIMO detector, and MIMO precoder. Other subsystems of include additional MIMO detectors, MIMO precoders, bandwidth splitters, and bandwidth combiners. MIMO processing can be distributed among various processing elements. This may allow baseband processing to be partitioned across multiple FPGAs, for example. This may facilitate scaling of massive MIMO systems far beyond what a single centralized processing unit could achieve for real-time baseband processing. For uplink symbols, each TX/RX may be configured to digitize the received RF signals, perform analog front-end calibration and time/frequency synchronization, remove the cyclic prefix (CP), and perform FFT OFDM demodulation and guard-band removal. This may result in frequency domain pilot and unequalized data symbol vectors, which is provided to antenna combiner. For downlink symbols, each TX/RX may be configured to perform ODFM processing. The antenna combiner, bandwidth splitter, MIMO precoder, bandwidth combiner, and antenna splitter are each located on a different SDR element that also implements one of TX/RXs. In one embodiment, channel estimator and MIMO detector are located on another SDR element that also implements one of TX/RXs. In various embodiments, the various elements of FIG. 3 may be partitioned among various hardware elements configured to perform the disclosed functionality. The hardware elements may be programmable and/or include dedicated circuitry. Antenna combiner is configured to receive the yet unequalized OFDM symbols from each TX/RX and combines them into a signal sent to bandwidth splitter. This combines the signals from up to N antennas in the subsystem. Combining this information before further processing may allow the system to stay within throughput constraints and may reduce the number of peer-to-peer connections between SDRs, for example. In some embodiments, the number of antennas for which signals are combined by each antenna combiner is dynamically configurable. Bandwidth splitter is configured to split the received signals into separate bandwidth portions and send the portions to MIMO detectors in different subsystems. Thus, in the illustrated embodiment, processing is distributed across different processing elements that each process data for a different frequency band. Each bandwidth portion may include one or more subcarriers and the portions may or may not be non-overlapping. In some embodiments, the number of bandwidth portions and the size of each portion is configurable, e.g., based on the number of antennas, current number of users in communication, etc. In other embodiments, processing may be distributed among processing elements across different time slices in addition to and/or in place of splitting by frequency. In some embodiments, bandwidth splitter is replaced with a time-slice splitter. Post-PTT subcarrier processing in OFDM may be inherently independent, allowing subsequent processing to be performed in parallel by different processing elements. The output of TX/RX can be provided directly to bandwidth splitter and an output of bandwidth combiner is provided directly to TX/RX. In other embodiments, these outputs may be provided to antenna combiner and antenna splitter similarly to the other signals. In embodiments in which TX/RX and bandwidth splitter share the same SDR element and TX/RX and bandwidth combiner share the same SDR element, however, the illustrated coupling may conserve I/O resources. MIMO detector is configured to use an estimated channel matrix (e.g., based on uplink pilot symbols) to cancel interference and detect frequency-domain symbols from each mobile device. As shown, in some embodiments MIMO detector is configured to process signals in a given bandwidth from multiple subsystems of system 300. In the illustrated embodiment, MIMO detector is configured to send the detected signals to channel estimator and to link quality evaluator (included in a central controller in some embodiments) for further processing.

Channel estimator is configured to perform channel estimation for its frequency portion for a number of mobile devices, e.g., to produce soft-bits (also referred to as log-likelihood ratios (LLRs)) and provide them to link quality evaluator (coupling not shown). In some embodiments, multiple decoders are implemented, including a turbo decoder, for example. MIMO precoder is configured to receive downlink data from data source and precode the data based on channel estimates (e.g., estimated reciprocity calibration weights) from channel estimator. In some embodiments, the MIMO precoders are configured to perform precoding on different frequency portions of the downlink data. In some embodiments (not shown), the MIMO precoders in system 300 are configured to perform precoding on different time portions of the downlink data. Bandwidth combiner is configured to combine signals at different bandwidths from multiple MIMO precoders and send the data to antenna splitter. This may result in a complete set of precoded data for transmission from the separately processed bandwidth portions. In other embodiments, bandwidth combiner is configured to combine data corresponding to separately-processed time slices in place of or in addition to combining separately-processed frequency portions. Antenna splitter is configured to split the received signal and provide the split signal to TX/RXs for OFDM processing and transmission to mobile devices or UEs. The set of antennas to which antenna splitter is configured to provide signals is dynamically configurable, in some embodiments (e.g., the number of antennas and/or the particular antennas in the set). Thus, in some embodiments, the set of processing elements configured to perform distributed processing for particular antennas and/or users is dynamically configurable. Link quality evaluator is included in a central control unit and is configured to measure link quality using one or more of various metrics such as bit error rate (BER), error vector magnitude (EVM), and/or packet-error rate (PER).

In various embodiments, the MIMO system is highly configurable, e.g., based on user input and/or by the neural network based on training history and current operating conditions. In some embodiments, various disclosed configuration operations are performed automatically. In some embodiments, the number of processing elements used at a given time to perform distributed processing for a set of users or a set of antennas is configurable. In some embodiments, the number of antennas used to communicate with each UE is configurable and/or dynamically determined. In some embodiments, the processing elements configured to perform different functionality described above is configurable. For example, the antenna combiner function may be moved from one FPGA to another FPGA or performed by multiple FPGAs. In some embodiments, the routing of data between processing elements is configurable, e.g., to avoid malfunctioning antennas and/or processing elements. In some embodiments, for example, system includes 16, 32, 64, 100, 128, 256, or more antennas. In some embodiments, components of system are modular such that the number of antennas may be increased by adding additional components, and each antenna parameters can be captured and learned by the neural network for subsequent optimization during live operation.

Figure 7A:
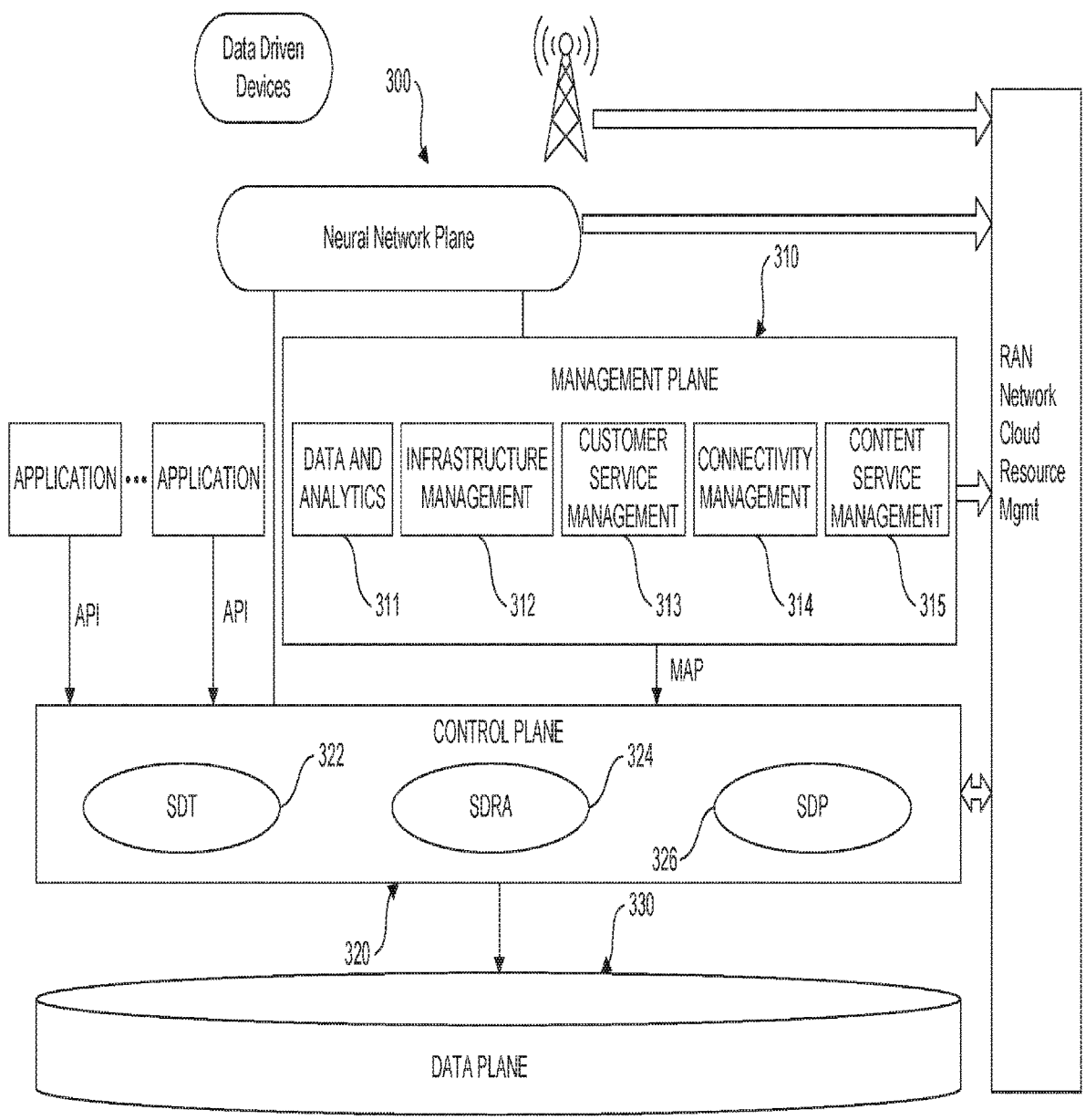
FIGS. 7A-7D show exemplary learning machine processes and architectures.

FIG. 7A shows an exemplary 5G control system that uses learning machines or neural networks to improve performance. The neural network plane provides automated intelligence to select the best operations given particular mobile device or wireless client needs. By enabling both client and infrastructure intelligence, the 5G networked system could reason about the deficiencies it suffers from, and improve its reliability, performance and security. By pushing more network knowledge and functions to the end host, the 5G clients could play more active roles in improving the user-experienced reliability, performance and security. The neural plane sits above the data plane, control plane and management plane. The Control Plane makes decisions about how to set up the antenna settings and where traffic is sent. Control plane packets are destined to or locally originated by the router itself. The control plane functions include the system configuration, management, and exchange of routing table information. The route controller exchanges the topology information with other routers and constructs a routing table based on a routing protocol, for example, RIP, OSPF or BGP. Control plane packets are processed by the router to update the routing table information. It is the signaling of the network. Since the control functions are not performed on each arriving individual packet, they do not have a strict speed constraint and are less time-critical. The Data Plane or Forwarding Plane Forwards traffic to the next hop along the path to the selected destination network according to control plane logic. Data plane packets go through the router. The routers/switches use what the control plane built to dispose of incoming and outgoing frames and packets. The management plane configures, monitors, and provides management, monitoring and configuration services to, all layers of the network stack and other parts of the system. It should be distinguished from the control plane, which is primarily concerned with routing table and forwarding information base computation.

On the client side, the system collect runtime, fine-grained information (protocol states, parameters, operation logic, etc.) from full-stack cellular protocols (physical/link layer, radio resource control, mobility management, data session management) inside the 5G device or phone, and such information is provided to the neural network plane. One embodiment extracts cellular operations from signaling messages between the device and the network. These control-plane messages regulate essential utility functions of radio access, mobility management, security, data/voice service quality, to name a few. Given these messages, it further enables in-device analytics for cellular protocols. The system infers runtime protocol state machines and dynamics on the device side, but also infer protocol operation logic (e.g., handoff policy from the carrier) from the network. The system collects raw cellular logs from the cellular interface to the device user-space at runtime, and then parses them into protocol messages and extracts their carried information elements. The parsed messages are then fed to the analyzer which aims to unveil protocol dynamics and operation logics. Based on the observed messages and the anticipated behavior model (from cellular domain knowledge), the analyzer infers protocol states, triggering conditions for state transitions, and protocol's taken actions. Moreover, it infers certain protocol operation logic (e.g., handoff) that uses operator-defined policies and configurations. It offers built-in abstraction per protocol and allows for customize these analyzers. On the management plane, the system captures full-stack network information on all-layer operations (from physical to data session layer) over time and in space.

This is achieved by crowdsourcing massive network data from mobile devices temporally and spatially. An instability analyzer reports base station stability and reachability to avoid getting stuck in a suboptimal network. The instability analyzer models the decision logic and feeds this model with real configurations collected directly from the device and indirectly from the serving cell, as well as dynamic environment settings created for various scenarios. For example, antenna parameters (pointing direction, frequency, and RSSI/TSSI and channel) are captured to identify optimal settings for a particular device/client. The system can model cellular protocols is derived from the 5G standards for each protocol. This works particularly well for non-moving client devices such as 5G modems/routers and mobile phones that operate within a house or office most of the time, for example. When the mobile device is on the move, population data can be used to optimize antenna and communication parameters to derive the optimal connection for the device or client. For example, the neural network layer can identify clients using the Ultra Reliable Low Latency Communications specification (such as full car automation, factory automation, and remote-controlled surgery where reliability and responsiveness are mandatory) and control the 5G network to respond to URLLC requests by delivering data so quickly and reliably that responsiveness will be imperceptibly fast by selecting appropriate antenna parameters and settings for URLLC from the tower to the client device.

In addition to the neural network plane, the logical function architecture includes a data plane, a control plane, and a management plane. The control plane includes a software defined topology (SDT) logical entity configured to establish a virtual data-plane logical topology for a service, a software defined resource allocation (SDRA) logical entity configured to map the virtual data-plane topology to a physical data-plane for transporting service-related traffic over the wireless network, and a software defined per-service customized data plane process (SDP) logical entity configured to select transport protocol(s) for transporting the service-related traffic over a physical data-plane of the wireless network. The management plane may include entities for performing various management related tasks. For example, the management plane may include an infrastructure management entity adapted to manage spectrum sharing between different radio access networks (RANs) and/or different wireless networks, e.g., wireless networks maintained by different operators. The management plane may also include one or more of a data and analytics entity, a customer service management entity, a connectivity management entity, and a content service management entity, which are described in greater detail below.

The neural network plane works with network functions virtualization (NFV) to design, deploy, and manage networking services. It is a complementary approach to software-defined networking (SDN) for network management. While SDN separates the control and forwarding planes to offer a centralized view of the network, NFV primarily focuses on optimizing the network services themselves. The neural network plane automates the optimization level to the next automation and efficiency.

A virtual service specific serving gateway (v-s-SGW) can be done. The v-s-SGW is assigned specifically to a service being provided by a group of wirelessly enabled devices, and is responsible for aggregating service-related traffic communicated by the group of wirelessly enabled devices. In an embodiment, the v-s-SGW provides access protection for the service-related traffic by encrypting/decrypting data communicated over bearer channels extending between the v-s-SGW and the wirelessly-enabled devices. The v-s-SGW may also provide a layer two (L2) anchor point between the group of wirelessly-enabled devices. For example, the v-s-SGW may provide convergence between the different wireless communication protocols used by the wirelessly-enabled devices, as well as between different wireless networks and/or RANs being access by the wirelessly-enabled devices. Additionally, the v-s-SGW may perform at least some application layer processing for the service related traffic communicated by the wirelessly-enabled devices. Aspects of this disclosure further provide an embodiment device naming structure. For the v-s-SGW. Specifically, a v-s-SGW initiated on a network device is assigned a local v-u-SGW ID. Outgoing packets from the v-u-SGW ID include the local v-u-SGW ID and a host ID of the network device. Accordingly, recipients of those outgoing packets can learn the local v-u-SGW ID and the host ID associated with a particular v-s-SGW, and thereafter send packets to the v-s-SGW by including the local v-u-SGW ID and the host ID in the packet header.

Location tracking as a service (LTaaS) can be provided. The LTaaS feature may track locations of user equipment's (UEs) via a device location tracking as a service (LTaaS) layer such that locations of the UEs are dynamically updated in a LTaaS layer as the UEs move to different locations in the wireless networks. In some embodiments, the LTaaS layer consists of a centralized control center. In other embodiments, the LTaaS layer consists of a set of distributed control centers positioned in the wireless network, e.g., an application installed on a network device, such as a gateway or AP. In yet other embodiments, the LTaaS layer comprises both a central controller center and regional control centers. In such embodiments, the central control center may be updated periodically by the regional control centers, which may monitor UE movement in their respective wireless networks. In embodiments, the LTaaS layer may monitor general locations of the UEs. For example, the LTaaS layer may associate the UE's location with a network device in a specific wireless network, e.g., an access point, a serving gateway (SGW), etc.

Content may be cached in network devices of wireless network or radio access network (RAN) in anticipation that a mobile device or user will want to access the content in the future. In some embodiments, a content forwarding service manager (CFM) may select content to be pushed to a caching location in the wireless network based on the popularity of available content stored in one or more application servers. The network device may comprise a virtual information-centric networking (ICN) server of an ICN virtual network (VN), and may be adapted to provide the cached content to a virtual user-specific serving gateway (v-u-SGW) of a served user equipment (UE) upon request. Notably, the cached content is stored by the network device in an information-centric networking (ICN) format, and the v-u-SGW may translate the cached content from the ICN format to a user-specific format upon receiving the cached content pursuant to a content request. The v-u-SGW may then relay the cached content having the user-specific format to a served UE. After the content is pushed to the network device, the content forwarding service manager (CFM) may update a content cache table to indicate that the content has been cached at the network device. The content cache table may associate a name of the content with a network address of the network device or the virtual IVN server included in the network device. The ICN VN may be transparent to the served UE, and may be operated by one of the wireless network operators or a third party. These and other aspects are described in greater detail below.

The management plane 310 may include entities for performing various management related tasks. In this example, the management plane 330 includes a data and analytics entity 311, an infrastructure management entity 312, customer service management entity 313, a connectivity management entity 314, and a content service management entity 315. The data and analytics entity 311 is configured to provide data analytics as a service (DAaaS). This may include manage on-demand network status analytics and on-demand service QoE status analytics for a particular service, and providing a data analytics summary to a client. The infrastructure management entity 312 may manage spectrum sharing between different radio access network (RANs) in a wireless network, or between wireless networks maintained by different operators. This may include wireless network integration, management of RAN backhaul and access link resources, coordination of spectrum sharing among co-located wireless networks, access management, air interface management, and device access naming and network node naming responsibilities.

The customer service management entity 313 may provide customer service functions, including managing customer context information, service-specific quality of experience (QoE) monitoring, and charging responsibilities. The connectivity management entity 314 may provide location tracking as a service (LTaaS) over the data plane of the wireless network. The connectivity management entity 314 may also have other responsibilities, such as establishing customized and scenario aware location tracking scheme, establishing software defined and virtual per-mobile user geographic location tracking schemes, and triggering user specific data plane topology updates. The content service management entity 315 may manage content caching in the wireless network. This may include selecting content to be cached in RAN, selecting caching locations, configuring cache capable network nodes, and managing content forwarding. In some embodiments, the management plane may also include a security management entity that is responsible for network access security (e.g., service-specific security, customer device network access protection, etc.), as well as inter-domain and intra-domain wireless network security.

The control plane 320 may include entities for performing various control related tasks. In this example, the control plane includes a software defined topology (SDT) logical entity 322, a software defined resource allocation (SDRA) logical entity 324, and a software defined per-service customized data plane process (SDP) logical entity 326. The SDT entity 322, the SDRA logical entity 324, and the SDP logical entity 326 may collectively configure a service-specific data plane for carrying service-related traffic. More specifically, the software defined topology (SDT) logical entity 322 is configured to establish a virtual data-plane logical topology for a service. This may include selecting network devices to provide the service from a collection of network devices forming the data plane 330. The software defined resource allocation (SDRA) logical entity 324 is configured to map the virtual data-plane topology to a physical data-plane for transporting service-related traffic over the wireless network. This may include mapping logical links of the virtual data-plane topology to physical paths of the data plane. The software defined per-service customized data plane process (SDP) logical entity 326 is configured to select transport protocol(s) for transporting the service-related traffic over a physical data-plane of the wireless network. The transport protocols may be selected based on various criteria. In one example, the SDP logical entity selects the transport protocol based on a characteristic of the service-related traffic, e.g., business characteristic, payload volume, quality of service (QoS) requirement, etc. In another example, the SDP logical entity selects the transport protocol based on a condition on the network, e.g., loading on the data paths, etc.

The SDT entity 322, the SDRA logical entity 324, and the SDP logical entity 326 communicate with the neural network plane to optimize the system configuration (including antenna pointing/setting/redundancy assignment, among others), and they may also have other responsibilities beyond their respective roles in establishing a service-specific data plane. For example, the SDT entity 322 may dynamically define key functionality for v-s-SGWs/v-u-SGWs, as well as enable mobile VN migration and provide mobility management services. As another example, the SDRA logical entity 324 may embed virtual network sessions, as well as provide radio transmission coordination. One or both of the SDT entity 322 and the SDRA logical entity 324 may provide policy and charging rule function (PCRF) services.

The SDT entity 322, the SDRA logical entity 324, and the SDP logical entity 326 may collectively configure a service-specific data plane for carrying service-related traffic. Specifically, the SDT entity 322 establishes a virtual data-plane logical topology for the service, the SDRA logical entity 324 maps the virtual data-plane topology to a physical data-plane path for transporting service-related traffic over the wireless network, and the SDP logical entity 326 select transport protocol(s) for transporting the service-related traffic over the physical data-plane.

In one example, the neural network can automatically allocate functions in a mobile network based at least in part on utilization levels. For example, various components of the 5G network can include, but are not limited to, a network exposure function (NEF), a network resource function (NRF), an authentication server function (AUSF), an access and mobility management function (AMF), a policy control function (PCF), a session management function (SMF), a unified data management (UDM) function, a user plane function (UPF), and/or an application function (AF). For example, some or all of the functions discussed herein can provide utilization levels, capability information, locality information, etc., associated with the various functions to a network resource function (NRF) (or other component), for example, such that the NRF or other component can select a particular function of a plurality of possible components providing the same function based on the utilization levels of the particular component. Thus, the system, devices, and techniques broadly apply to selecting network functions, and is not limited to a particular context or function, as discussed herein.

The neural network plane improves the functioning of a network by taking a global management view to optimize the network by reducing network congestion, dropped packets, or dropped calls due to overutilization of resources. Further, the systems, devices, and techniques can reduce a size of components (e.g., processing capacity) by obviating or reducing any need to over-allocate resources to ensure spare capacity to reduce congestion. Further, selecting functions based on utilization levels can reduce signaling overhead associated with dynamically allocating a size of a virtual instance. In some instances, the architecture described herein facilitates scalability to allow for additional components to be added or removed while maintaining network performance. In some instances, optimal functions can be selected in connection with handovers (e.g., intracell or intercell) to balance a load on network functions to provide improved Quality of Service (QoS) for network communications. These and other improvements to the functioning of a computer and network are discussed herein.

In one example, the neural network plane interacts with a user equipment (UE), an access and mobility management function (AMF), a network resource function (NRF), a session management function (SMF), and a user plane function (UPF). The UE can transmit a registration request to the AMF. At a same or different time as the registration request, the UPF can transmit utilization information to the NRF, which in turn communicates with the neural network plane. In some instances, the utilization information can include information including, but not limited to: CPU utilization level; memory utilization level; active or reserved bandwidth; a number of active sessions; a number of allowable sessions; historical usage; instantaneous usage; dropped packets; packet queue size; delay; Quality of Service (QoS) level, antenna efficiency, antenna setting; and the like. Further, the utilization information can include a status of the UPF (e.g., online, offline, schedule for maintenance, etc.). In some instances, the UPF can transmit the utilization info at any regular or irregular interval. In some instances, the UPF can transmit the utilization info in response to a request from the NRF, and/or in response to a change in one or more utilization levels above or below a threshold value.

Next, the UE can transmit a session request to the AMF, which in turn can transmit the session request to the SMF. In some instances, the session request can include a request to initiate a voice communication, a video communication, a data communication, and the like, by and between the UE and other services or devices in the network. The SMF in turn talks to the neural network plane for management. Based on its learned optimization, the neural network plane communicates instructions to the SMF. At least partially in response to receiving command from the neural network plane, the SMF can transmit a UPF query to the NRF. In some instances, the UPF query can include information including, but not limited to: a type of session requested by the UE (e.g., voice, video, bandwidth, emergency, etc.); services requested by the UE; a location of the UE; a location of a destination of the session requested by the UE; a request for a single UPF or a plurality of UPFs; and the like.

In some instances, at least partially in response to receiving the UPF query, the NRF can provide a UPF response to the SMF. In some instances, the UPF response can include one or more identifiers associated with one or more UPFs that are available to provide services to the UE. In some instances, the UPF response can be based at least in part on the session request and/or on the utilization info received from the UPF (as well as other UPFs, as discussed herein).

Based at least in part on the UPF response, the SMF can select a UPF (e.g., in a case where a plurality of UPF identifiers are provided to the SMF) or can utilize the UPF provided by the NRF for a communication session. The SMF can select a UPF and can transmit a UPF selection to the UPF that has been selected and/or designated to provide communications to the UE.

At least partially in response to the UPF selection, the UPF can provide services to the UE. As discussed herein, the UPF can facilitate data transfer to and/or from the UE to facilitate communications such as voice communications, video communications, data communications, etc.

In this manner, the neural network plane incorporates intelligence in providing services to requests in a way that optimizes system hardware and software resources and overall cost. Such services may include the edge processing services discussed above.

Next, an example process is disclosed for selecting a network function, such as a user plane function, based on utilization information learned by the neural network. The example process can be performed by the neural network in conjunction with the network resource function (NRF) (or another component), in connection with other components discussed herein. First, the neural network receives utilization information associated with one or more network functions, such as one or more user planes. Although discussed in the context of a UPF, this process apply equally to other network functions, such as a network exposure function (NEF), a policy control function (PCF), a unified data management (UDM), an
authentication server function (AUSF), an access and mobility management function (AMF), a session management function (SMF), an application function (AF), and the like. In one example, user planes in a network can transmit utilization information to the NRF. In some instances, the NRF can request utilization information from various UPFs (or any network function) on a regular schedule, upon receipt of a request to initiate a communication, and then forwarding such information to the neural network plane for training, for example. In some instances, the UPF (or any network function) can transmit utilization information upon determining that a utilization level has changed more than a threshold amount compared to a previous utilization level. In some instances, utilization information can include, but is not limited to, one or more of: CPU utilization (e.g., % utilization), bandwidth utilization, memory utilization, number of allowable sessions, number of active sessions, historical utilization information, expected utilization levels, latency, current QoS of active sessions, and the like. Further, in some instances, the neural network can receive capability information associated with the user plane(s) (or any network function), location information associated with the user plane(s) (or any network function), etc. Such utilization information, capability information, location information, etc. can be stored in a database accessible by the NRF.

Next, the process can include receiving a request for a network function, such as a user plane, the request associated with a user equipment. For example, a request can be received from a session management function (SMF) or an access and mobility management function (AMF) (or any network function) for a user plane (or any network function) to initiate a communication for a user equipment. In some instances, the request can indicate a number of user planes (or any network function) to be provided by the NRF (e.g., one or many). In some instances, the request can include information associated with the communication, such as a type of the communication, locations of the UE and/or the destination of the communication, specialized services (e.g., video encoding, encryption, etc.) requested in association with the communication, a bandwidth of the communication, a minimum QoS of the communication, and the like. In some instances, the request can be based at least in part on a request initiated by the UE and provided to the AMF, the SMF, or any network function.

Operations by the neural network plane includes determining one or more network functions (e.g., user planes) based at least in part on the request and the utilization level. For example, the neural network plane can include determining that a first user plane (or any network function) is associated with a first utilization level (e.g., 80% CPU utilization) and a second user plane (or any network function) is associated with a second utilization level (e.g., 30% utilization level). Further the neural network can include determining that the first utilization level is above a utilization threshold (e.g., 70% or any value) such that addition assignments of UEs to the UPF (or any network function) may degrade a quality of connections associated with first UPF (or any network function). Accordingly, the neural network can determine that the first UPF (or any network function) is to be selected to provide data traffic for the UE.

As can be understood herein, there may be a variety of learning algorithms or ways to determine which user planes (or any network function) are to be selected as available for a communication. In some instances, the neural network can include determining that the utilization level of the second user plane (or any network function) (e.g., 30%, discussed above) is lower than the utilization level of the first user plane (or any network function) (e.g., 80%, discussed above), and accordingly, can determine that the second user plane (or any network function) is to be selected for the communication.

The neural network determines a plurality of user planes (or any network function) that are available for a communication (e.g., that have a utilization level below a threshold value). In some instances, the user planes (or any network function) can be selected based on a proximity to the UE, capabilities requested by the UE, etc. In some instances, the operation 506 can include ranking or prioritizing individual ones of the plurality of user planes (or any network function) as most appropriate to be selected for the communication. The neural network then provides an identification of the one or more user planes (or any network function) to a session management function (SMF) (or any selecting network function) to facilitate a communication with the user equipment. For example, the operation by the neural network can include providing an address or other identifier corresponding to one or more UPFs (or any one or more network functions) to an SMF (or any selecting network function) in the network. In the case where one user plane (or any network function) is provided, the SMF (or any selecting network function) may utilize the explicit user plane (or any network function) identified by the NRF. In the case where more than one user plane (or any network function) is provided, the identification may include additional information to allow the SMF (or any selecting network function) to select a user plane (or any network function), as discussed herein.

In another example for selecting a user plane function based on utilization information during a handover performed by the neural network (or another component), in connection with other components discussed herein. As usual, the neural network has utilization information associated with one or more user planes which provide utilization information to NRF that in turn sends the info to the neural network layer. Upon receiving a request for a user plane, the neural network plane can include providing a first selection of at least one first user plane based at least in part on the request and the utilization information. The operation can include the providing, allocating, and/or selecting at least one user plane based on utilization information to balance a load across a plurality of available user planes. In some instances, the operation 606 can include establishing a communication for the UE at a first radio access network (RAN) utilizing the first user plane. The neural network can receive an indication of a handover request. For example, as a UE moves about an environment, a signal quality can decrease between the UE and the first RAN. Accordingly, the neural network can automatically change antenna parameters first based on learned parameters, and if that does not change signal quality, the neural network can determine that a handover should occur, based on one or more of, but not limited to: signal strength of an anchor connection (e.g., a signal strength of the first RAN); signal strength of a target RAN (e.g., a signal strength of a second RAN); latency; UE speed/direction; traffic level(s); QoS; etc. In some instances, the neural network determines that a new user plane is required/desired based at least in part on the indication of the handover request. The neural network plane can provide a second selection of at least one second user plane based at least in part on the handover request and the utilization information. For example, the at least one second user plane can include user planes suitable and available to facilitate a communication with the UE. In some instances, the above operations can be repeated as a UE moves about an environment (and/or in response to initiate a handover based on UPF maintenance, for example). That is, the operations can be repeated continuously or periodically to determine a user plane to facilitate a communication while balancing a load of the user planes.

The neural network plane can automatically configure the direction of antennas and combine antennas in a massive MIMO antenna by first focusing the antenna on the UE device (which optimizes the directionality of the wireless link between the BS and the UE), and then transmitting first pilot signals via each of multiple antennas of the UE; receiving antenna combining information from a base station (BS), the antenna combining information for combining the multiple antennas into one or more antenna groups and an orthogonal sequence allocated to each of the one or more antenna groups; and transmitting second pilot signals to the BS using the allocated orthogonal sequences, wherein the second pilot signals are used for estimating downlink channels from the BS to the UE, wherein the antenna combining information is determined based on correlation of each of the multiple antennas obtained from the first pilot signals, and wherein a same orthogonal sequence is applied to a second pilot signal transmitted via one or more of the multiple antennas belonging to a same antenna group. The neural network can send a preferred antenna combination that is sent to the BS based on one or more of the following: 1) minimize a correlation between effective channels of the one or more antenna groups, 2) an amount of data to be transmitted, 3) second pilot signals. The second pilot signals can be captured during different time periods than a time period during which a UE of belonging to a second UE group transmits the second pilot signals. The 1st pilot signal can be transmitted by the UE even after the UE configure the antenna combination. In this case, the base station may configure new antenna combination based on the previous antenna combination (mapping between one logical channel and another logical channel). Based on this, the base station may determine antenna combining information and transmit it to the UE and to make each of the logical (effective) channels become orthogonal to each other. The neural network plane monitors performance and can automatically reconfigure or modify antenna combination when the SINR of the received signals become poor over a predetermined period of time. Based on this request, the base station may receive the antenna combining information again and transmit it to the UE. The neural network plane may determine the antenna combining information to minimize the biggest correlation value between the effective channels. Or, it may determine to make the biggest correlation value between the effective channels less than a threshold value. By doing this, the base station may prevent the antenna groups from being aligned in the same direction. In another example, suppose there are 2 UEs (UE a and UE b) and that the UE a has lots of data to be transmitted/received while there are little for UE b. In this case, the neural network provides more effective channels to UE a while UE b gets fewer number of effective channels. In another example, the UE may determine the preferred antenna combining method based on the ACK/NACK of the received data. When the number of effective channels increases, the more diversity gain can be acquired. So, the UE of this example request more number of effective channels when the decoding results of the received data is NACK for certain number of time. Otherwise, the UE may request less number of effective channels. In still another example, the UE may determine the preferred antenna combining method based on the estimated channel information. The above preferred antenna combining methods of the UE can be controlled and granted by the network. The neural network may consider not only the UE transmitted this preferred antenna combining method, but other UEs within the cell.

Figure 7B:
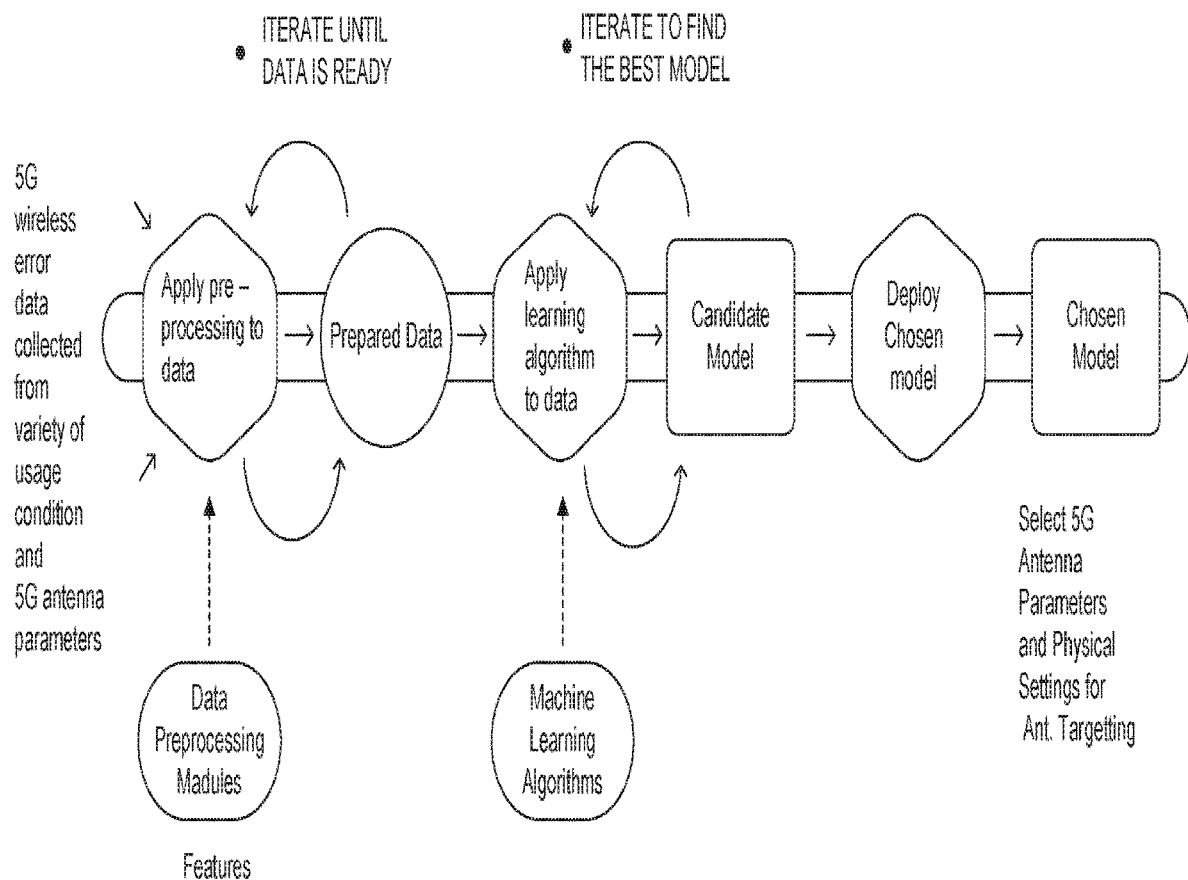

In one implementation, FIG. 7B shows an exemplary learning machine to automatically adjust the position/aim of the antennas to optimize data transmission performance and/or coverage. As noted earlier, 4G systems have range but lack speed. 5G systems have speed but requires more antennas and generally lacks the range of 4G systems. To optimize performance, a learning machine is used to automatically track a mobile device and adjust the best arrangement for the antenna arrays. The process is as follows:

Collect performance data from subsystems (see above) such as: Spatial and Modulation Symbols, RSSI, TSSI, CSI (channel state information), and attributes on channel matrix and error vector magnitude, for example Extract features and train learning machine to optimize spectral efficiency and energy efficiency of the wireless system During live communication, extract features from live 5G data and select antenna orientation/setting/params based on client device, resources available, and tower network properties for optimum transmission.

Figure 7C:
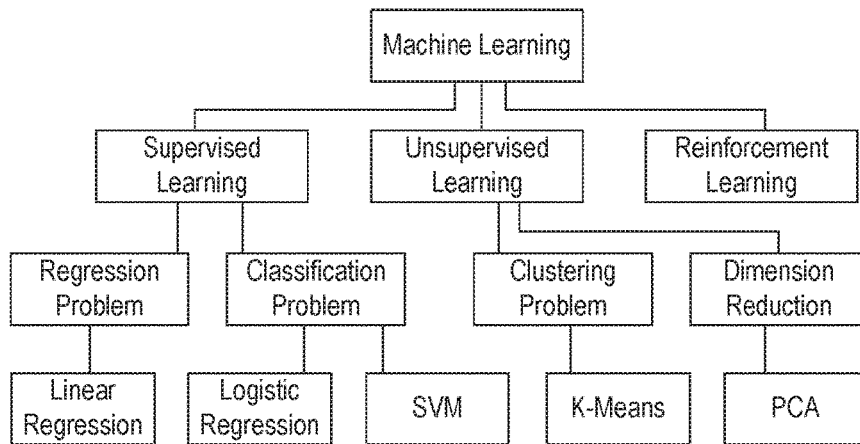
Figure 7D:
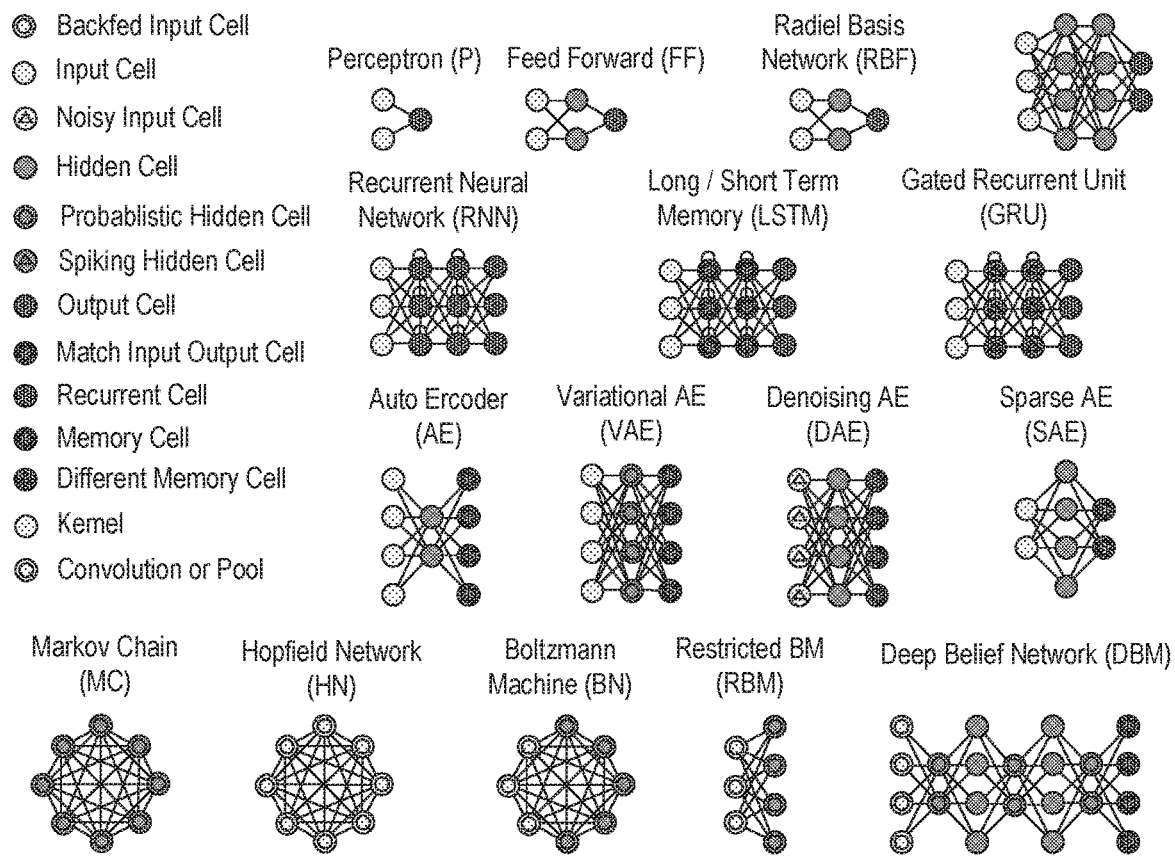

FIGS. 7C-7D show exemplary learning machine details. While the learning machine optimizes all resources, details on the antenna are discussed next, with the expectation that other resource allocations. The learning machine turn the antenna arrays "smart" so that the best antenna linkage between transceivers is achieved. Further, when one of the antenna elements in the array fails, the beamforming and beamsteering performance of the array degrades gracefully. Such an objective is achieved by reconfiguring the array when an element is found to be defective, by either changing the material properties of the substrate or by applying appropriate loading in order to make the array functional again. One embodiment changes the excitation coefficient for each array element (magnitude and phase) to optimize for changes due to the environment surrounding an array antenna. Using learning machines, one can train the antenna array to change its elements' phase or excitation distribution in order to maintain a certain radiation pattern or to enhance its beamsteering and nulling properties and solve the direction of arrival (DOA) as well.

The neural network control of the MIMO antennas provides significant gains that offer the ability to accommodate more users, at higher data rates, with better reliability, while consuming less power. Using neural network control of large number of antenna elements reduces power in a given channel by focusing the energy to targeted mobile users using precoding techniques. By directing the wireless energy to specific users, the power in channel is reduced and, at the same time, interference to other users is decreased.

In addition to controlling the 5G operation, the neural network can be used to provide local edge processing for IOT devices. A striking feature about neural networks is their enormous size. To reduce size of the neural networks for edge learning while maintaining accuracy, the local neural network performs late down-sampling and filter count reduction, to get high performance at a low parameter count. Layers can be removed or added to optimize the parameter efficiency of the network. In certain embodiments, the system can prune neurons to save some space, and a 50% reduction in network size has been done while retaining 97% of the accuracy. Further, edge devices on the other hand can be designed to work on 8 bit values, or less. Reducing precision can significantly reduce the model size. For instance, reducing a 32 bit model to 8 bit model reduces model size. Since DRAM memory access is energy intensive and slow, one embodiment keeps a small set of register files (about 1 KB) to store local data that can be shared with 4

MACs as the leaning elements). Moreover, for video processing, frame image compression and sparsity in the graph and linear solver can be used to reduce the size of the local memory to avoid going to off chip DRAMs. For example, the linear solver can use a non-zero Hessian memory array with a Cholesky module as a linear solver.

In another embodiment, original full neural network can be trained in the cloud, and distillation is used for teaching smaller networks using a larger "teacher" network. Combined with transfer learning, this method can reduce model size without losing much accuracy. In one embodiment, the learning machine is supported by a GPU on a microprocessor, or to reconfigure the FPGA used as part of the baseband processing as neural network hardware.

Figure 8:
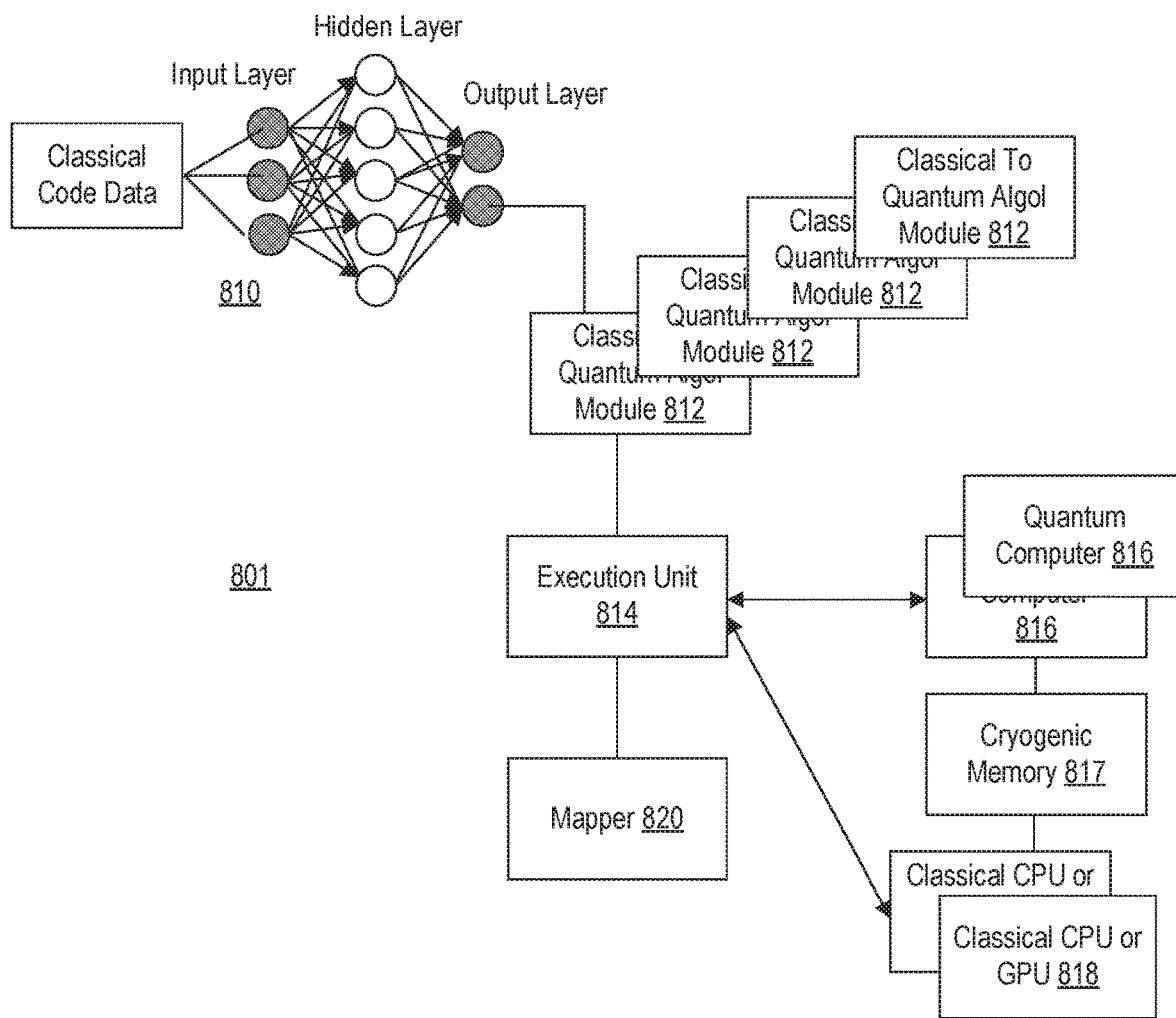
FIG. 8 shows an exemplary hybrid classical/quantum computer supporting edge computing near the antenna towers.

FIG. 8 shows an exemplary hybrid classical/quantum computer supporting edge computing near the antenna towers. FIG. 8 shows an exemplary a block diagram of a system 810 for hybrid classical and quantum programming according to one or more embodiments described herein. Repetitive description of like elements employed in other embodiments described herein is omitted for sake of brevity.

A hybrid classical quantum computer with neural network code translator is presented.

In one aspect, a system includes a neural network 81 that receives classical specification and data and determines if a portion of such specification is best suited to run on a quantum computer and if so selects a conversion module 812 that maps classical to quantum algorithm; the modified code is provided to an execution unit 814 that selects one or more quantum computers 816 or classical CPU/GPU/neuromorphic processors 818. Also, the neural network maps the data to a cryogenic memory 817 or use by either computers 816 or 818. The result is received by the execution unit 814 and mapped to a predetermined format as output using mapper 820.

In one aspect, a system includes a neural network 10 that receives classical specification and data and determines if a portion of such specification is best suited to run on a quantum computer and if so selects a conversion module 12 that maps classical to quantum algorithm; the modified code is provided to an execution unit 14 that selects one or more quantum computers 16 or classical CPU/GPU/neuromorphic processors 18. Also, the neural network maps the data to a cryogenic memory 17 or use by either computers 16 or 18. The result is received by the execution unit 14 and mapped to a predetermined format as output using mapper 20.

In FIG. 8, classical code is provided to a learning machine such as neural network 81 that is trained to map code from classical code to a matching quantum algorithm module 812. The classical code can be a high level language such as Ada, Fortran, Java, C, or pseudo-code, for example. A parser can reduce a generalized computing problem to a base computing problem. For instance, the problem parser can utilize reduction to translate a non-3-SAT NP-complete problem to a 3-SAT instance. Other implementations are also possible.

In one aspect, a system includes a neural network 810 that receives classical specification and data and determines if a portion of such specification is best suited to run on a quantum computer and if so selects a conversion module 812 that maps classical to quantum algorithm. One classical to quantum algorithm module 812 reduces a first code of a problem type, e.g., a first NP-complete problem, to a second NP-complete problem associated with a quantum circuit or code.

The modified code is provided to an execution unit 814 that selects one or more quantum computers 816 or classical CPU/GPU 818. Also, the neural network maps the data to a cryogenic memory 817 or use by either computers 816 or 818. Cryogenic memory 817 can be a superconductive device such as the Josephson junction memory device of Smith Application No. 20190190463, the content of which is incorporated by reference. Memory 817 is much faster than conventional memory and provides for dual ports for dual access. A classical, that is, non-quantum, central processing unit (CPU) typically consists of a control unit and a datapath, both of which are typically implemented using digital complementary metal-oxide-semiconductor (CMOS) circuitry. The control unit typically translates the program's instructions to decide how to manipulate the data, and manages the resources in the CPU necessary for the execution of the instruction, as well as the timing of each instruction execution. The datapath is a collection of functional units, registers, and buses in the processor where the data being processed flow through. The computation is carried out by the control unit instructing the various functional units, registers, and buses to manipulate the data, resulting in the final output of the desired computational task. In a typical CPU, the control unit and the datapath are implemented using digital circuits constructed using logic elements, built using transistors, and are highly intertwined in its layout on the chip. A quantum computer (or QC/QIP system) manipulates quantum data (measured in units of qubits), and therefore the datapath has to be made up of quantum objects. The functional units that store, transport, and manipulate the data must be able to handle the qubits, maintaining quantum characteristics (such as superposition and entanglement) and acting simultaneously on all components of the superposition input states. On the other hand, the control unit is typically classical, as the instructions specified in the control program are classical in nature. A typical control unit can be configured to translate an instruction from a program or algorithm into a classical control signal that operates the functional units to act on the qubits to effect the desired data manipulation. The action on the qubit is generally analog in nature, where the classical control signal (typically consists of a carrier electromagnetic field (e.g., radio frequency (RF), microwave, optical) with modulation that encodes the action in either the same or a separate field) transforms the qubit (or a group of qubits) to a different quantum state via controlled time-evolution of quantum systems. That is, the classical control signal is used to control operations that sequentially transform the qubit states over time to generate the desired computation or simulation.

The result is received by the execution unit 814 and mapped to a predetermined format as output using mapper 820. The execution unit 814 that can facilitate execution of the quantum circuit associated with the second computing problem at a quantum computer 816. In an aspect, the execution component 816 can facilitate operation of the quantum computer 816 by providing quantum circuit information associated with the second computing problem to the quantum computer 816, as described in accordance with various aspects herein. Execution of the second computing problem at the quantum computer 816 can result in a first output corresponding to the second computing problem constructed by the module 812. The system 1 further includes a mapper 820 that can map the first output obtained by the quantum computer 816 via the execution unit 814 to a second output that corresponds to the original computing problem provided to the module 812. The module 812 can be a quantum solver to leverage various properties of computational complexity, e.g., that NP-complete problems can be reduced to each other in polynomial time, to program a quantum computer to solve a base NP-complete problem, thereby enabling programming of quantum computers to solve NP-complete problems by first reducing them to the base NP-complete problem.

One example quantum NP-complete solution module 812 exploits reduction such that all NP-complete problems can potentially be solved by a core quantum solver that is directed to a single NP-complete problem, since all other NP-complete problems can be solved by using a reduction wrapper around the core solver according to properties of NP-complete problems as known in the art. By designing the framework in this way shown by diagram 8200, the difficulty associated with constructing quantum models and/or encodings for a whole array of different NP-complete problems can be circumvented, as a quantum solution for a given NP-complete problem can be utilized to find solutions for respective other NP-complete problems.

One module 812 generates configuration data for the oracle marking subcircuit by converting respective elements of the second computing problem via at least one of Pauli-X quantum gates or N-th order controlled-not (CNX) quantum gates. The module generates configuration data for a CNX quantum gate by combining a number N of controlled-controlled-not (CCX) quantum gates and respectively corresponding ancillary qubits. The module generates configuration data for the amplitude amplification subcircuit based on a transformation matrix. The input mapping component maps the input of the first computing problem to the input of the second computing problem based on a reduction mapping; and the computer executable components further comprise an output mapping component that maps the first output to the second output based on the reduction mapping.

One module 812 performs Grover's Search algorithm, which exploits the nature of quantum superposition and achieves searching through an unordered list of N items. The Grover's Search algorithm is described in more detail below. Various embodiments of module 812 described herein can utilize a generalized formulation for the Grover's Search algorithm in connection with a corresponding Boolean satisfiability (SAT) solver to implement a fully automated solution toolkit. It should be appreciated, however, that the various embodiments shown and described herein could be modified, extended, and/or otherwise configured to utilize any other suitable algorithm(s) for any other suitable base computing problem(s). The Grover's Search algorithm accepts an unordered collection of N items and a binary oracle function $f(-)$ that indicates whether an item meets the search criterion. Accordingly, if a random item i is selected from the collection, $f(i)==1$ would indicate a hit while $f(i)==0$ would indicate that further searching is needed. In the module 812, a single $f$ query can have the effect of checking on multiple items all at once because qubits can be put in superpositioned states. For example, if $n=\log 2 N$ qubits are placed into a uniform superposition, then a single application off can be used to check all N items at once. Grover's algorithm can be utilized as follows. Initially, a set of n qubits are utilized to encode $N=2n$ possible states (items), of which |T> is the search target. First, then qubits are put in uniform superposition utilizing Hadamard gates as described above. Next, a marking step is carried out, in which the amplitude of the target state is flipped while leaving the amplitudes of the other states unchanged. This can done by constructing a unitary operator Uf, such that Uf|x,y>=|(x,f(x)E9y), where E9 represents binary XOR, x represents the state of the n qubits used to encode the N items and is initialized to be in the uniform superposition of all N items, and y is an ancillary (helper) qubit, prepared by feeding |1> through a Hadamard gate, as follows:

$$|y\rangle = f|1\rangle = \frac{|0\rangle - |1\rangle}{\sqrt{2}}.$$

At this stage, the amplitude for the target state \|f is flipped, and the amplitudes of all other states remain unchanged, thereby marking the target state. Grover's algorithm causes the target state to stand out via an additional amplitude amplification step, which can be accomplished via inversion about the mean. A unitary operation Mn, which can be given as:

$$Mn = \begin{vmatrix} 1-- & 2 & 2 & \frac{2}{2^n} \\ & 2^n & 2^n & \frac{2}{2^n} \\ & 2 & 2 & \\ & 1-- & & \\ & 2n & 2n & \\ & 2 & 2 & \end{vmatrix}$$

To verify the rotation-about-the-mean effect, Mn can be applied to an already marked (last item) state vector. Grover's Search algorithm includes a marking step and an amplification step. Accordingly, the system can generate configuration data for a Grover's Search quantum circuit that includes an oracle marking subcircuit and an input mapping component amplitude amplification subcircuit, each of which are described in further detail below.

Oracle Marking Implementation is discussed next. The marking operation Uf|x, y>=|x, $f$ (x)E9y> in Grover's algorithm is determined by the boolean oracle function f, which takes as input a single quantum state and outputs whether or not the state is a search target. In an aspect, the oracle function $f$ for a SAT problem can be set to a Boolean CNF expression itself, where the 2n possible states respectively correspond to a particular assignments to then boolean variables.

Based on this direct mapping between the 3-SAT problem itself and the oracle function, the Boolean operations associated with respective CNFs, e.g., NOT (b), OR (v), and AND ({circumflex over ( )}) can be defined for implementation on a quantum computer as follows.

A NOT operator can be configured to switch between the |0> and |1> states, or more generally, the a|0>+|1> and |0>+a|1> states to account for quantum superposition. As this is the operation of the quantum Pauli-X gate as described above, a NOT operator can simply be represented as a Pauli-X gate.

For the OR operator, since De Morgan's law provides that v1 v v2 ¢::} (v1 {circumflex over ( )} v2), OR operations can be converted into AND operations with the help of the NOT operator, which can be implemented via a Pauli-X gate as noted above.

In an aspect, the logical AND operator can be implemented by leveraging CCX gates as described above. As noted above with respect to FIG. 4, the 3-qubit CCX (Toffoli) gate flips the state of the last qubit |0>+ - - - +|1>) if and only if the first two input qubits are both |1>. Accordingly, by configuring the first two qubits 1q0> and 1q1> to hold the problem variables and introducing an ancillary (helper) qubit 1q2>=|0> as the last qubit, the corresponding CCX operation results in 1q2> being in the state representing the AND of |q0⟩ and |q1⟩. In an aspect, the CCX gate can be extended to achieve a CNX gate (e.g., CC . . . CX for N instances of C, or CNX), thereby enabling logical AND operations for more than two variables. which would then be able to handle the ANDing of an arbitrary number of variables.

Multiple CCX gates illustrated by diagram 700 can be combined to create a CNX gate by combining the multiple CCX gates and introducing respectively corresponding ancillary qubits, where each single CCX brings a new variable into the collective AND, and the ancillas help hold intermediate states.

In an aspect, due to quantum entanglement, the CCX gates on the right side of the V are utilized even after obtaining the desired state of Ir> In other words, even though Ir> is in our desired state at the valley of the V, the helper |a⟩s are entangled with the variable qubits |vi⟩ and the result qubit Ir>. As a result, intermediate values they hold cannot be abandoned, because doing so would cause the states of the ancillary qubits to collapse, in turn affecting the states of the variable qubits |vi⟩ and the result qubit Ir>. Therefore, the CCX gates on the right side of the V are utilized to clean up the ancillas, thereby reversing them back to their initial I0> state and disentangling them from the other qubits.

Another module 812 enables quantum annealing adapted to simultaneously track configurations in a superimposed state in order to obtain minimum energy (or costs) finally desired in quantum computing, and employs an adiabatic quantum computation (AQC) technique particularly in order to perform quantum annealing. Furthermore, AQC employs a technique for finally obtaining a solution in a desired target state by generating an adiabatic change of a Hamiltonian from an initial state to the target state.

Another module 812 solves pattern recognition problems done by complex deep neural network through adiabatic evolution using a quantum system. The quantum computer operates singly or in combination with classical computers provide sufficiently desirable quality to real-time pattern recognition applications. In this module, the relationships between the entries of data can be represented by respective vectors and the similarity between grouped patterns represented by combinations of vectors is analyzed. In connection with the combinations of vectors, for example, in the case of news, the relationships between pieces of text, i.e., contexts, are extracted, and may be provided as vectorized representations using a classical computer and then processed by quantum computers. In the case of voice data, changes in the frequency components over time may be extracted using classical computers, and may be provided as vectorized representations. In this case, the vectors may be modeled as the physical state variables of the quantum system. The module 812 can perform reading and diagnosis of medical images, applications designed to predict the effectiveness of a new medicine or detect a side effect in advance in the pharmaceutical industry, pattern recognition for the planning of marketing or automation of customer management, and applications designed to extract significant information from a massive amount of data obtained via the Internet of Things and analyze the extracted information.

Another module 812 handles machine vision for recognizing patterns between images by using a quantum system, the machine vision apparatus including: an optical module configured to acquire a first image; a processor configured to derive a first pattern from the relationships between points of interests of the acquired first image, and to derive a second pattern from the relationships between points of interests of a second image; and memory configured to store the derived first and second patterns; wherein the processor includes: a modeling unit configured to set up an objective function based on the similarity between the first pattern and the second pattern stored in the memory; and an interpretation unit configured to find an optimum first pattern and an optimum second pattern, in which the similarity between the first pattern and the second pattern is optimized, by interpreting a final quantum state obtained through an adiabatic evolution process of the quantum system in which the objective function is optimized. The processor may be further configured to: vectorize the relationships between the points of interests of the first image, and generate the first pattern by modeling a set of the vectorized relationships between the points of interests of the first image as the first pattern; and vectorize the relationships between the points of interests of the second image, and generate the second pattern by modeling a set of the vectorized relationships between the points of interests of the second image as the second pattern. The quantum system may include a physical model that depends on interaction between dipoles.

Another module 812 recognizes patterns between images in machine vision with a quantum system by setting up an objective function based on the similarity between a first pattern derived from the relationships between points of interests of a first image and a second pattern derived from the relationships between points of interests of a second image; and finding an optimum first pattern and an optimum second pattern, in which the similarity between the first pattern and the second pattern is optimized, by interpreting a final quantum state obtained through an adiabatic evolution process of the quantum system in which the objective function is optimized. The setting up may include: vectorizing the relationships between the points of interests of the first image, and modeling a set of the vectorized relationships between the points of interests of the first image as the first pattern; and vectorizing the relationships between the points of interests of the second image, and modeling a set of the vectorized relationships between the points of interests of the second image as the second pattern. The quantum system may include a physical model that depends on interaction between dipoles, or may include an Ising model that depends on dipole interaction of a magnetic body.

Another module 812 solves cryptographic problems. Public key cryptosystems may also be used to establish a key that is shared between two devices. In its simplest form, as proposed by Diffie-Hellman, each device sends a public key to the other device. Both devices then combine the received public key with their private key to obtain a shared key. One device, usually referred to as an entity (or correspondent), Alice, generates a private key ka and sends another device, or entity, Bob, the public key kaP. Bob generates a private key kb and sends Alice the public key kbP. Alice computes ka·kbP and Bob computes kb·kaP so they share a common key K=kakbP=kbkaP. The shared key may then be used in a symmetric key protocol. Neither Alice nor Bob may recover the private key of the other, and third parties cannot reconstruct the shared key. One of the important abilities of quantum computers is to efficiently, which means in polynomial time, factor large integers and solve the discrete logarithm problem (for example, given g and h=gx in group G, find x). A significant factor affecting cryptography's security is based on these two mathematical problems, which are considered to be safe in the realm of classical computing. This means that with the appearance of quantum computers, classical cryptosystems may no longer be safe.

The field of 'post-quantum cryptography' is involved in developing cryptosystems for classical computers so that the classical computer systems would be quantum-resistant and secure against possible adversaries employing quantum computing. In some contexts, fully homomorphic encryption allows data to be encrypted by one party and processed by another. The requirements of fully homomorphic encryption can be relaxed, for example, by allowing other interactions between the client and server. At the same time, the requirements can be strengthened, for example, by asking for information-theoretic security. This can produce an asymmetric scenario—a quantum server or quantum cloud architecture, which is a particularly relevant scenario in many computing environments. In some implementations, a client (e.g., a partially-classical client) can delegate the execution of any quantum computation to a remote quantum server, and this computation can be performed on quantum data that is encrypted via a quantum one-time pad. Privacy can be maintained, for example, where the server is not provided access to the encryption key or under other conditions. In such a delegation of computation on encrypted data, the operations performed by the client can be significantly easier to perform than the computation itself. For example, in some cases, the client has only limited quantum resources, rather than universal quantum computation capabilities. In some cases, the client has the ability to perform encryption and decryption, e.g., by applying single-qubit Pauli operators; the client can also have the ability to prepare and send random qubits chosen from a set of four possibilities. The set of four possible states can be unitarily equivalent to the set, which are known as the BB84 states, for the role that they play in the quantum key distribution protocol known by the same name. In some cases, the client does not use quantum memory. For example, auxiliary quantum states can be prepared using photon polarization or other suitable techniques. In such cases, for an honest client, security can be proven against any cheating server via simulations. The protocols described here may provide advantages in some instances. For some protocols, a conceptually simple proof of correctness is available, together with a security definition and proof that is applicable to all types of information, including shared entangled quantum registers. Additionally, some protocols may be more efficient in terms of quantum or classical communication, and could lead to the experimental delegation of a wider class of private quantum computations.

The module 812 can be a quantum encryption component that employs a method wherein qubits are established via an oscillating polarization function generated as a function of the time-varying electric field of a light wave, where the relationship between the polarization and applied electric field is linear, with the resulting time-varying polarization sinusoidal at frequency m1 through mn. In this way, sinusoidally-varying fields are generated for any medium in which induced polarization is a nonlinear function of any electric field, inducing polarizations that incorporate frequency components at 1-to-n higher harmonics of the original (first-order, or linear) frequency, generating the basis for 1-to-n qubit encryption, where L-frequencies of second-to-nth-order harmonic waves expressing as qubits are calculated using perturbations of Maxwell's equations for static and time-varying electric and magnetic fields, and where computational reversibility may be calculated through an Inverse Fourier Transform on any classical (non-quantum) function $f(x)$. The quantum encryption enables computational reversibility that can be calculated through a Quantum Fourier Transform (QFT) as the discrete Fourier transform with a specified decomposition into a product of simpler unitary matrices. The quantum encryption enables a method wherein the relationship between induced polarization P and the electric field E is not linear; qubits are established as a result of the generated polarization not being the same for a given applied field of magnitude+E0, in the same fashion as for an applied field of magnitude −E0. In either case, the polarization response to any given applied sinusoidal field is not purely sinusoidal, generating a distortion reflecting the presence of polarization components at frequencies −::f.m1, and therefore providing the basis state for a strong component at the second-harmonic frequency 2m1, and at nth-harmonic frequencies 2mn. The quantum encryption enables sending-receiving parties to rotate Einstein-Podolsky-Rosen (EPR) quantum-key-generating pairs by 1-to-n spin-polarized phase angles (0) throughout the integer and/or sub-integer range 0 0 360. The protocols described here can be used in a variety of applications. For example, a delegated, private execution of Shor's algorithm can be used to factor in polynomial time on a quantum computer (factoring in polynomial time is widely believed to be intractable on a classical computer). Where the computation is performed on an encrypted input, the server will not know which integer he is factoring; if this integer corresponds to an RSA public key then the server will not know which public key he is helping to break. Thus, quantum computing on encrypted data may be useful, for example, for the delegation of problems that can be solved in quantum polynomial time, with the underlying assumption that they cannot be solved in classical polynomial time. The protocols described here can also be useful in other suitable applications and scenarios. Other modules 812 can be implemented.

In one embodiment, the system takes as input a problem formation as defined by a problem parser and automatically generates the corresponding quantum program that solves the parsed problem. For instance, the quantum code generator component can take as input a 3-SAT problem formation and generate a quantum program that solves the 3-SAT problem as described above. Other implementations could also be used. In an aspect, a quantum program generated by the quantum code generator component can be generated in any suitable quantum programming language, such as the Open Quantum Assembly Language (OpenQASM) format and/or other suitable formats.

A toolkit can additionally include one or more interfaces to facilitate interaction between a human user and the components of system. For instance, a graphical Web interface can be provided for accessing the toolkit in an interactive manner. The interface and/or related components can also or alternatively provide tutorials and/or explanations regarding quantum algorithms, computing problems, quantum computing in general, and/or other topics. As another example, the interface and/or related components can provide for visualization of arbitrarily complex quantum circuits. In another aspect, an application programming interface (API) and/or other means can be utilized to alter and/or extend the functionality of system in various ways. For instance, the problem parser can be modified via the API to expand and/or otherwise alter the scope of computing problem types that can be reduced to the base problem type utilized by the quantum code generator component. Also or alternatively, the quantum code generator component can be modified via the API to expand and/or otherwise alter the base problem types and/or algorithms that can subsequently be passed onto the quantum processor for execution. In the event that the quantum code generator component can operate according to multiple base problem types and/or quantum algorithms, the quantum code generator can select a base problem and/or algorithm to use for a given input problem based on a mapping between respective input problems and reduction mappings and/or based on other criteria.

The system 1 provides an end-to-end framework for bringing the potential power of classical computers and quantum computers in a generalized manner to software engineering researchers and practitioners. Further, the framework uses learning machine to circumvent the significant difficulty associated with modeling, encoding, and solving multiple different NP-complete problems on classical or quantum computers. The learning machine automatically translates the high level instruction or code specifying the problem to be solved and selects a combination of classical/quantum computers to solve the task. Moreover, the system 1 can be provided at the edge so provide high performance low latency cloud compute solutions at a low cost as compute resources can be shared by many devices.

In connection with the use of quantum computers, there are many different hardware and software approaches. One hardware approach is to use dies or integrated circuits made of a superconductive material, such as aluminum or niobium. The qubits can also be made from (1) ion traps for capturing single atoms and (2) Josephson junction-based superconducting circuits.

In ion trap embodiment, a plurality of control units are provided as independently programmable and can be used to control a distinct set of qubits. The number of qubits can be the same for all of the control units or can vary across control units, depending on the programming instructions received and the maximum number of qubits that can be loaded or enabled by a respective one of the control units. Each control unit handles qubits in a different region of the ion trap. It is possible then to expand a software-defined quantum computer by how these control units are used in connection with adjacent regions in an ion trap. The ion trap can perform "shuttling" of ions or atoms between different control units (e.g., between different regions in an ion trap). In one example, if both control units initially handled thirty (30) ions or atoms, and five (5) ions or atoms are shuttled or transferred over, then one control unit is left controlling or handling thirty five (35) ions or atoms and the other control unit is left controlling or handling twenty five (25) ions or atoms. These shuttled or transferred ions or atoms can be used to communicate information from one set of qubits to another set of qubits.

In one software-defined quantum computer can include first and second control units, where the first control unit is configured to receive programming instructions (e.g., programming instructions) from execution unit 814 and generate first control signals and a first plurality of qubits is enabled and controlled (e.g., x qubits) by the first control signals from the first control unit, and where the second control unit is configured to receive programming instructions from the execution unit 814 and generate second control signals and a second plurality of qubits is enabled and controlled (e.g., y qubits) by the second control signals from the second control unit. In such a quantum computer, a number of control units including the first control unit and the second control unit can be dynamically changed (e.g., increased or decreased based on the number of qubits needed and the number of control units needed to control those qubits). The first control unit is further configured to shuttle a number of the first plurality of qubits (e.g., z qubits) to be controlled by the second control unit such that a number of the second plurality of qubits is increased by the number of the first plurality of qubits that are shuttled (e.g., y+z qubits). A number of qubits that remain under the control of the first control unit are reduced by the amount of qubits shuttled over (e.g., x-z qubits). The number of the first plurality of qubits that are shuttled includes information associated with the first plurality of qubits, and the information is transferred to the second plurality of qubits by the number of the first plurality of qubits that are shuttled. The number of the first plurality of qubits shuttled to be controlled by the second control unit includes one or more qubits and the shuttling of the one or more qubits establishes a communications channel between the first plurality of qubits and the second plurality of qubits. The first plurality of qubits includes memory/operations qubits and communications qubits that are enabled and controlled by the control signals from the first control unit, and the number of the first plurality of qubits that are shuttled includes one or more of the communication qubits. It is possible to expand the capabilities of a software-defined quantum computer by adjusting the number of ions or atoms and the number of control units needed to control the ions or atoms. Some qubits may be used for memory/operations e.g., qubits 130a) and others may be communications qubits used to enable the communications channels 225 (e.g., qubits 130b). When the qubits 130 in a module are implemented using ion-trapped technology, for example, the memory/operation qubits 130a can be based on 8171Yb+ atomic ions, and the communication qubits 130b can be based on 138Ba+ atomic ions. Other species and/or isotopes can also be used for the pairs of memory/operations and communications qubits. The memory/operations qubits are enabled and controlled by the control signals from the respective control unit, and the communication qubits are enabled and controlled by the control signals from the respective communication control unit. The memory/operation qubits can be based on 8171Yb+ atomic ions, and the communication qubits can be based on 138Ba+ atomic ions. Other species and/or isotopes can also be used for the pairs of memory/operations and communications qubits. The memory/operations qubits are enabled and controlled by the control signals from the respective control unit, and the communication qubits are enabled and controlled by the control signals from the respective communication control unit. Further, elasticity from cloud computing can be done. For example, it is possible to implement an elastic computing environment where qubits can be shuttled from a reserve region (already loaded in a separate trapping zone) to the computing region and back on demand during the runtime of a program. That is, the demands placed on the system during runtime of a program may be used to dynamically modify (e.g., provide elasticity to) the computing environment. Therefore, it is possible to have readily available zones in a trap with additional computing resources (e.g., preloaded ions) to easily expand the computing environment on demand.

A quantum core may also be referred to as a quantum unit, a core unit, or simply a core. As used in this disclosure unless otherwise specified, a quantum core may mean, for example, an individual ion trap (although quantum cores of other technologies may also be used). It is understood that an individual ion trap may include one or more qubits. If the core units in a network or architecture are not identical, the architecture is referred to as a heterogeneous architecture (this could mean different ion traps, or different cores made of different technologies, such as ion traps and trapped neutral atoms, or superconducting qubits). On the other hand, when a network or architecture has identical core units (e.g., identical ion traps), the architecture is referred to as a homogenous architecture.

In another embodiment, the operation of superconducting qubit-type quantum devices may be based on the Josephson effect, a macroscopic quantum phenomenon in which a supercurrent (a current that, due to zero electrical resistance, flows for indefinitely long without any voltage applied) flows across a device known as a Josephson junction. Examples of superconducting qubit-type quantum devices may include charge qubits, flux qubits, and phase qubits. Transmons, a type of charge qubit with the name being an abbreviation of "transmission line shunted plasma oscillation qubits," may exhibit reduced sensitivity to charge noise, and thus may be particularly advantageous. Transmon-type quantum devices may include inductors, capacitors, and at least one nonlinear element (e.g., a Josephson junction) to achieve an effective two-level quantum state system. Josephson junctions may provide the central circuit elements of a superconducting qubit-type quantum device. A Josephson junction may include two superconductors connected by a weak link. For example, a Josephson junction may be implemented as a thin layer of an insulating material, referred to as a barrier or a tunnel barrier and serving as the "weak link" of the junction, sandwiched between two layers of superconductor. Josephson junctions may act as superconducting tunnel junctions. Cooper pairs may tunnel across the barrier from one superconducting layer to the other. The electrical characteristics of this tunneling are governed by the Josephson relations. Because the inductance of a Josephson junction is nonlinear, when used in an inductor-capacitor circuit (which may be referred to as an LC circuit) in a transmon-type quantum device, the resulting circuit has uneven spacing between its energy states. In other classes of superconducting qubit-type quantum devices, Josephson junctions combined with other circuit elements may similarly provide the non-linearity necessary for forming an effective two-level quantum state to act as a qubit.

In one embodiment, processes for designing and fabricating superconducting dies/integrated circuits are similar to technologies and processes that are used for conventional integrated circuits. Lithographic processes can be for forming lateral interconnects but the lateral interconnects may be formed by wirebonding. In other embodiments, the lateral interconnects may be formed by additive manufacturing (e.g., three-dimensional printing or cold spraying). A superconducting quantum circuit may include circuitry for providing external control of qubit elements and circuitry for providing internal control of qubit elements 302 In this context, "external control" refers to controlling the qubit elements from outside of the die that includes the qubit elements, including control by a user of a quantum computer, while "internal control" refers to controlling the qubit elements within the die that includes the qubit elements 302. For example, if qubit elements are transmon qubit elements, external control may be implemented by means of flux bias lines (also known as "flux lines" and "flux coil lines") and by means of readout and drive lines (also known as "microwave lines" since qubit elements are typically designed to operate with microwave signals), described in greater detail below. On the other hand, internal control lines for such qubit elements may be implemented by means of resonators. Flux bias lines, microwave lines, coupling resonators, drive lines, and readout resonators, such as those described above, together form interconnects for supporting propagation of microwave signals. Further, any other connections for providing direct electrical interconnection between different quantum circuit elements and components, such as connections from Josephson junction electrodes to capacitor plates or to superconducting loops of superconducting quantum interference devices (SQUIDS) or connections between two ground lines of a particular transmission line for equalizing electrostatic potential on the two ground lines, are also referred to herein as interconnects. Electrical interconnections may also be provided between quantum circuit elements and components and non-quantum circuit elements, which may also be provided in a quantum circuit, as well as to electrical interconnections between various non-quantum circuit elements provided in a quantum circuit. Examples of non-quantum circuit elements that may be provided in a quantum circuit may include various analog and/or digital systems, e.g. analog-to-digital converters, mixers, multiplexers, amplifiers, etc. In some embodiments, these non-quantum elements may be included in a control die.

In some embodiments, a quantum computing assembly may include spin qubit-type quantum devices in one or more of the dies. The spin qubit-type quantum device may include a base and multiple fins extending away from the base. The base and the fins may include a substrate and a quantum well stack. The base may include at least some of the substrate, and the fins may each include a quantum well layer of the quantum well stack. The total number of fins included in the spin qubit-type quantum device is an even number, with the fins organized into pairs including one active fin and one read fin, as discussed in detail below. Each fins may include a quantum well layer that may be arranged normal to the z-direction, and may provide a layer in which a two-dimensional electron gas (2 DEG) may form to enable the generation of a quantum dot during operation of the spin qubit-type quantum device. The quantum well layer itself may provide a geometric constraint on the z-location of quantum dots in the fins, and the limited extent of the fins (and therefore the quantum well layer) in they-direction may provide a geometric constraint on they-location of quantum dots in the fins. To control the x-location of quantum dots in the fins, voltages may be applied to gates disposed on the fins to adjust the energy profile along the fins in the x-direction and thereby constrain the x-location of quantum dots within quantum wells.

Another hardware may be implemented based on the quantum Ising model of trapped ion spin-phonon chains. The quantum Ising model of trapped ion spin-phonon chains is a dipole-based physical model. An optimized solution to a specific vector for the solution of the machine vision problem may be obtained by matching a dipole to the specific vector for the solution of the machine vision problem and optimizing the state variable of a dipole through quantum-mechanical adiabatic evolution. The dipole is a physical property having an orientation and a scale attributable to a magnetic field or the like. The dipole is each element of the quantum Ising model, and may be matched to a specific vector for the solution of the machine vision problem. A Hamiltonian can be used to solve the quantum Ising model of trapped ion spin-phonon chains Individual charge detection may be performed by a spin-dependent single-electron tunneling event through the single-shot detection of a sensitive charge detector capacitively coupled to a quantum dot.

In some embodiments, a quantum computer can have one or more quantum processors. A quantum computer may be configured to perform one or more quantum algorithms. A quantum computer may store or process data represented by quantum bits (qubits). A quantum computer may be able to solve certain problems much more quickly than any classical computers that use even the best currently available algorithms, like integer factorization using Shor's algorithm or the simulation of quantum many-body systems. There exist quantum algorithms, such as Simon's algorithm, that run faster than any possible probabilistic classical algorithm. Examples of quantum algorithms include, but are not limited to, quantum optimization algorithms, quantum Fourier transforms, amplitude amplifications, quantum walk algorithms, and quantum evolution algorithms. Quantum computers may be able to efficiently solve problems that no classical computer may be able to solve within a reasonable amount of time. Thus, a system disclosed herein utilizes the merits of quantum computing resources to solve complex problems. Any type of quantum computers may be suitable for the technologies disclosed herein. Examples of quantum computers include, but are not limited to, adiabatic quantum computers, quantum gate arrays, one-way quantum computer, topological quantum computers, quantum Turing machines, superconductor-based quantum computers, trapped ion quantum computers, optical lattices, quantum dot computers, spin-based quantum computers, spatial-based quantum computers, Loss-DiVincenzo quantum computers, nuclear magnetic resonance (NMR) based quantum computers, liquid-NMR quantum computers, solid state NMR Kane quantum computers, electrons-on-helium quantum computers, cavity-quantum-electrodynamics based quantum computers, molecular magnet quantum computers, fullerene-based quantum computers, linear optical quantum computers, diamond-based quantum computers, Bose-Einstein condensate-based quantum computers, transistor-based quantum computers, and rare-earth-metal-ion-doped inorganic crystal based quantum computers. A quantum computer may comprise one or more of: a quantum annealer, an Ising solver, an optical parametric oscillator (OPO), or a gate model of quantum computing.

A system of the present disclosure may include or employ quantum-ready or quantum-enabled computing systems. A quantum-ready computing system may comprise a digital computer operatively coupled to a quantum computer. The quantum computer may be configured to perform one or more quantum algorithms. A quantum-enabled computing system may comprise a quantum computer and a classical computer, the quantum computer and the classical computer operatively coupled to a digital computer. The quantum computer may be configured to perform one or more quantum algorithms for solving a computational problem. The classical computer may comprise at least one classical processor and computer memory, and may be configured to perform one or more classical algorithms for solving a computational problem. The term "quantum annealer" and like terms generally refer to a system of superconducting qubits that carries optimization of a configuration of spins in an Ising spin model using quantum annealing.

Cost reduced versions targeted for specific application can be done. For example, a machine vision device for recognizing patterns between images using a quantum system includes an optical module that acquires a first image. The optical module is the generic terms for devices which form an image of an object in a space by using reflection, refraction, absorption, interference and diffraction, i.e., the characteristics of light radiated by the sun or an electric light, or which are used to investigate the characteristics of a specific object by analyzing radioactive rays emitted from the object. A processor derives a first pattern from the relationships between points of interests of the first image acquired by the optical module, and derives a second pattern from the relationships between points of interests of a second image. In this case, the second image is the reference image of the first image, and refers to an image into which the first image has been changed. A modeling unit included in the processor sets up an objective function based on the similarity between the first pattern and the second pattern stored in the memory. The interpretation unit finds an optimum first pattern and an optimum second pattern, in which the similarity between the first pattern and the second pattern are optimized, by interpreting a final quantum state obtained through the adiabatic evolution process of the quantum system in which the objective function is optimized. The processor vectorizes the relationships between the points of interests of the first image, models a set of the vectorized relationships between the points of interests of the first image as the first pattern, vectorizes the relationships between the points of interests of the second image, and models a set of the vectorized relationships between the points of interests of the second image as the second pattern. During quantum processing, an optimum first pattern and an optimum second pattern in which the similarity between the first pattern and the second pattern are optimized are found by interpreting a final quantum state obtained through the adiabatic evolution process of the quantum system in which the objective function is optimized. In this case, the quantum system is characterized by including a physical model depending on the interaction between dipoles, and is characterized by including an Ising model depending on the dipole interaction of a magnetic body. The Ising model is characterized in that it is a physical model depending on trapped ion-based spin-phonon coupling, and the quantum system may include a physical model having energy corresponding to the objective function. Accordingly, machine vision-related complex computational problem may be modeled as the interaction between relation vectors between points of interest at principal points of interest, and the machine vision-related complex computational problem may be solved through the modeling. The modeling of machine vision-related complex computational problem using the adiabatic evolution of a quantum system implemented to include a physical model depending on the interaction between dipoles, and the pattern of an image, i.e., a combination of vectors of the image, may be modeled as the interaction between physical dipoles. Since the optimization problem in the field of artificial intelligence or machine learning may model an optimization process as a process of finding the optimum state of a Hamiltonian by using the adiabatic evolution of a quantum system, the system may be applied to various fields.

An arbiter may provide a quantum-enabled software service by operating one or more of the following: Breaking down (e.g., decomposing) a given problem into sub-problems; Identifying the sub-problems that can be solved using a quantum-ready service; Distributing tasks between the classical and quantum-ready services, respectively, accordingly; Collecting solutions of the sub-problems from the classical and quantum-ready services, respectively; Reducing the original computational tasks using the collected solutions to sub-problems; If the original problem is completely solved, the system may provide an indication of the solution and terminate; otherwise, the system may repeat the decomposition operation for the remaining portion of the reduced problem. The operations of quantum-ready service may be based on the technologies described elsewhere herein. On the other hand, classical service may comprise any cloud-based software service configured to address processing of expensive computational tasks by obtaining an indication of such tasks from a client; applying required processes to transform the indication of such tasks to a proper form; and submitting the indication of such tasks to one or more classical digital computing devices, such as computers, clusters of computers, supercomputers, etc.

In various implementations, a computing system may include parallel or distributed computing. The quantum-ready computer and classical computer may operate in parallel. Further, parallel computing may be implemented in the quantum-ready service. For example, a quantum computer may solve multiple computational problems in parallel in the worker farm; a single problem or sub-problem may be solved in parallel in the worker farm. Similarly, a classical computer may solve multiple computational problems in parallel; a single problem or sub-problem may be further solved in a parallel or distributed manner.

Intelligent algorithms for decomposition and distribution may be dynamic and problem dependent. A capability of solving classical and quantum tasks may vary from node to node; for example, nodes 3 and 8 may be able to solve few classical tasks and many quantum tasks, while node 7 may be able to solve many classical tasks and few quantum tasks. The intelligent algorithms may compute certain characteristics of the potential sub-problems at a certain node in the search tree. Examples of characteristics may include, but are not limited to, adequacy in classical solvers, adequacy in quantum solvers, complexity (e.g., time and processor cycles) of computing tasks, current computing capacity in quantum and classical sources, and an estimated time of computed solutions. The characteristics may be deterministic or probabilistically modeled. The intelligent algorithms may have access to information about the size restrictions, capacity, and best-case performance modes of each of the available quantum and classical computing resources. The intelligent algorithms may use information available about the quantum and classical computing resources as well characteristics of potential sub-problems. The intelligent algorithms can determine whether it is advantageous to decompose the problem at a certain node of the search tree. If a decomposition takes place, the resulting sub-problems may be added to the pool of sub-problems together with their corresponding nodes in the search tree. If a decomposition is not advantageous, the intelligent algorithms may continue traversing the search tree considering all the possible nodes, until a certain decomposition is advantageous. Based on partial results of sub-problems received from the quantum or classical computing resources, the intelligent algorithms may be able to reduce the search tree by pruning certain nodes which may not contribute to a better solution.

It is to be appreciated that the system herein performs operations that cannot be performed by a human (e.g., operations that are greater than the capability of a single human mind). For example, an amount of data processed, a speed of data processed and/or data types of data processed by the system 1 over a certain period of time can be greater, faster and different than an amount, speed and data type that can be processed by a single human mind over the same period of time. The system 1 can also be fully operational towards performing one or more other functions (e.g., fully powered on, fully executed, etc.) while also performing the operations described herein. Moreover, quantum circuit configurations, quantum code, and/or other outputs of the system 1 can include information that is impossible to obtain manually by a user in a useful or reasonable amount of time. Additionally, it is to be appreciated that the system 1 can provide various advantages as compared to conventional quantum programming tools. For instance, the system 1 can reduce the accessibility and practicality constraints noted above with respect to quantum computing by providing an end-to-end quantum computing framework for solving NP-complete problems and/or other problems via reduction. By implementing the quantum computing framework corresponding to the system 1, toolkits and/or other aids can be provided to software engineering researchers and practitioners in order to enable such users to enjoy the speedup and scalability benefits of universal quantum computers even in the absence of prior knowledge on quantum computing. As another example, the consistency and/or accuracy quantum code generated by the system 1 can be improved in relation to similar code generated by conventional tools. Also or alternatively, the time associated with development of quantum code for a given use case can be reduced. Other advantages can also be realized.

Various embodiments of the present can be a system, a method, an apparatus and/or a computer program product at any possible technical detail level of integration. The computer program product can include a computer readable storage medium (or media) having computer readable program instructions thereon for causing a processor to carry out one or more aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform one or more aspects of the present invention.

One or more aspects of the present invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It should also be appreciated that, while the antenna system of the present invention is primarily intended for 5G/6G systems, it can be used in space-borne communication applications, radar, as well as other terrestrial applications, or in any application requiring a large, lightweight, stowable antenna.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM).

Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Various modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

All patents, published patent applications and other references disclosed herein are hereby expressly incorporated in their entireties by reference.

While the invention has been described with respect to preferred embodiments, those skilled in the art will readily appreciate that various changes and/or modifications can be made to the invention without departing from the spirit or scope of the invention as defined by the appended claims.

Many of the methods are described in their most basic form, but processes can be added to or deleted from any of the methods and information can be added or subtracted from any of the above description without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

What is claimed is:
1. A system, comprising:
a transceiver to communicate with a predetermined target;
one or more antennas coupled to the transceiver each electrically or mechanically steerable to the predetermined target;
artificial intelligence (AI) software or a neural network to allocate slices of cellular frequencies to different wireless devices to optimize frequency utilization across available bandwidth; and an edge processing module coupled to the transceiver and one or more antennas on a tower to provide low latency computation for the predetermined target.

2. The system of claim 1, comprising a quantum computer coupled to the edge processing module.

3. The system of claim 1, comprising a parser that receives classical specification and data and determines if a portion of such specification runs on a quantum computer, and if so maps classical specification to quantum algorithm and the modified code is provided to an execution unit that selects one or more quantum computers, one or more classical processor, one or more graphical processing units (GPUs), or one or more neuromorphic processors.

4. The system of claim 1, wherein the processor calibrates a connection by analyzing RSSI and TSSI and moves the antennas until predetermined cellular parameters are reached.

5. The system of claim 1, wherein the edge processing module and the antenna are enclosed in a housing or shipping container, or the edge processing module is in a separate shipping container adjacent the antenna.

6. The system of claim 1, wherein the transceiver comprises a 5G or 6G cellular transceiver.

7. The system of claim 1, wherein the edge processing module communicates at a plurality of AI selected frequency with AI selected frequency hopping to use a full frequency allocation.

8. The system of claim 1, comprising a neural network coupled to a control plane, a management plane, and a data plane to optimize 5G parameters.

9. The system of claim 1, comprising one or more cameras and sensors in the housing to capture security information.

10. The system of claim 1, comprising edge sensors including LIDAR and RADAR.

11. The system of claim 1, comprising a camera for individual identity identification.

12. The system of claim 1, wherein the edge processing module streams data to the predetermined target to minimize loading the target.

13. The system of claim 1, wherein the edge processing module shares workload with a core processing module located at a head-end and a cloud module located at a cloud data center, each processing module having increased latency and each having a processor, a graphical processing unit (GPU), a neural network, a quantum computer, a statistical engine, or a programmable logic device (PLD).

14. The system of claim 1, comprising an edge learning machine in a housing or shipping container to provide local edge processing for Internet-of-Things (IoT) sensors.

15. The system of claim 14, wherein the edge learning machine uses pre-trained models and modifies the pre-trained models for a selected task.

16. The system of claim 1, comprising a cellular device for a person crossing a street near a city light or street light, the cellular device emitting a person to vehicle (P2V) or a vehicle to person (V2P) safety message.

17. A system, comprising:
a transceiver to communicate with a predetermined target;
one or more antennas coupled to the transceiver each electrically or mechanically steerable to the predetermined target;
artificial intelligence (AI) software or a neural network to allocate slices of cellular frequencies to different wireless devices to optimize frequency utilization across available bandwidth; and
an edge processing module coupled to the transceiver and one or more antennas on a tower to provide low latency computation for the predetermined target,
wherein the edge processing module comprises at least a processor, a graphical processing unit (GPU), a neural network, a quantum computer, a statistical engine, or a programmable logic device (PLD).

18. A system, comprising:
a transceiver to communicate with a predetermined target;
one or more antennas coupled to the transceiver each electrically or mechanically steerable to the predetermined target; and
a beam sweeping module controlling the antenna in accordance with artificial intelligence frequency hopping selection to maximize bandwidth allocation.

19. The system of claim 18, wherein the beam sweeping is directed at a group of autonomous vehicles, a group of virtual reality devices, or a group of devices performing similar functions.

20. A system, comprising:
a transceiver to communicate with a predetermined target;
one or more antennas coupled to the transceiver each electrically or mechanically steerable to the predetermined target; and
a beam sweeping module controlling the antenna in accordance with one of: artificial intelligence frequency hopping selection to maximize bandwidth allocation, a service level agreement, a performance requirement, a traffic distribution data, a networking requirement or prior beam sweeping history, further comprising a cloud trained neural network whose network parameters are reduced before transferring to the edge neural network.

* * * * *